United States Patent [19]

Kitamura et al.

[11] Patent Number: 5,936,628
[45] Date of Patent: Aug. 10, 1999

[54] THREE-DIMENSIONAL MODEL PROCESSING METHOD, AND APPARATUS THEREFOR

[75] Inventors: Yoshifumi Kitamura, Yokohama; Haruo Shimizu; Masatoshi Okutomi, both of Kawasaki; Osamu Yoshizaki, Hachioji; Takeo Kimura, Yokohama, all of Japan

[73] Assignee: Canon Kabushiki Kaisha, Tokyo, Japan

[21] Appl. No.: 08/401,296

[22] Filed: Mar. 9, 1995

Related U.S. Application Data

[63] Continuation of application No. 07/924,628, Aug. 4, 1992, abandoned.

[30] Foreign Application Priority Data

| Aug. 6, 1991 | [JP] | Japan | 3-196564 |
| Jul. 15, 1992 | [JP] | Japan | 4-187711 |
| Jul. 15, 1992 | [JP] | Japan | 4-188130 |
| Jul. 24, 1992 | [JP] | Japan | 4-198655 |
| Jul. 24, 1992 | [JP] | Japan | 4-198678 |

[51] Int. Cl.$^6$ ..................................................... G06T 5/00
[52] U.S. Cl. .......................................................... 345/420
[58] Field of Search .................................. 395/120, 119, 395/127, 129, 133, 141; 358/22, 101; 382/298; 345/419, 420, 427, 429, 433, 441

[56] References Cited

U.S. PATENT DOCUMENTS

| 4,575,304 | 3/1986 | Nakagawa et al. | 348/125 |
| 4,757,385 | 7/1988 | Hieda | 348/241 |
| 4,821,214 | 4/1989 | Sederberg | 345/420 |
| 4,868,766 | 9/1989 | Oosterholt | 345/420 |
| 4,930,021 | 5/1990 | Okada | 358/451 |
| 5,150,427 | 9/1992 | Frazee et al. | 382/131 |
| 5,185,855 | 2/1993 | Kato et al. | 345/429 |
| 5,237,647 | 8/1993 | Roberts et al. | 345/419 |
| 5,280,569 | 1/1994 | Tsujido | 345/427 |
| 5,369,735 | 11/1994 | Thier et al. | 345/423 |
| 5,383,119 | 1/1995 | Tam | 378/8 |
| 5,504,847 | 4/1996 | Kimura et al. | 345/433 |

OTHER PUBLICATIONS

Solina et al., Recovery of Parametric Models from Range Images: The Case for Superquadratics with Global Deformations, IEEE Transactions on Pattern Analysis, pp. 131–147, Feb. 1990.

Sabata et al., Segmentation of 3–DRange Images Using Pyramidal Data Structures, Computer Vision 1990, Dec. 4, 1990, pp. 662–666.

Mulgaonkar et al., SceneDescription Using Range Data, Interpretation of 3D Scenes Workshop, Nov. 27, 1989, pp. 138–144.

Lee et al., Curved Surface Characterization in 3–D Range Images, ICASSP'90 International Conference of Acoustics, Speech and Signal Processing, Apr. 3, 1990, pp. 2209–2212.

(List continued on next page.)

*Primary Examiner*—Anton Fetting
*Attorney, Agent, or Firm*—Fitzpatrick, Cella, Harper & Scinto

[57] ABSTRACT

A three-dimensional model processing apparatus includes a three-dimensional data-format converter for converting the data format of three-dimensional data inputted by a three-dimensional data input unit, a three-dimensional data processor for processing the three-dimensional data converted by the three-dimensional data-format converter, a three-dimensional model creating unit for creating a three-dimensional model from the three-dimensional data processed by the three-dimensional processor, and a three-dimensional model editor for editing the three-dimensional model created by the three-dimensional model creating unit and applying operations to the shape data. A three-dimensional model is created and edited irrespective of the type of three-dimensional data inputted in different modes.

35 Claims, 43 Drawing Sheets

OTHER PUBLICATIONS

Foley, Computer Graphics: Principles and Practice, 1990, pp. 222–226, 698–701, 721–739, 1013–1015, 1057–1064.

Paul J. Besl, et al., "Invariant Surface Characteristics for 3D Object Recognition in Range Images", Computer Vision, Graphics, and Image Processing 33, 33–80 (1986).

J.D. Foley, et al., "Computer Graphics", 2nd Ed., pp. 216–227.

Naokazu Yokoya, et al., "A Hybrid Approach to Range Image Segmentation Based on Differential Geometry", Joho Shori Gakkai Ronbunshi, vol. 30, No. 8 pp. 944–953 (1989).

Fourth Int'l Conference On "Advanced Infrared Detectors and Systems" Organized by Electronics Division of the Institution of Electrical Engineers, The Institution of Electrical Engineers, Savoy Place, London WC2R OBL Jun. 1990, pp. 152–157.

"Segmented Descriptions of 3–D Surfaces", Ting–Jun Fan, Gerard Medioni & Ramakant Nevatia, EEE Journal of Robotics and Automation, vol. RA–3, No. 6, Dec. 1987, pp. 527–538.

Eighth Int'l Conference on Pattern Recognition, "Step Or Jump Edge Detection by Extrapolation", T. Kasvand, Oct. 1986, 374–377.

"Invariant Surface Segmentation Through Energy Minimization with Discontinuities", Stan Z. LI, International Journal of Computer Vision, 5:2, pp. 161–194 (1990).

"Lecture Notes In Computer Science", G. Goos and J. Hartmanis, Pattern Recognition, 4th Int'l Conference Mar. 1988, pp. 58–67.

"Structured Edge Map of Curved Objects in a Range Image", Guy D. Godin & Martin D. Levine, Computer Vision and Robotics Laboratory, (1989), pp. 276–281.

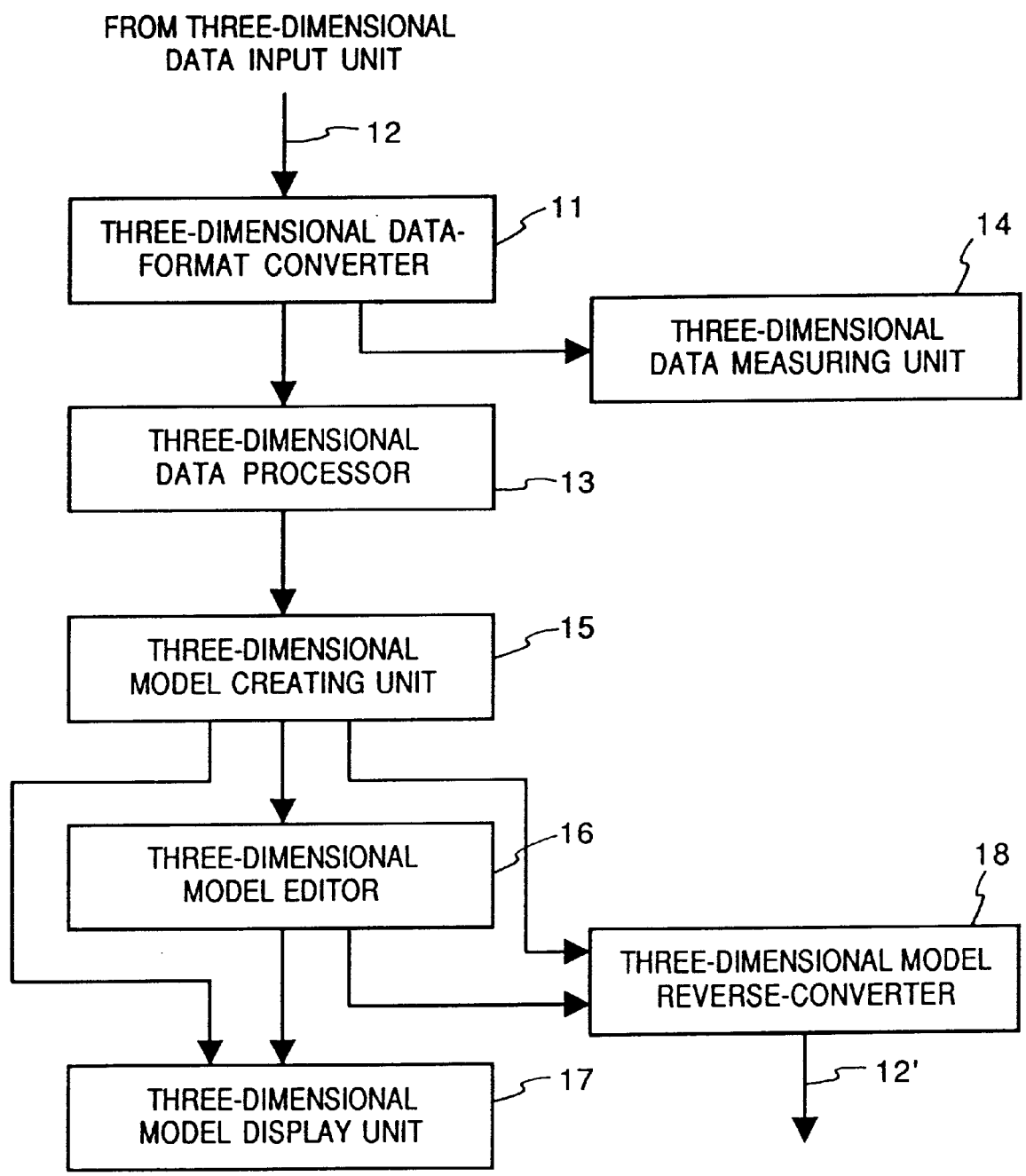
F I G. 1

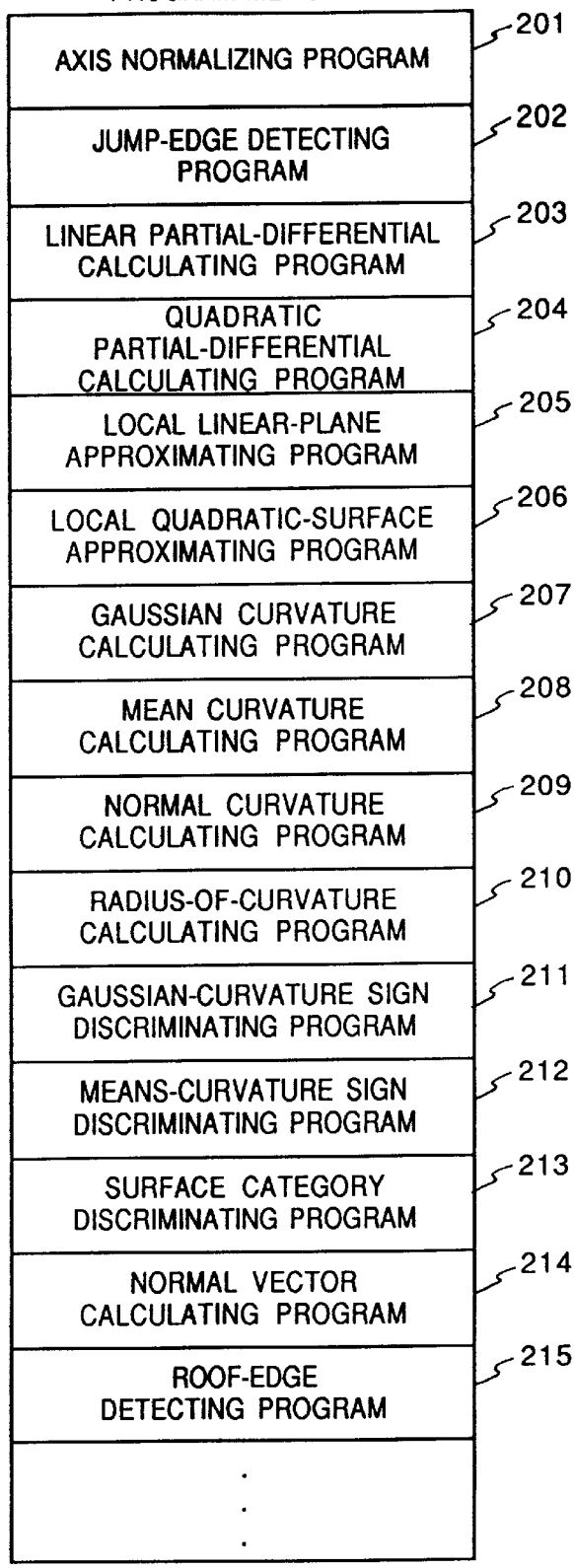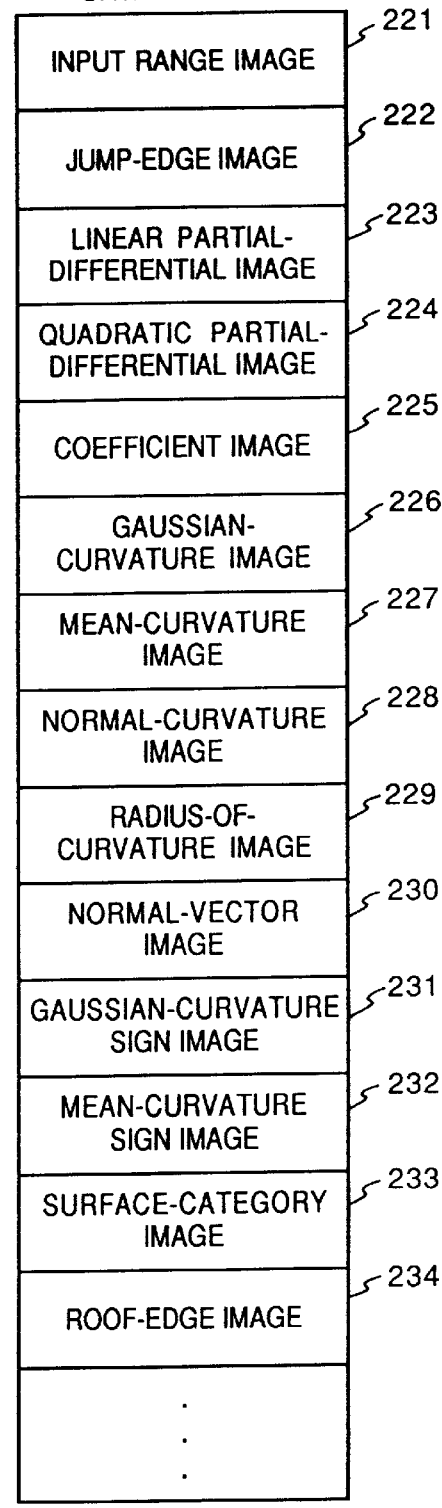
F I G. 3 (a)   F I G. 3 (b)

FIG. 6

**(1) 5 *5 OPERATOR**

$$a : 1/70* \begin{vmatrix} 2 & -1 & -2 & -1 & 2 \\ 2 & -1 & -2 & -1 & 2 \\ 2 & -1 & -2 & -1 & 2 \\ 2 & -1 & -2 & -1 & 2 \\ 2 & -1 & -2 & -1 & 2 \end{vmatrix} \qquad b : 1/70* \begin{vmatrix} 2 & 2 & 2 & 2 & 2 \\ -1 & -1 & -1 & -1 & -1 \\ -2 & -2 & -2 & -2 & -2 \\ -1 & -1 & -1 & -1 & -1 \\ 2 & 2 & 2 & 2 & 2 \end{vmatrix}$$

$$c : 1/100* \begin{vmatrix} 4 & 2 & 0 & -2 & -4 \\ 2 & 1 & 0 & -1 & -2 \\ 0 & 0 & 0 & 0 & 0 \\ -2 & -1 & 0 & 1 & 2 \\ -4 & -2 & 0 & 2 & 4 \end{vmatrix} \qquad d : 1/50* \begin{vmatrix} -2 & -1 & 0 & 1 & 2 \\ -2 & -1 & 0 & 1 & 2 \\ -2 & -1 & 0 & 1 & 2 \\ -2 & -1 & 0 & 1 & 2 \\ -2 & -1 & 0 & 1 & 2 \end{vmatrix}$$

$$e : 1/50* \begin{vmatrix} -2 & -2 & -2 & -2 & -2 \\ -1 & -1 & -1 & -1 & -1 \\ 0 & 0 & 0 & 0 & 0 \\ 1 & 1 & 1 & 1 & 1 \\ 2 & 2 & 2 & 2 & 2 \end{vmatrix} \qquad f : 1/175* \begin{vmatrix} -13 & 2 & 7 & 2 & -13 \\ 2 & 17 & 22 & 17 & 2 \\ 7 & 22 & 27 & 22 & 7 \\ 2 & 17 & 22 & 17 & 2 \\ -13 & 2 & 7 & 2 & -13 \end{vmatrix}$$

**(2) 7 *7 OPERATOR**

$$d : 1/196* \begin{vmatrix} -3 & -2 & -1 & 0 & 1 & 2 & 3 \\ -3 & -2 & -1 & 0 & 1 & 2 & 3 \\ -3 & -2 & -1 & 0 & 1 & 2 & 3 \\ -3 & -2 & -1 & 0 & 1 & 2 & 3 \\ -3 & -2 & -1 & 0 & 1 & 2 & 3 \\ -3 & -2 & -1 & 0 & 1 & 2 & 3 \\ -3 & -2 & -1 & 0 & 1 & 2 & 3 \end{vmatrix} \qquad e : 1/196* \begin{vmatrix} -3 & -3 & -3 & -3 & -3 & -3 & -3 \\ -2 & -2 & -2 & -2 & -2 & -2 & -2 \\ -1 & -1 & -1 & -1 & -1 & -1 & -1 \\ 0 & 0 & 0 & 0 & 0 & 0 & 0 \\ 1 & 1 & 1 & 1 & 1 & 1 & 1 \\ 2 & 2 & 2 & 2 & 2 & 2 & 2 \\ 3 & 3 & 3 & 3 & 3 & 3 & 3 \end{vmatrix}$$

$$a : 1/588* \begin{vmatrix} 5 & 0 & -3 & -4 & -3 & 0 & 5 \\ 5 & 0 & -3 & -4 & -3 & 0 & 5 \\ 5 & 0 & -3 & -4 & -3 & 0 & 5 \\ 5 & 0 & -3 & -4 & -3 & 0 & 5 \\ 5 & 0 & -3 & -4 & -3 & 0 & 5 \\ 5 & 0 & -3 & -4 & -3 & 0 & 5 \\ 5 & 0 & -3 & -4 & -3 & 0 & 5 \end{vmatrix} \qquad b : 1/588* \begin{vmatrix} 5 & 5 & 5 & 5 & 5 & 5 & 5 \\ 0 & 0 & 0 & 0 & 0 & 0 & 0 \\ -3 & -3 & -3 & -3 & -3 & -3 & -3 \\ -4 & -4 & -4 & -4 & -4 & -4 & -4 \\ -3 & -3 & -3 & -3 & -3 & -3 & -3 \\ 0 & 0 & 0 & 0 & 0 & 0 & 0 \\ 5 & 5 & 5 & 5 & 5 & 5 & 5 \end{vmatrix}$$

$$c : 1/784* \begin{vmatrix} 9 & 6 & 3 & 0 & -3 & -6 & -9 \\ 6 & 4 & 2 & 0 & -2 & -4 & -6 \\ 3 & 2 & 1 & 0 & -1 & -2 & -3 \\ 0 & 0 & 0 & 0 & 0 & 0 & 0 \\ -3 & -2 & -1 & 0 & 1 & 2 & 3 \\ -6 & -4 & -2 & 0 & 2 & 4 & 6 \\ -9 & -6 & -3 & 0 & 3 & 6 & 9 \end{vmatrix} \qquad f : 1/147* \begin{vmatrix} -7 & -2 & 1 & 2 & 1 & -2 & -7 \\ -2 & 3 & 6 & 7 & 6 & 3 & -2 \\ 1 & 6 & 9 & 10 & 9 & 6 & 1 \\ 2 & 7 & 10 & 11 & 10 & 7 & 2 \\ 1 & 6 & 9 & 10 & 9 & 6 & 1 \\ -2 & 3 & 6 & 7 & 6 & 3 & -2 \\ -7 & -2 & 1 & 2 & 1 & -2 & -7 \end{vmatrix}$$

$$d : 1/196* \begin{vmatrix} -3 & -2 & -1 & 0 & 1 & 2 & 3 \\ -3 & -2 & -1 & 0 & 1 & 2 & 3 \\ -3 & -2 & -1 & 0 & 1 & 2 & 3 \\ -3 & -2 & -1 & 0 & 1 & 2 & 3 \\ -3 & -2 & -1 & 0 & 1 & 2 & 3 \\ -3 & -2 & -1 & 0 & 1 & 2 & 3 \\ -3 & -2 & -1 & 0 & 1 & 2 & 3 \end{vmatrix} \qquad e : 1/196* \begin{vmatrix} -3 & -3 & -3 & -3 & -3 & -3 & -3 \\ -2 & -2 & -2 & -2 & -2 & -2 & -2 \\ -1 & -1 & -1 & -1 & -1 & -1 & -1 \\ 0 & 0 & 0 & 0 & 0 & 0 & 0 \\ 1 & 1 & 1 & 1 & 1 & 1 & 1 \\ 2 & 2 & 2 & 2 & 2 & 2 & 2 \\ 3 & 3 & 3 & 3 & 3 & 3 & 3 \end{vmatrix}$$

**5 *5 OPERATOR**

$$Zx : 1/50 * \begin{vmatrix} -2 & -1 & 0 & 1 & 2 \\ -2 & -1 & 0 & 1 & 2 \\ -2 & -1 & 0 & 1 & 2 \\ -2 & -1 & 0 & 1 & 2 \\ -2 & -1 & 0 & 1 & 2 \end{vmatrix} \qquad Zy : 1/50 * \begin{vmatrix} -2 & -2 & -2 & -2 & -2 \\ -1 & -1 & -1 & -1 & -1 \\ 0 & 0 & 0 & 0 & 0 \\ 1 & 1 & 1 & 1 & 1 \\ 2 & 2 & 2 & 2 & 2 \end{vmatrix}$$

$$Zxx : 1/35 * \begin{vmatrix} 2 & -1 & -2 & -1 & 2 \\ 2 & -1 & -2 & -1 & 2 \\ 2 & -1 & -2 & -1 & 2 \\ 2 & -1 & -2 & -1 & 2 \\ 2 & -1 & -2 & -1 & 2 \end{vmatrix} \qquad Zyy : 1/35 * \begin{vmatrix} 2 & 2 & 2 & 2 & 2 \\ -1 & -1 & -1 & -1 & -1 \\ -2 & -2 & -2 & -2 & -2 \\ -1 & -1 & -1 & -1 & -1 \\ 2 & 2 & 2 & 2 & 2 \end{vmatrix}$$

$$Zxy : 1/100 * \begin{vmatrix} 4 & 2 & 0 & -2 & -4 \\ 2 & 1 & 0 & -1 & -2 \\ 0 & 0 & 0 & 0 & 0 \\ -2 & -1 & 0 & 1 & 2 \\ -4 & -2 & 0 & 2 & 4 \end{vmatrix}$$

**7 *7 OPERATOR**

$$Zx : 1/196 * \begin{vmatrix} -3 & -2 & -1 & 0 & 1 & 2 & 3 \\ -3 & -2 & -1 & 0 & 1 & 2 & 3 \\ -3 & -2 & -1 & 0 & 1 & 2 & 3 \\ -3 & -2 & -1 & 0 & 1 & 2 & 3 \\ -3 & -2 & -1 & 0 & 1 & 2 & 3 \\ -3 & -2 & -1 & 0 & 1 & 2 & 3 \\ -3 & -2 & -1 & 0 & 1 & 2 & 3 \end{vmatrix} \qquad Zy : 1/196 * \begin{vmatrix} -3 & -3 & -3 & -3 & -3 & -3 & -3 \\ -2 & -2 & -2 & -2 & -2 & -2 & -2 \\ -1 & -1 & -1 & -1 & -1 & -1 & -1 \\ 0 & 0 & 0 & 0 & 0 & 0 & 0 \\ 1 & 1 & 1 & 1 & 1 & 1 & 1 \\ 2 & 2 & 2 & 2 & 2 & 2 & 2 \\ 3 & 3 & 3 & 3 & 3 & 3 & 3 \end{vmatrix}$$

$$Zxx : 1/294 * \begin{vmatrix} 5 & 0 & -3 & -4 & -3 & 0 & 5 \\ 5 & 0 & -3 & -4 & -3 & 0 & 5 \\ 5 & 0 & -3 & -4 & -3 & 0 & 5 \\ 5 & 0 & -3 & -4 & -3 & 0 & 5 \\ 5 & 0 & -3 & -4 & -3 & 0 & 5 \\ 5 & 0 & -3 & -4 & -3 & 0 & 5 \\ 5 & 0 & -3 & -4 & -3 & 0 & 5 \end{vmatrix} \qquad Zyy : 1/294 * \begin{vmatrix} 5 & 5 & 5 & 5 & 5 & 5 & 5 \\ 0 & 0 & 0 & 0 & 0 & 0 & 0 \\ -3 & -3 & -3 & -3 & -3 & -3 & -3 \\ -4 & -4 & -4 & -4 & -4 & -4 & -4 \\ -3 & -3 & -3 & -3 & -3 & -3 & -3 \\ 0 & 0 & 0 & 0 & 0 & 0 & 0 \\ 5 & 5 & 5 & 5 & 5 & 5 & 5 \end{vmatrix}$$

$$Zxy : 1/784 * \begin{vmatrix} 9 & 6 & 3 & 0 & -3 & -6 & -9 \\ 6 & 4 & 2 & 0 & -2 & -4 & -6 \\ 3 & 2 & 1 & 0 & -1 & -2 & -3 \\ 0 & 0 & 0 & 0 & 0 & 0 & 0 \\ -3 & -2 & -1 & 0 & 1 & 2 & 3 \\ -6 & -4 & -2 & 0 & 2 & 4 & 6 \\ -9 & -6 & -3 & 0 & 3 & 6 & 9 \end{vmatrix}$$

FIG. 7

CLASS 1
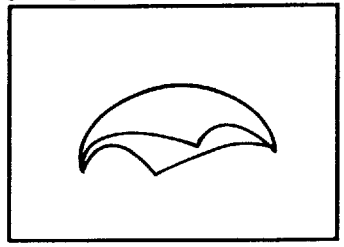
K > 0 AND H < 0
NEGATIVE ELLIPTICAL POINT
CLASS 2
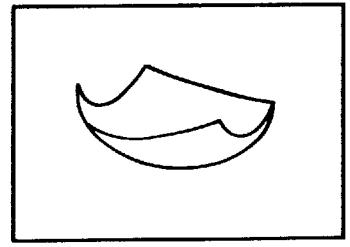
K > 0 AND H > 0
POSITIVE ELLIPTICAL POINT
CLASS 3
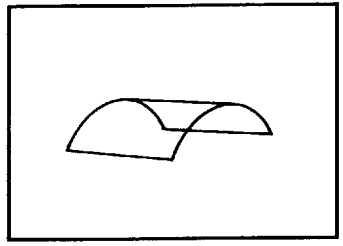
K = 0 AND H < 0
NEGATIVE PARABOLIC POINT
CLASS 4
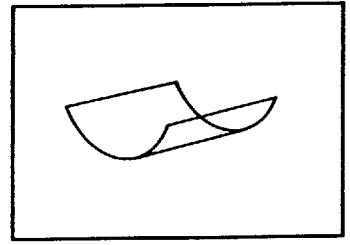
K = 0 AND H > 0
POSITIVE PARABOLIC POINT
CLASS 5
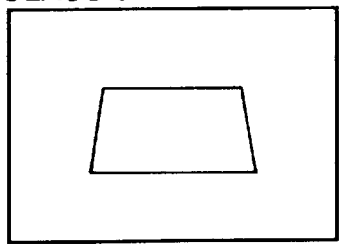
K = 0 AND H = 0
FLAT POINT
CLASS 6
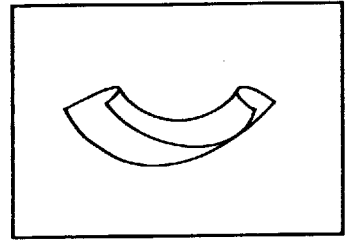
K < 0 AND H = 0
MINIMUM POINT
CLASS 7
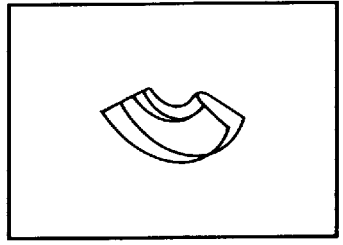
K < 0 AND H < 0
NEGATIVE HYPERBOLIC POINT
CLASS 8
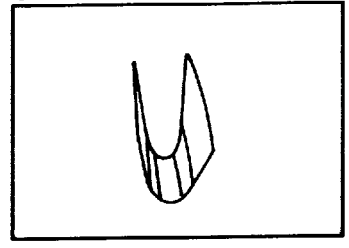
K < 0 AND H > 0
POSITIVE HYPERBOLIC POINT
FIG. 9

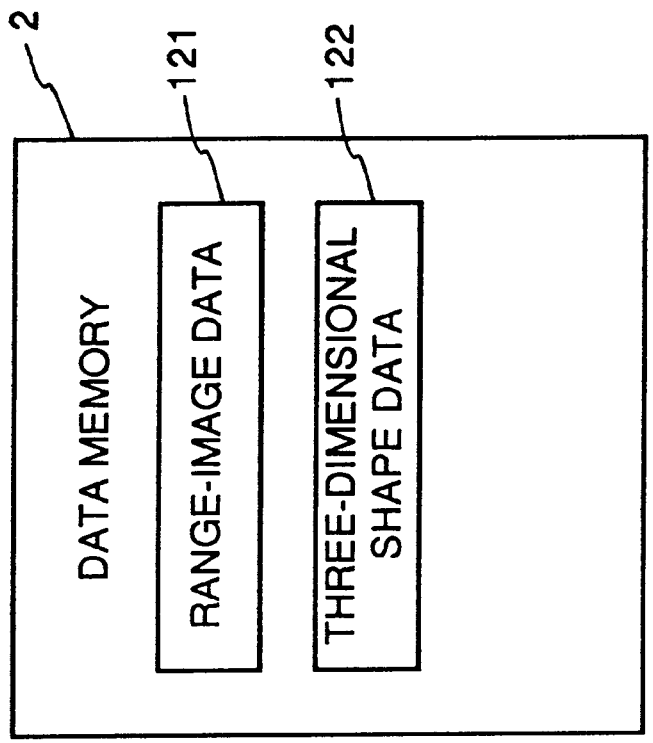
F I G. 10 (b)
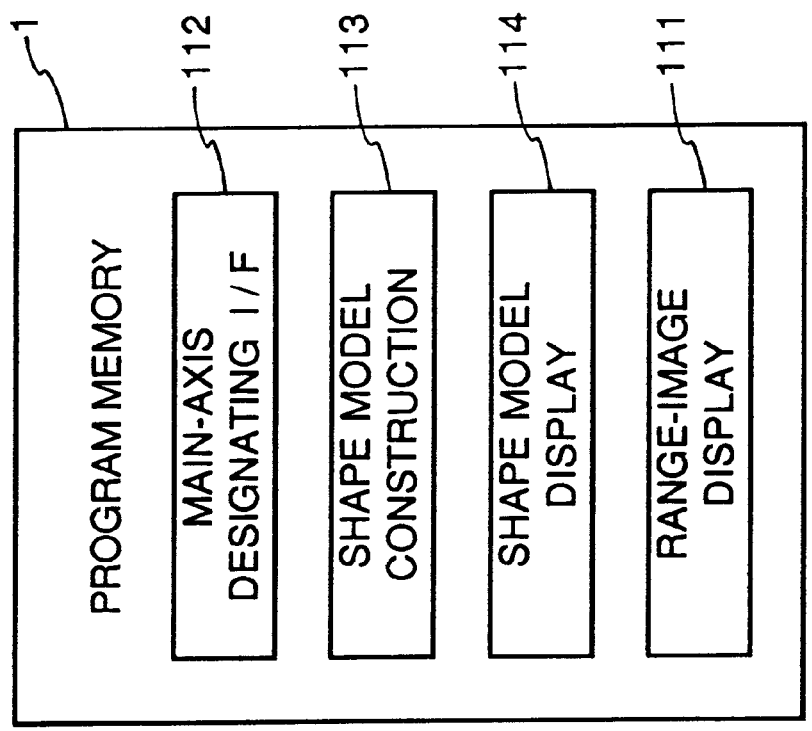
F I G. 10 (a)

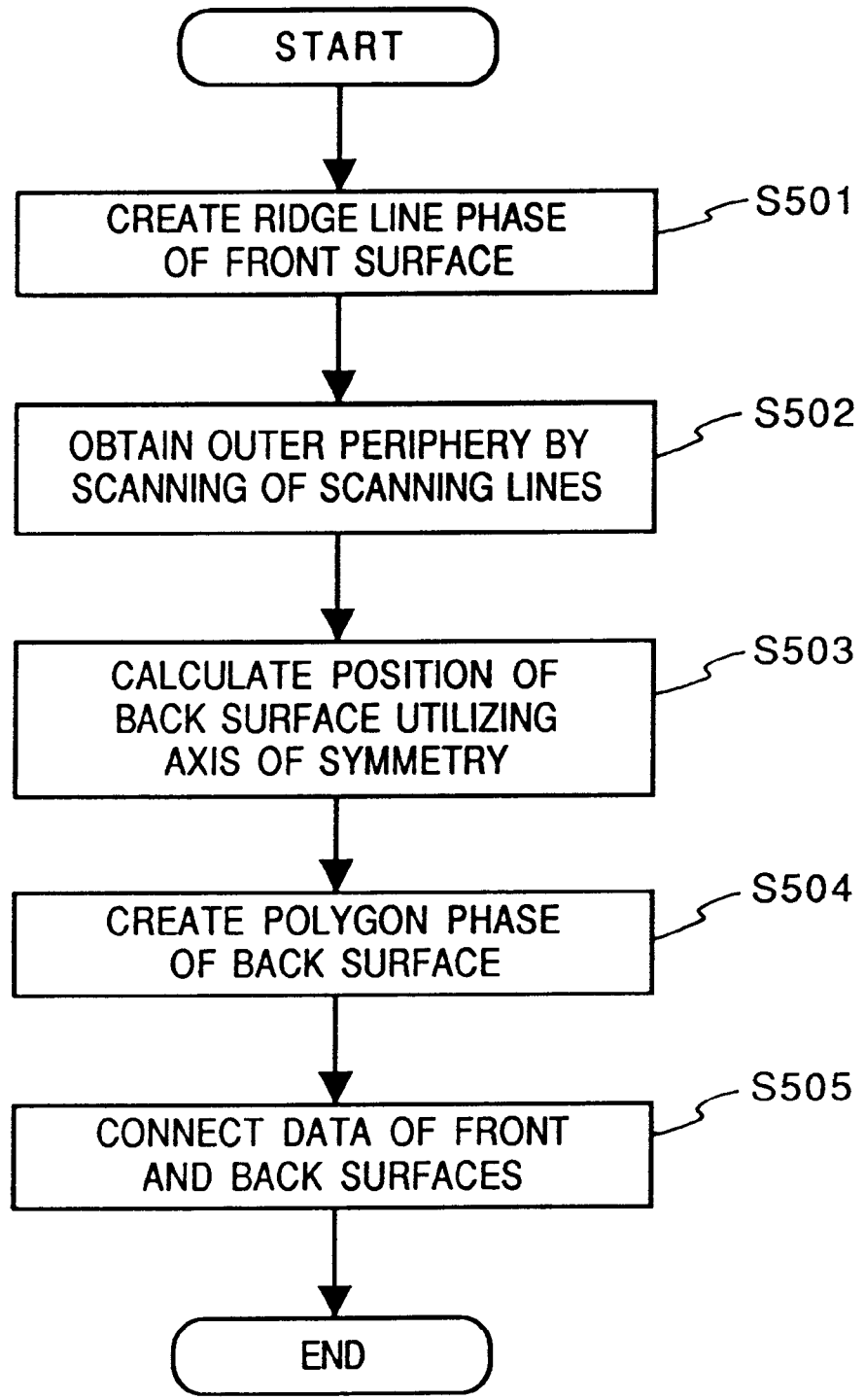
F I G. 13

```
polygon
vertices
    components = x y z normal-x normal-y normal-z
    number = 8
            -1.0  -1.0  -1.0  -0.57735  -0.57735  -0.57735
             1.0  -1.0  -1.0   0.57735  -0.57735  -0.57735
             1.0   1.0  -1.0   0.57735   0.57735  -0.57735
            -1.0   1.0  -1.0  -0.57735   0.57735  -0.57735
            -1.0  -1.0   1.0  -0.57735  -0.57735   0.57735
             1.0  -1.0   1.0   0.57735  -0.57735   0.57735
             1.0   1.0   1.0   0.57735   0.57735   0.57735
            -1.0   1.0   1.0  -0.57735   0.57735   0.57735
face
            4  0  1  2  3
            4  1  5  6  2
            4  5  4  7  6
            4  4  0  3  7
            4  4  5  1  0
            4  3  2  6  7
endpolygon
```
F I G. 14 (a)
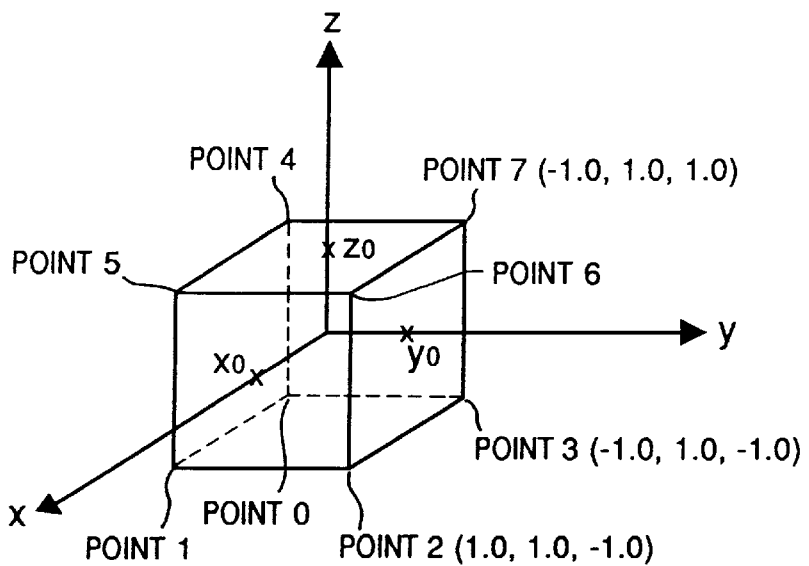
F I G. 14 (b)

```
if(depth (p-1, n) == background AND depth(p, n) == object)
        regist depth(p, n) as CONTOUR;         / * step 502 */

/* set binary 1, if depth(x, y) is object */
/* set binary 0, if depth(x, y) is background */
/* arrange flag according to depth (p, n) depth(p, n+1) depth(p+1, n) depth(p+1, n+1) order */
/* regist(ind() ind() ind()) means set point index */
switch(flag) {
        case 1111; /* depth(p, n) depth(p, n+1) depth(p+1, n) depth(p+1, n+1) */
                regist(ind(p, n) ind(p, n+1) ind(p+1, n))
                regist(ind(p+1, n+1) ind(p+1, n) ind(p, n+1))
                break;
        case 1110;
                regist(ind(p, n) ind(p, n+1) ind(p+1, n))
                break;
        case 1101;
                regist(ind(p, n) ind(p, n+1) ind(p+1, n+1))
                break;
        case 1011;
                regist(ind(p, n) ind(p+1, n+1) ind(p+1, n))
                break;
        case 0111;
                regist(ind(p+1, n+1) ind(p+1, n) ind(p, n+1))
                break;

case 1100;
        case 1010;
        case 1001;
        case 1000;
        case 0110;
        case 0101;
        case 0100;
        case 0011;
        case 0010;
        case 0001;
        case 0000;
                do not regist;
```

FIG. 17

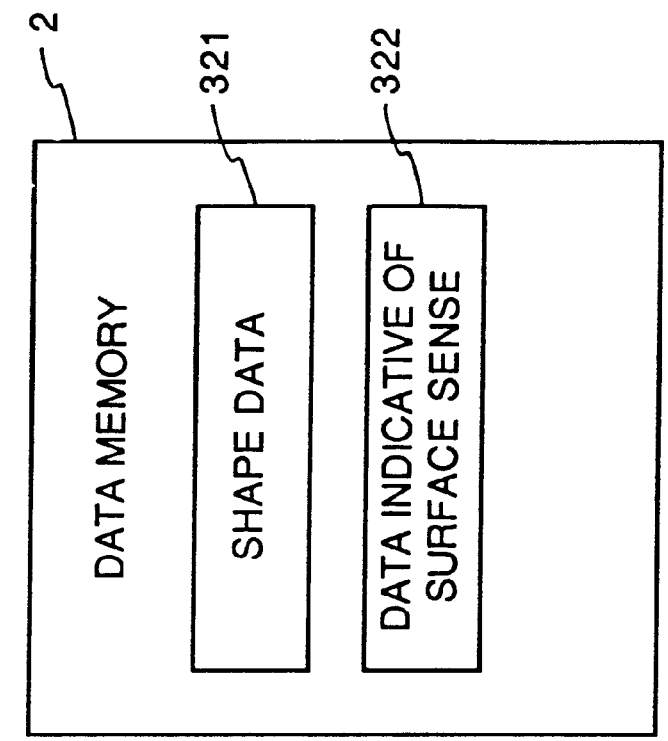
F I G. 18 (b)
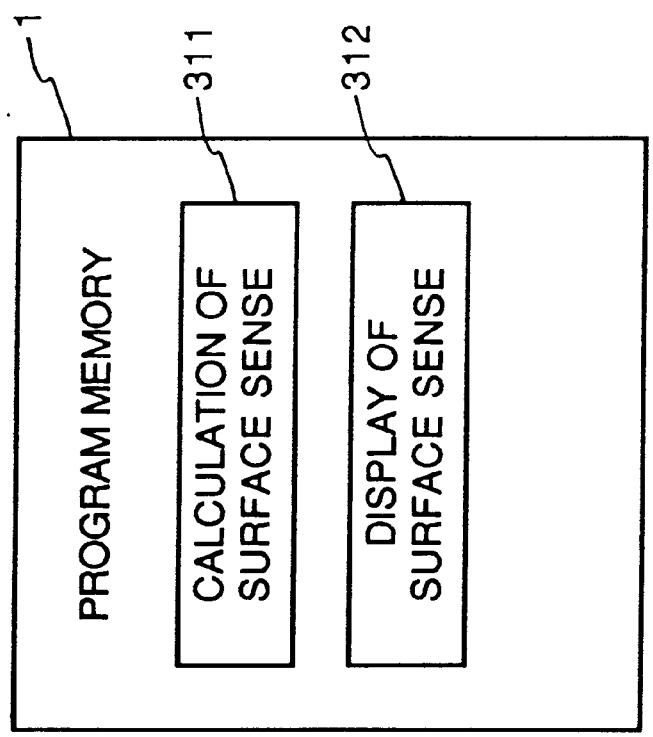
F I G. 18 (a)

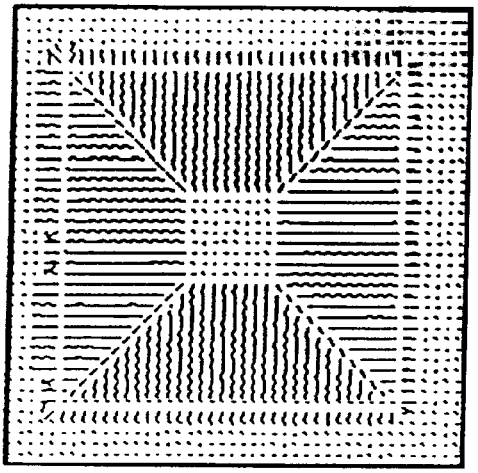
F I G. 20(a)
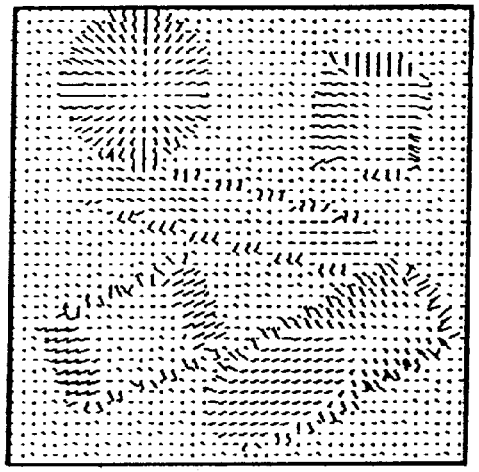
F I G. 20(b)
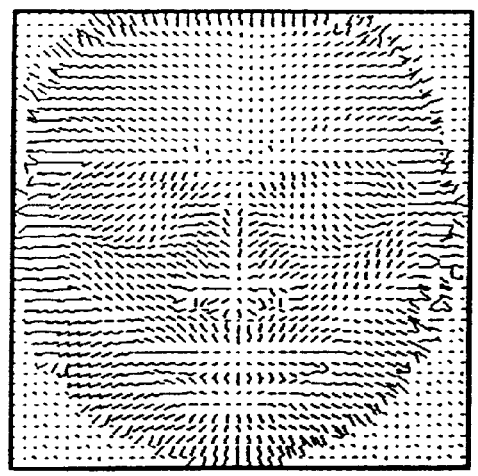
F I G. 20(c)

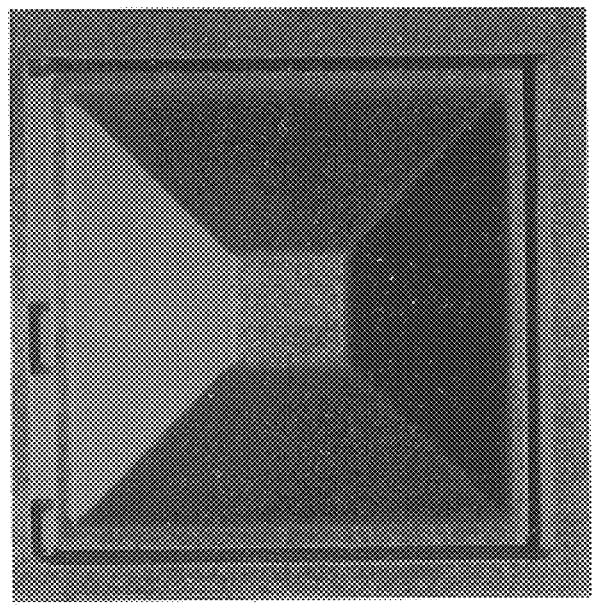
F I G. 21B(a)
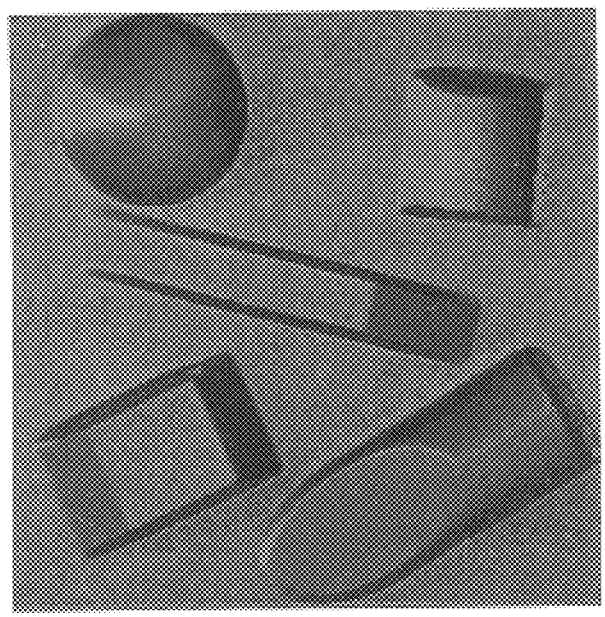
F I G. 21B(b)

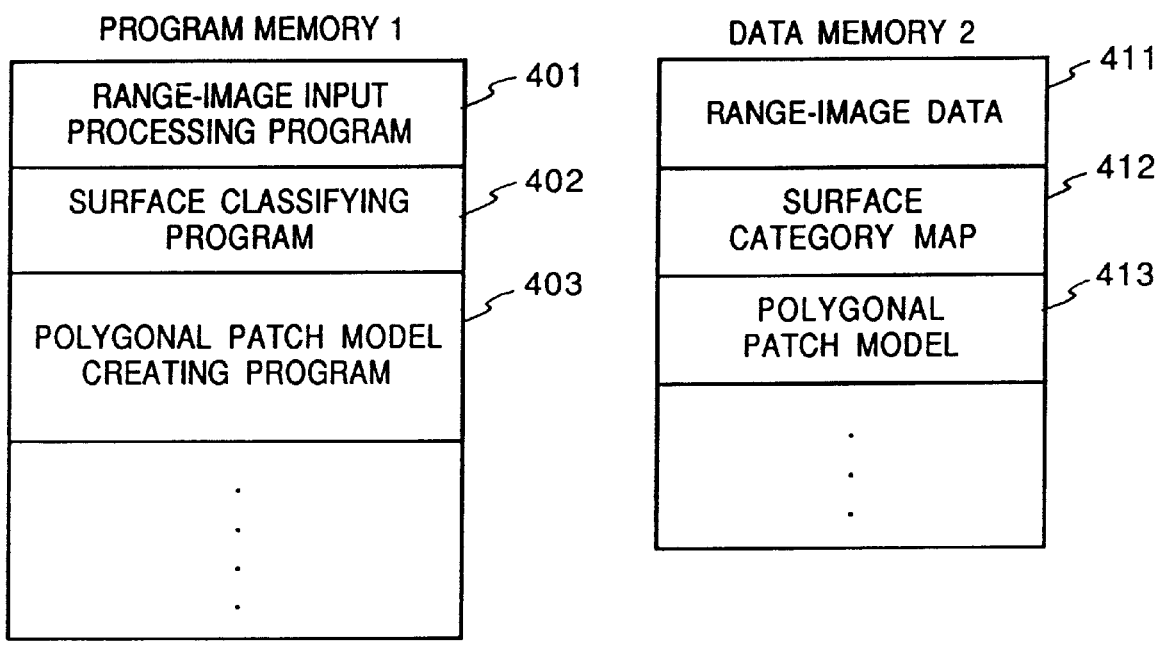
F I G. 23 (a)   F I G. 23 (b)

| CLASS | SURFACE CATEGORY |
|---|---|
| 1 | NEGATIVE ELLIPTICAL SURFACE |
| 2 | POSITIVE ELLIPTICAL SURFACE |
| 3 | NEGATIVE PARABOLIC SURFACE |
| 4 | POSITIVE PARABOLIC SURFACE |
| 5 | FLAT SURFACE |
| 6 | MINIMUM SURFACE |
| 7 | NEGATIVE PARABOLIC SURFACE |
| 8 | POSITIVE PARABOLIC SURFACE |

FIG. 26

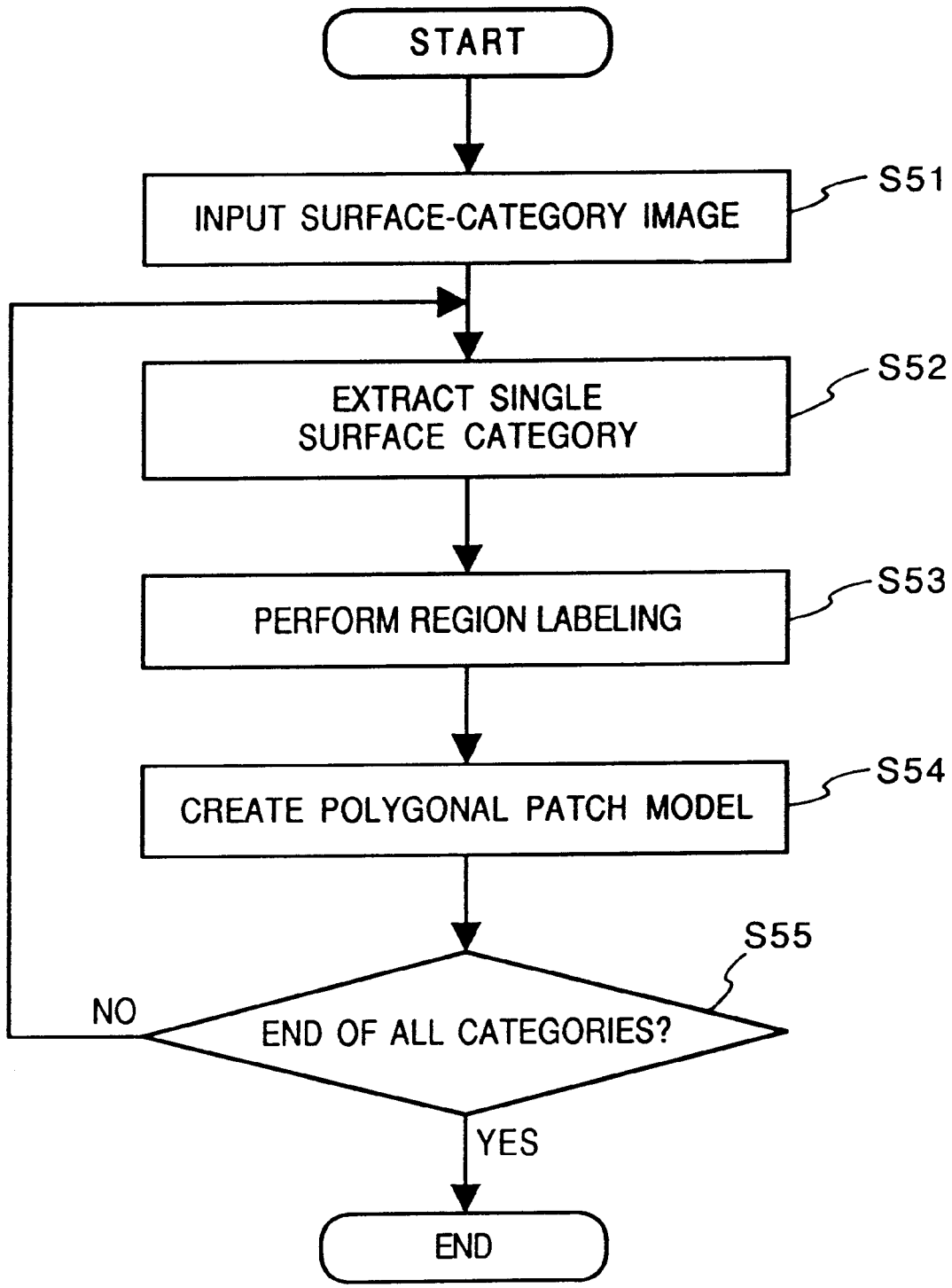
F I G. 27

```
    5555
1 1 1 1 5 5 5 5 4 4 4
1 1 1 1 5 5 5 5 4 4 4
1 1 1 1 5 5 5 5 4 4 4
1 1 1 1 1 1 1 1 4 4 4
1 1 1 1 1 1 1 1 4 4 4
1 1 1 5 5 5 5 5 4 4 4
1 1 1 5 5 5 5 5 4 4 4
1 1 1 5 5 5 5 5 4 4 4
1 1 1 5 5 5 5 5 4 4 4
```

F I G. 28 (a)

```
    5555
    5555
    5555
    5555

55555
   55555
   55555
   55555
```

F I G. 28 (b)

```
    1111
    1111
    1111
    1111

22222
   22222
   22222
   22222
```

F I G. 28 (c)

```
    1111
    1  1
    1  1
    1111

22222
   2   2
   2   2
   22222
```

F I G. 28 (d)

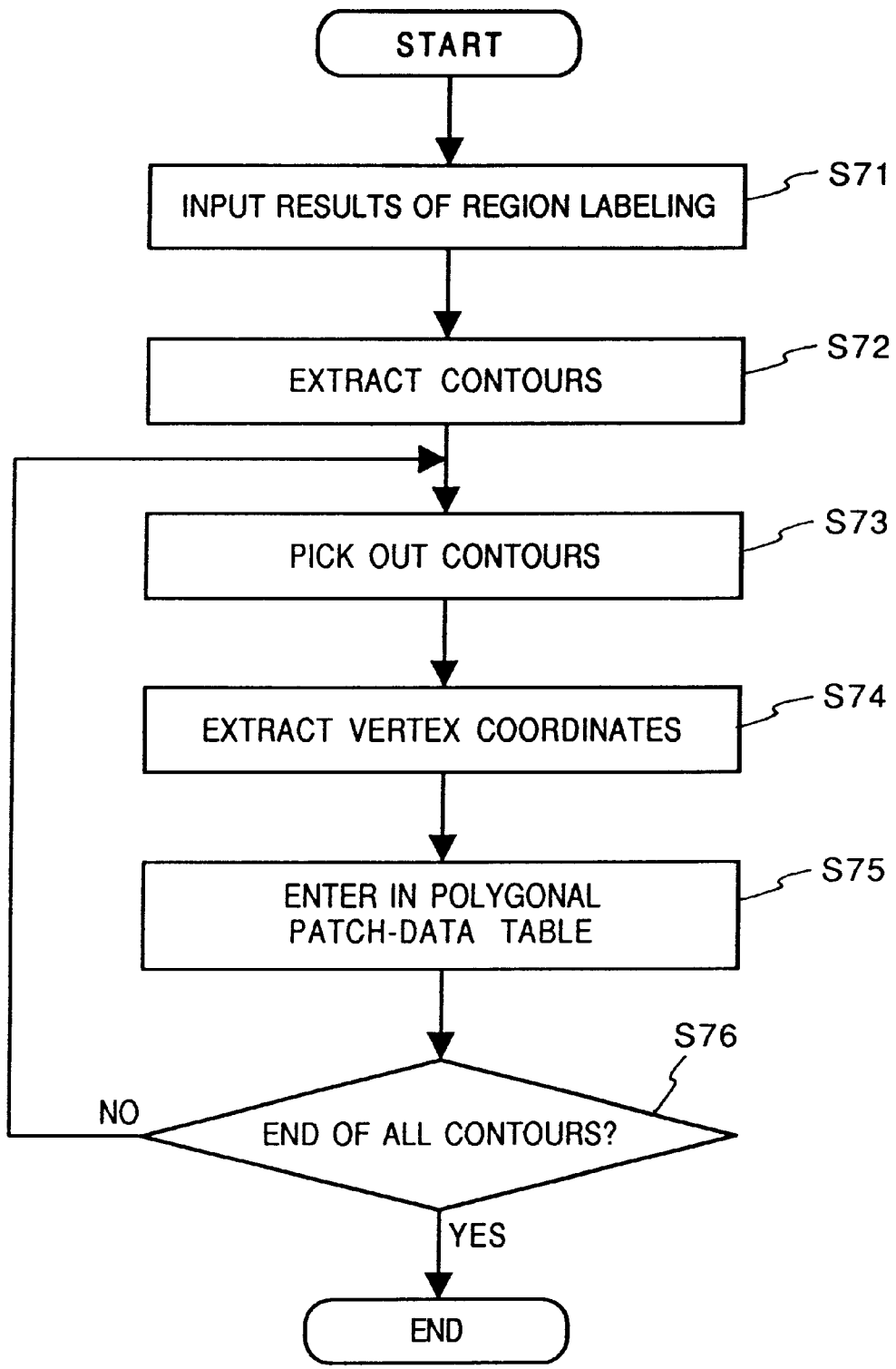
F I G. 29

VERTEX INFORMATION

| SURFACE-CATEGORY NUMBER | REGION NUMBER | VERTEX NUMBER | X COORDINATE | Y COORDINATE | Z COORDINATE |
|---|---|---|---|---|---|
| 5 | 1 | 1 | 0.253 | 3.21 | -5.13 |
| 5 | 1 | 2 | 0.321 | 3.35 | -5.00 |
| 5 | 1 | 3 | 0.350 | 3.50 | -4.50 |
| 5 | 1 | 4 | ----- | ----- | ----- |
| 5 | 1 | ----- | | | |
| | 2 | 1 | | | |
| | | 2 ---- | | | |
| 6 | 1 | 1 | | | |
| | 1 | 2 ---- | | | |

FIG. 30 (a)

PHASE INFORMATION

| SURFACE-CATEGORY NUMBER | REGION NUMBER | POLYGON NUMBER | VERTICES |
|---|---|---|---|
| 5 | 1 | 1 | 1 2 3 4 5 6 |
| | 2 | 2 | 1 2 3 4 |

FIG. 30 (b)

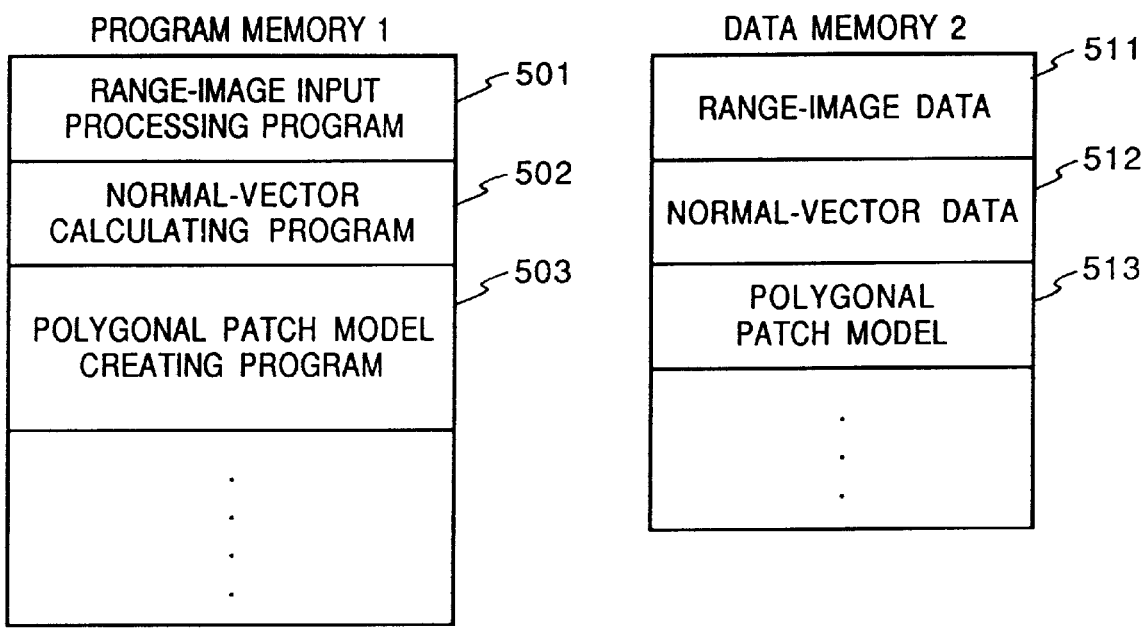
F I G. 32 (a)    F I G. 32 (b)

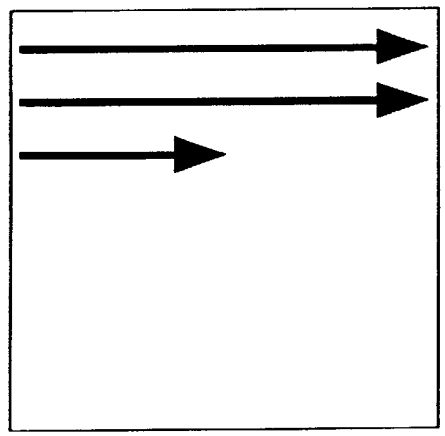
F I G. 35
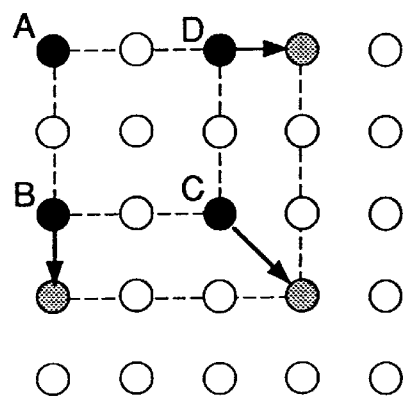
F I G. 36
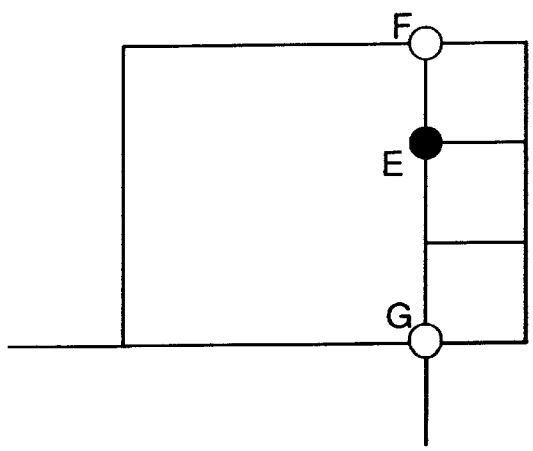
F I G. 37

```
polygon                      / * declaration of polygon data * /
vertices                     / * vertex information follows * /
    components=x y z normal-x normal-y normal-z
                             / * attributes of each vertex
                                 always possesses three-dimensional
                                 coordinate values x, y, z
                                 if it possesses normal vector, declare here * / number=584               / * number of vertices contiguous to following * /

( 78.00   30.00  -61.80  -0.297  -0.954  -0.031 ) / * vertex number 1 * /
  ( 78.00   33.00  -68.29  -0.545  -0.733  -0.407 ) / * vertex number 2 * /
  ( 81.00   33.00  -71.14  -0.376  -0.739  -0.559 ) / * vertex number 3 * /
  ( 81.00   30.00  -66.75  -0.488  -0.740  -0.464 ) / *                   * /
  ( 84.00   33.00  -72.58  -0.241  -0.711  -0.661 )
  ( 84.00   30.00  -69.12  -0.342  -0.733  -0.588 )
  ( 87.00   33.00  -73.26  -0.085  -0.681  -0.727 )

( 81.00  111.00  -67.23  -0.421   0.767  -0.484 )
  ( 84.00  111.00  -69.85  -0.404   0.780  -0.477 ) / *                   * /
  ( 87.00  111.00  -72.17   0.199   0.979  -0.040 ) / * vertex number 583 * /
  ( 90.00  111.00  -73.98  -0.007   1.000  -0.022 ) / * vertex number 584 * / connectivity                 / * phase information follows * /
components = variable. i
  ( 4   1   2   3    4 )     / * number of vertices constituting one
  ( 4   4   3   5    6 )         polygon and series of vertex numbers
  ( 4   6   5   7    8 )         thereof
  ( 4   8   7   9   10 )
  ( 4  11  12  13    2 )
  ( 4   2  13  14    3 )
  ( 4   3  14  15    5 )
  ( 4   5  15  16    7 )
  ( 4   7  16  17    9 )
  ( 4   9  17  18   19 )

( 4 573 581 582  574 )
  ( 4 574 582 583  575 )
  ( 4 575 583 584  576 )
endpolygon                   / * end of polygon data * /
```

FIG. 38

```
polygon                          /* declaration of polygon data */
vertices                         /* vertex information */
   components=x y z normal-x normal-y normal-z
                                 /* vertex attributes, coordinate values
                                    + normal information */
   number=8                      /* number of vertices */
   (-1.0  -1.0  -1.0   -0.57735  -0.57735  -0.57735 )  /* vertex number 1 */
   ( 1.0  -1.0  -1.0    0.57735  -0.57735  -0.57735 )  /* vertex number 2 */
   ( 1.0   1.0  -1.0    0.57735   0.57735  -0.57735 )
   (-1.0   1.0  -1.0   -0.57735   0.57735  -0.57735 )
   (-1.0  -1.0   1.0   -0.57735  -0.57735   0.57735 )
   ( 1.0  -1.0   1.0    0.57735  -0.57735   0.57735 )
   ( 1.0   1.0   1.0    0.57735   0.57735   0.57735 )
   (-1.0   1.0   1.0    0.57735   0.57735   0.57735 )
connectivity                     /* phase information */
   components = variable. i
   ( 4  1  2  3  4 )             /* number of vertices contituting one polygon
   ( 4  2  6  7  3 )                and series of vertex numbers thereof
   ( 4  6  5  8  7 )
   ( 4  5  1  4  8 )
   ( 4  5  6  2  1 )
   ( 4  4  3  7  8 )
endpolygon                       /* end of polygon data */
```

FIG. 41

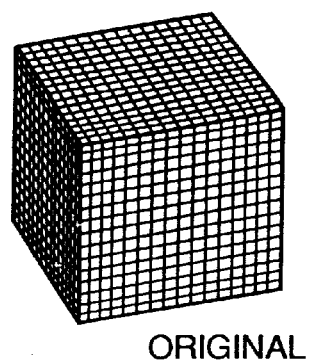
F I G. 42 (a)
ORIGINAL
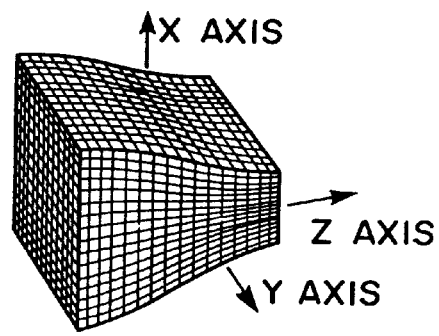
F I G. 42 (b)
TAPERING ALONG Z AXIS
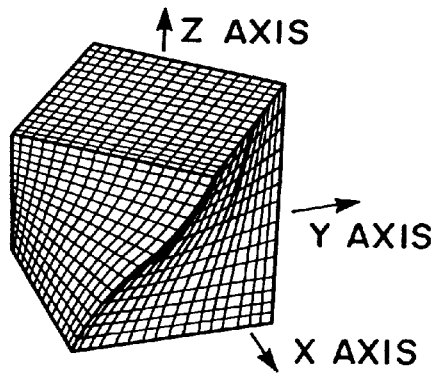
F I G. 42 (c)
TWISTING ALONG Z AXIS
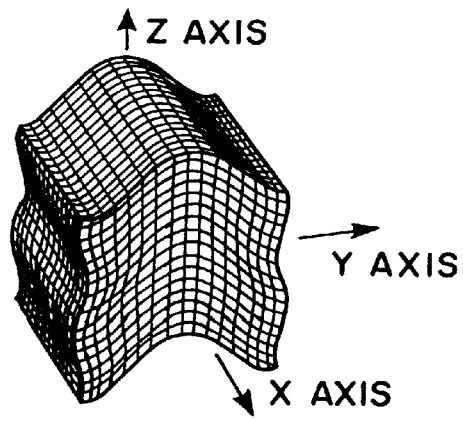
F I G. 42 (d)
BENDING ALONG Y AXIS

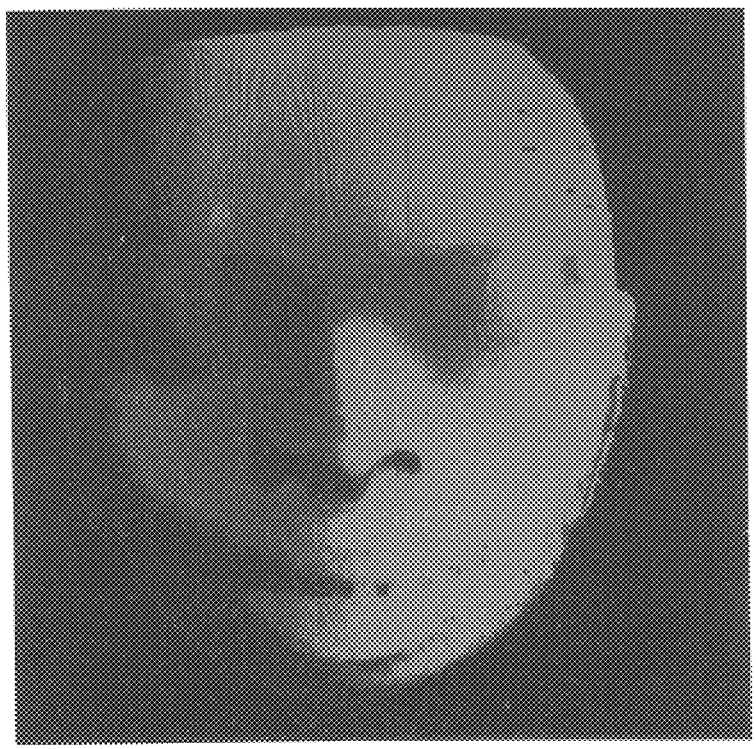
3-D RENDERING OF ORIGINAL DATA
FIG. 43A(a)
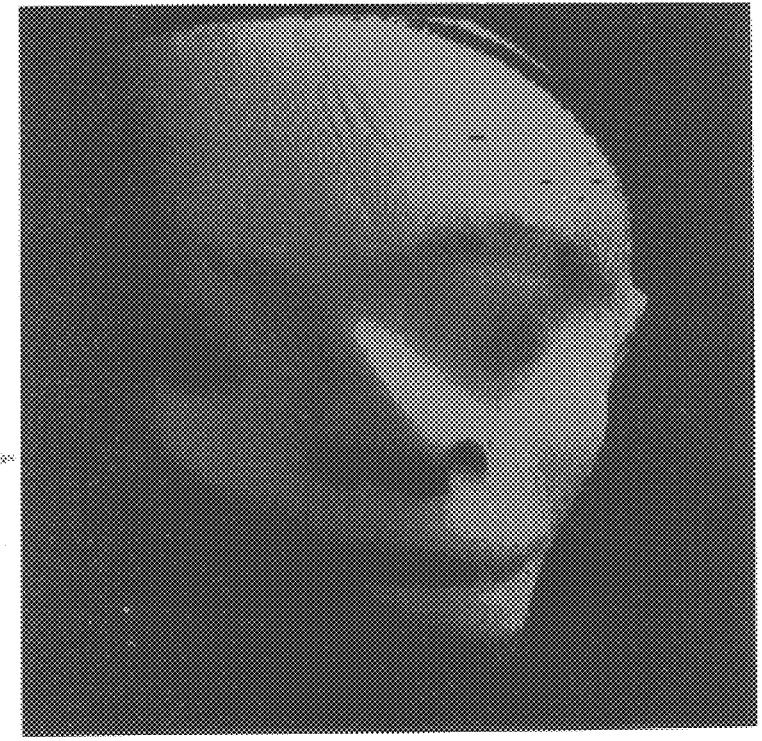
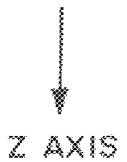
Z AXIS
RENDERING OF OBJECT SUBJECTED TO
TAPERING AND TWISTING ALONG Z AXIS
FIG. 43A(b)

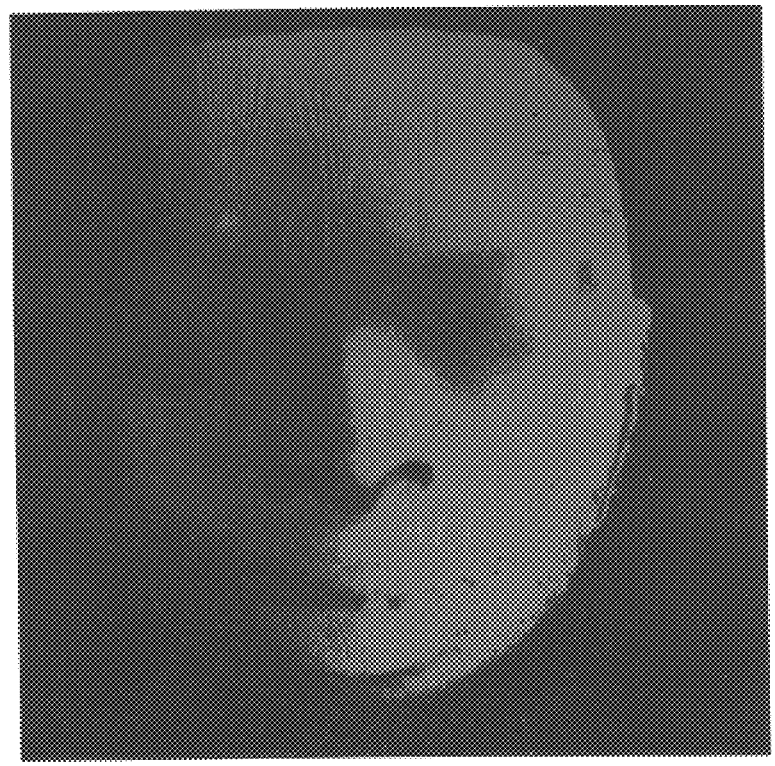
F I G. 43B(a)
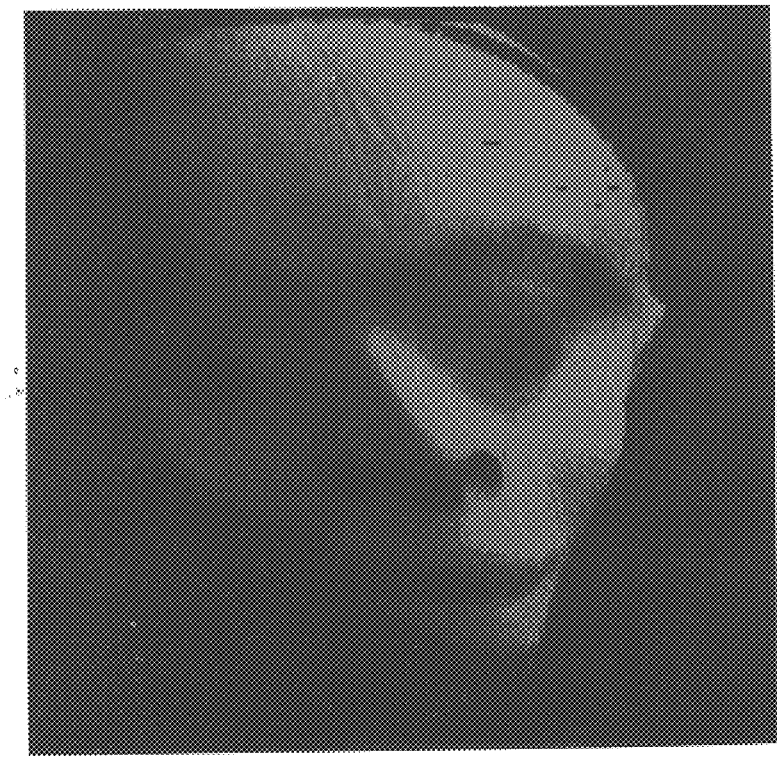
F I G. 43B(b)

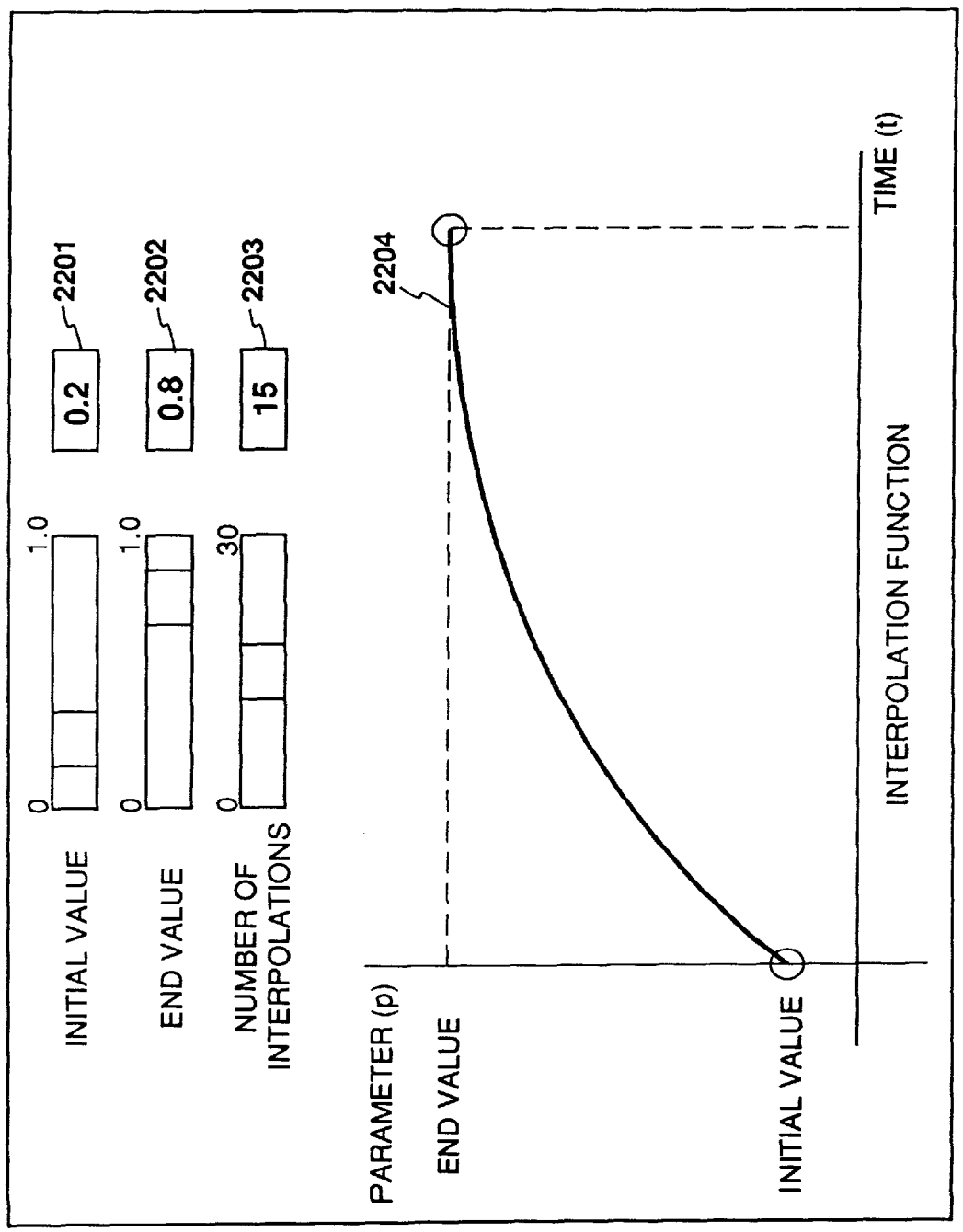
F I G. 44

```
if(depth (p-1, n) == background AND depth(p, n) == object)
        regist depth(p, n) as CONTOUR;

if(depth (p+1, n) == background AND depth(p, n) == object)
        regist depth(p, n) as CONTOUR;           / * step    */

/* set binary 1, if depth(x, y) is object */
/* set binary 0, if depth(x, y) is background */
/* arrange flag according to depth (p, n) depth(p, n+x) depth(p+x, n) depth(p+x, n+x) order */
/* regist(ind() ind() ind()) means set point index */
switch(flag) {
        case 1111;/* depth(p, n) depth(p, n+x) depth(p+x, n) depth(p+x, n+x) */
                regist(ind(p, n) ind(p, n+x) ind(p+x, n))
                regist(ind(p+x, n+x) ind(p+x, n) ind(p, n+x))
                break;
        case 1110;
                regist(ind(p, n) ind(p, n+x) ind(p+x, n))
                break;
        case 1101;
                regist(ind(p, n) ind(p, n+x) ind(p+x, n+x))
                break;
        case 1011;
                regist(ind(p, n) ind(p+x, n+x) ind(p+x, n))
                break;
        case 0111;
                regist(ind(p+x, n+x) ind(p+x, n) ind(p, n+x))
                break;

case 1100;
        case 1010;
        case 1001;
        case 1000;
        case 0110;
        case 0101;
        case 0100;
        case 0011;
        case 0010;
        case 0001;
        case 0000;
                do not regist;
```

FIG. 45

THREE-DIMENSIONAL MODEL PROCESSING METHOD, AND APPARATUS THEREFOR

This application is a continuation of application Ser. No. 07/924,628, filed Aug. 4, 1992, now abandoned.

BACKGROUND OF THE INVENTION

1. Field of the Invention

This invention relates to a three-dimensional model processing method and apparatus for forming a three-dimensional model of an object, editing the model, adding shading or the like and displaying the model, without relying upon the data format of inputted three-dimensional data.

2. Description of the Related Art

Various three-dimensional model processing apparatus have been disclosed heretofore. In one example of such an apparatus, three-dimensional position data indicative of the surface of an actual object such as a clay model are entered by a contacting-type three-dimensional coordinate measuring unit such as a three-dimensional digitizer, and a three-dimensional model is created from the entered three-dimensional data. In another example, the aforementioned three-dimensional position data are entered by a space-sectioning type three-dimensional measuring unit and a three-dimensional model is created from these three-dimensional data.

A three-dimensional model processing apparatus of this kind makes it possible to create a three-dimensional model from three-dimensional data.

In accordance with the conventional three-dimensional model processing apparatus, however, the three-dimensional data are entered in a data format that is dependent upon the three-dimensional measuring unit, and therefore a three-dimensional model cannot be created by processing three-dimensional data having a different data format. In addition, once a three-dimensional model has been created, the three-dimensional data cannot be converted into three-dimensional data having another format.

Several specific examples will now be described.

A range-image processing method, in which a range image is the object of processing and information indicating the characteristics of the surface shape of a three-dimensional object in the image is detected, is described in "A Hybrid Approach to Range Image Segmentation Based on Differential Geometry" by Naokazu Yokoya and Martin D. Levine, Joho Shori Gakkai Ronbunshi, Vol. 30, No. 8, pp. 944~953 (1989).

In this conventional technique for processing range images, however, the relationship between the coordinate system in which an object is placed and the coordinate system of the image is not defined, and it is necessary to give parameters such as the aspect ratio along each of the coordinate axes each time processing is performed.

Various types of non-contacting arrangements have been attempted. For example, there is a method of measuring the time of flight of light or a method in which distance data are inputted by a three-dimensional measuring unit such as a range finder based upon triangulation, and a three-dimensional model is created from the three-dimensional data obtained.

In a three-dimensional model creating apparatus which utilizes such a three-dimensional measuring unit, an input sensor is directed with respect to the object to be entered, and points not concealed by other objects can be inputted accurately. However, a drawback is that distance data regarding portions in back of the input sensor and points that are concealed cannot be inputted.

In an effort to eliminate this drawback, a three-dimensional model is obtained by either of the following methods in the prior art: (1) The sensor is fixed and the object is revolved about a main axis, in synchronization with which a range image is measured. (2) The sensor is revolved about the object, in synchronization with which a range image is measured.

However, both of these methods require a mechanism for revolving the object or the sensor. In addition, it is not easy to reconstruct a three-dimensional shape by judging corresponding pixels of a plurality of range images.

In general, when an image in which an object in three-dimensional space is projected into two-dimensional space is outputted, shading is applied. Then, when the image is displayed, for example, images in which the object is seen from a plurality of directions are displayed in continuous fashion, whereby the orientation of the object surface is outputted so that the object in three-dimensional space is expressed in two-dimensional space.

With this conventional method, however, the entirety of the surface shape of the object in a certain three-dimensional space cannot always be outputted in the form of a single two-dimensional image.

In another example of a conventional three-dimensional model processing apparatus, it has been attempted to input three-dimensional coordinate data indicative of the surface of an object by a three-dimensional coordinate measuring unit such as a laser range finder, and create a three-dimensional model by triangular patches in which all of the three-dimensional coordinate data serve as the vertices. Alternatively, it has been attempted to create a three-dimensional model based upon triangular patches in which some of the original data are adopted as the vertices, as by widening the spacing between neighboring points of the three-dimensional coordinates serving as the vertices. A three-dimensional model is capable of being created from three-dimensional data in a three-dimensional model processing apparatus of this kind.

Further, in another example of a conventional three-dimensional model processing apparatus, it has been attempted to input three-dimensional data, which are indicative of the surface of an actual object such as a clay model, by a contacting-type three-dimensional measuring unit such as a three-dimensional digitizer, and create a three-dimensional model from these three-dimensional data. Further, it has been attempted to enter the three-dimensional position data by a space-sectioning type three-dimensional measuring unit and create a three-dimensional model from these three-dimensional data.

In addition, attempts have been to utilize the obtained three-dimensional objects in various animation or CAD/CAM techniques.

With the conventional three-dimensional model processing apparatus, however, the three-dimensional model is created by selecting representative points uniformly over the entire area of the object surface from the three-dimensional coordinate data of the object surface inputted by the three-dimensional coordinate measuring unit such as the aforementioned laser range finder, and creating the model based upon polygonal patches in which the uniform representative points serve as the vertices. A problem which arises is that the amount of data representing the model becomes extremely large when it is attempted to raise accuracy.

The amount of data can be reduced somewhat in the case of the three-dimensional model created by the triangular patches in which some of the data serve as the vertices, wherein the spacing between neighboring points of the three-dimensional coordinates serving as the vertices is widened. However, at complicated portions or curved surfaces where the shape is highly irregular, the surface of the object cannot be described correctly. On the other hand, the vertices of polygonal patches are placed at intervals equal to those of other portions even in large planar areas, and therefore unneeded data also is present.

Further, if it is desired to create 3-D animation video, in the prior art, this is possible only when a specialist or a CG animator utilizes an expensive system. An amateur encounters great difficulty when describing the modeling and moving of 3-D shapes. These systems can be utilized effectively only by relying upon manual operations or the artistic expertise of craftsmen, and many operations, such as modeling and the designation of motion, cannot be performed automatically.

SUMMARY OF THE INVENTION

An object of the present invention is to make possible the creation of three-dimensional models, the editing thereof and the display of such models with added shadows, irrespective of the kind of three-dimensional data entered in different formats.

Another object of the present invention is to make it possible to convert the data of a three-dimensional model that has been created into a three-dimensional model having another format.

By way of example, by providing a step of converting the type of a range image and normalizing each axis, pixel values are calculated in conformity with the type of data, which is given for each pixel of an inputted range image, using parameters such as aspect ratio along each axis of the coordinate system.

A further object of the present invention is to provide a three-dimensional model creating method and apparatus in which it is possible to provide shape data of an unknown portion on the basis of a range image obtained from one direction.

More specifically, with regard to an object having axial symmetry, the user designates the axis of symmetry interactively with respect to an image whose distance is measured from one direction, and already existing position information is utilized to interpolate data, thereby constructing a three-dimensional model to obtain a three-dimensional model over the entire surface of the object.

Still another object of the present invention is to provide an image output method and apparatus in which the entirety of the surface shape of an object in three-dimensional space is expressed by an output of a single two-dimensional image from a certain direction.

More specifically, the direction of the object surface at each point is calculated from shape data inputted from a three-dimensional shape input unit, a three-dimensional data creating unit or a three-dimensional shape data base, and information possessed by surface-direction data or the method of symbolization is displayed while being selected in dialog fashion in conformity with the user's objectives.

A further object of the present invention is to make it possible to create a three-dimensional model in which the shape of the model is correctly represented with a small amount of data, this being accomplished by selecting representative points that are closely spaced on complex portions or curved surfaces where shape is highly irregular, selecting representative points that are distantly spaced on large flat surfaces, and adopting these representative points as the vertices of polygonal patches.

As a result, it is possible to create a three-dimensional model, wherein the shape of the model is correctly represented with a small amount of data, by selecting representative points that are closely spaced on complex portions or curved surfaces where shape is highly irregular, selecting representative points that are distantly spaced on large flat surfaces, and adopting these representative points as the vertices of polygonal patches.

Further, after an inputted range image has been converted into geometric data indicative of a mesh shape, a polygon or a freely curved surface in conformity with the characteristics of an input object, various transformation operations (designating, bending and twisting the skeleton of a transformed curved surface) are performed selectively and the transformation operations are interpolated to create animation video. As a result, the user need only designate how an object is to be transformed and animated without having a detailed knowledge of modeling. This arrangement can be utilized by anyone, without requiring special skill, and therefore provides a system exhibiting a high productivity.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram showing the construction of a three-dimensional model processing apparatus according to an embodiment of the present invention;

FIGS. 3(a) and 3(b) are diagrams showing the construction of a memory according to a first embodiment;

FIG. 6 is a diagram showing an example of operators for directly obtaining linear partial differentials and quadratic partial differentials from coefficients of a quadratic surface subjected to fitting according to the first embodiment;

FIG. 7 is a diagram showing an example of an operator for directly obtaining linear partial differentials and quadratic partial differentials from an original range image according to the first embodiment;

FIG. 9 is a diagram showing an example of types of planes according to the first embodiment;

FIGS. 10(a) and 10(b) are diagrams showing the construction of a memory according to a second embodiment;

FIG. 13 is a flowchart showing an algorithm for the construction of a three-dimensional model according to the second FIGS. 14(a) and 14(b) are diagrams showing an example of the description of a three-dimensional (polygonal) model as well as a cubic shape;

FIG. 17 is a diagram illustrating pseudo-coding of an algorithm for calculating phase information of a ridge line;

FIGS. 18(a) and 18(b) are diagrams showing the construction of a memory according to a third embodiment;

FIGS. 20(a), 20(b) and 20(c) show examples in which the sense of the surface of an object surface is displayed as lengths and directions of line segments;

FIGS. 21B(a) and 21B(b) show original color images corresponding to FIGS. 21A(a) and 21A(b);

FIGS. 23(a) and 23(b) are diagrams showing the construction of a memory according to a fourth embodiment;

FIG. 26 is a table showing surface classes and the codes thereof;

FIG. 27 is a flowchart showing a processing procedure for creating a polygonal-patch model according to the fourth embodiment;

FIGS. 28(a) through 28(d) are diagrams schematically showing an example of processing of range-image data according to the fourth embodiment;

FIG. 29 is a flowchart showing a processing procedure for contour extraction according to the fourth embodiment;

FIGS. 30(a) and 30(b) are diagrams showing a polygonal-patch data table according to the fourth embodiment;

FIGS. 32(a) and 32(b) are diagrams showing the construction of a memory according to a fifth embodiment;

FIG. 35 is a diagram for describing the scanning of a range image;

FIG. 36 is a diagram for describing a method of selecting characteristic points;

FIG. 37 is a diagram for describing an example of points on a side to be revised;

FIG. 38 is a diagram showing an example of data indicative of a polygon model;

FIG. 41 is a diagram showing an example of data indicative of a polygon model;

FIGS. 42(a) through 42(d) are diagrams for describing an example of transformation operations according to the sixth embodiment;

FIGS. 43A(a) and 43A(b) are diagrams showing an example of the results of transformation according to the sixth embodiment;

FIGS. 43B(a) and 43A(b) show an original color image corresponding to FIGS. 43A(a) and 43A(b);

FIG. 44 is a diagram for describing an example of the interpolation of transformation parameters according to the sixth embodiment; and FIG. 45 is a diagram showing an example of pseudo-coding for creating ridge-line phase information.

DESCRIPTION OF THE PREFERRED EMBODIMENTS

Figure 2:
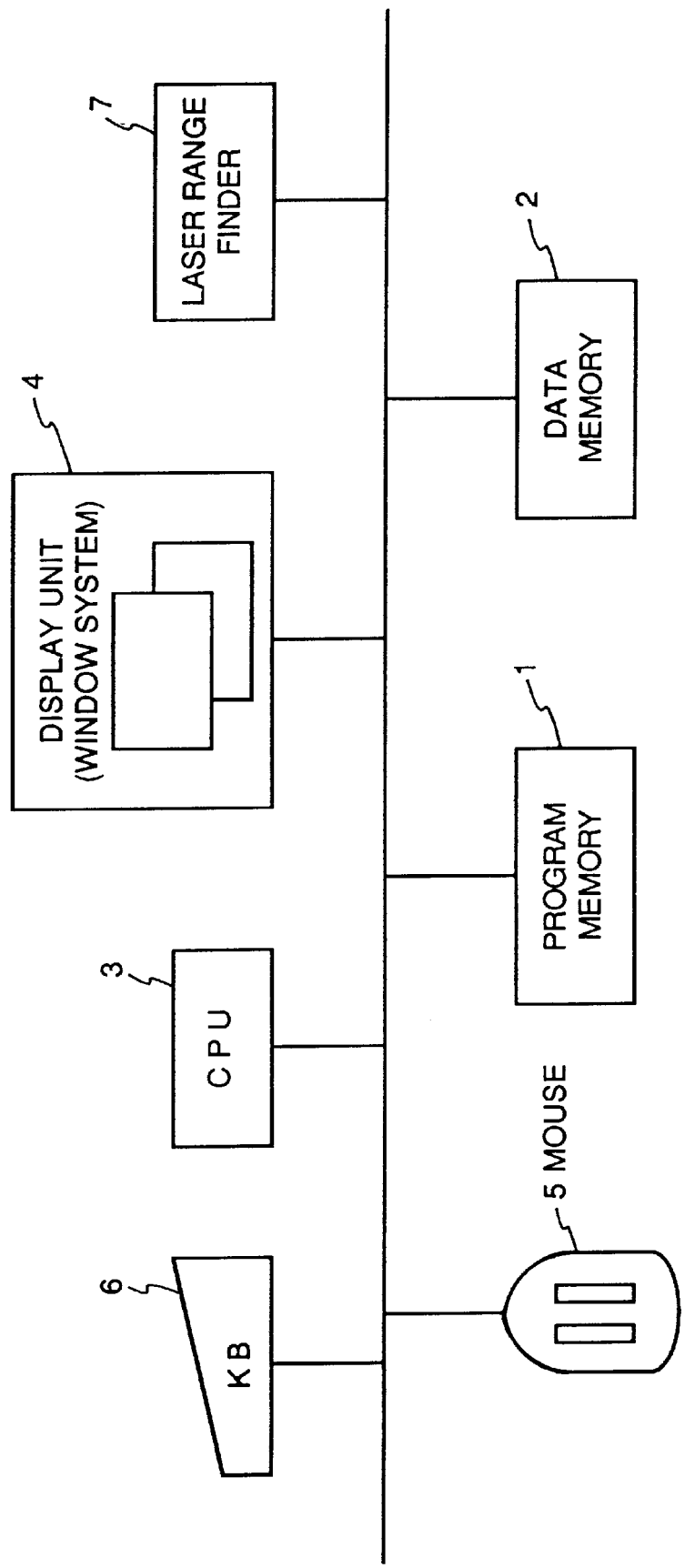
FIG. 2 is a block diagram showing the arrangement of hardware constituting the three-dimensional model processing apparatus according to this embodiment.

Before describing embodiments of the invention in detail, the technical terms used herein will be simply defined.

A "range image" refers to an image in which the vertical distance (parallel projection) between each point on the surface of an object measured by a range-measuring sensor and a reference plane is given. As for the data format, distance (Z value) at each point of an (X,Y) square two-dimensional lattice is stored. These are data which recently have begun to be utilized in the field of computer vision and computer graphics.

Next, a "shape model", unlike a range image, is expressed as geometrical information such as the vertices and sides of a 3-D object. For example, there are mesh models, polygon models, quadratic-surface models and freely curved-surface models, mentioned in order starting from those which have a low description level. This is a data format often utilized in CG and CAD systems.

A "mesh model" is a triangular lattice model in which the x and y coordinates are spaced apart equidistantly. As shown in the drawings, 3-D geometric data can be created by connecting the diagonals of a lattice shape and converting distance data into a series of triangular polygons. Basically, this model can readily be realized by a simple filter program.

A "polygon model" is composed of arbitrary point sequences and is a polygon in an identical plane. The structure of the polygon data is shown in the drawings. The data structure is broadly divided into two portions. The first half is a portion in which vertex information constituting a polygon is designated. This is an (x,y,z) value of vertex information and a normal vector (Nx,Ny,Nz) value at an optional vertex; these values are essential data. As for the second half, connection information of ridge lines constituting a polygon is indicated with respect to the designated vertex information. There are initially n-number of ridge lines constituting a polygon, and these are followed by n-number of index values constituting a polygon.

A "freely curved-surface model" is a model having the highest description capability and is widely used in CAD and the like. A Bezier or NURBS (non-rational B-spline surface) curved surface is known as a freely curved surface. A detailed description of the technique is found in "An Adaptive Subdivision Method for Surface-Fitting from Sampled Data", Francis Schm Computer Graphics, vol. 20, number 4, 1986.

Preferred embodiments of the present invention will now be described in detail with reference to the accompanying drawings.

FIG. 1 is a block diagram showing the construction of a three-dimensional model processing apparatus according to this embodiment.

In FIG. 1, numeral 11 denotes a three-dimensional data-format converter for converting the data format of three-dimensional data 12 inputted by a three-dimensional data input unit. Numeral 13 denotes a three-dimensional data processor for processing the three-dimensional data converted by the converter 11. A three-dimensional data measuring unit 14 performs various measurements with regard to three-dimensional data converted by the converter 11. A three-dimensional model creating unit 15 creates a three-dimensional model from the three-dimensional data processed by the three-dimensional processor 13. A three-dimensional model editor 16 edits the three-dimensional model created by the creating unit 15 and applies operations to the shape data. A three-dimensional model display unit 17 applies shading to the three-dimensional model created by the creating unit 15 or edited by the editor 16 and displays the resulting model. A three-dimensional model reverse-converter 18 reverse-converts, into three-dimensional data 12' having another format, the three-dimensional model created by the creating unit 15 or edited by the editor 16.

FIG. 2 is a block diagram showing the basic construction of the hardware constituting the three-dimensional model processing apparatus. This hardware is the same for all of the following embodiments, including this embodiment.

Shown in FIG. 2 are a program memory 1 for storing various processing procedures, a data memory 2 which stores information necessary for processing in this system as well as input/output data, a CPU 3 for performing various processing and controlling various elements of the apparatus in accordance with the processing procedures stored in the program memory 1, and a display unit 4 for displaying 3-D shape models obtained by the system, and for interactively displaying instructions from the user. In this embodiment, the display unit is of the multiple-window type. Numeral 5 denotes a mouse for inputting commands from the user, 6 a keyboard (KB) which the user employs to create a program and to input commands to the system, and 7 a laser range finder for measuring the vertical distance between each point on an object surface and a reference plane, and for inputting a range image.

An example of the operation of the foregoing arrangement will now be described.

When the three-dimensional data 12 are inputted to the three-dimensional data converter 11, the latter converts the data format into a standard data format in conformity with the data format of the three-dimensional data 12.

EXAMPLE 1

One example of processing will be described with regard to a specific case.

Assume that a laser beam in which the strength of the laser light has been modulated is emitted from the laser range finder, and that the phase difference between the waves reflected from the object and the original waves is detected, thereby measuring the time of flight of the light to provide three-dimensional data.

The three-dimensional data-format converter 11 converts the three-dimensional data into the format of a range image, which is one "standard data format" of the present system. More specifically, the converter 11 makes a conversion from phase difference to distance, transforms the coordinate system and performs normalization along each axis. Here the range image refers to an image in which the vertical distances between visual points and the surface of the object are given as values of pixels.

The three-dimensional data processor 13 performs segmentation, such as the extraction of planes and various curved-surface regions, the extraction of ridge lines, etc., from the range image, and calculates attribute values of pixels, curvature, etc. Next, label image processing such as the elimination of very small regions, the joining of regions and the growing of regions based upon the attribute values is executed.

On the basis of the results of processing performed by the three-dimensional data processor 13, the three-dimensional model creating unit 15 creates a three-dimensional model, such as a polygon model, a parametric model, a model based upon boundary representation or a solid model.

A procedure for creating a polygon model will be described in general terms as one example. A polygon having vertices on the borderline of a planar region is fitted to the planar region, which is extracted by the three-dimensional data processor 13, and a polygon having vertices which are points selected at a certain spacing based upon the type of the curved surface and the size of its curvature is fitted to an extracted curved-surface region. The coordinates of the vertices of each of the polygons thus created, as well as the connectivity of these points, are recorded and a polygon model is created.

The three-dimensional model display unit 17 presents a realistic display of the three-dimensional model, which has been obtained by the three-dimensional model creating unit 15 or the three-dimensional model editing unit 16, by providing such parameters as points of view, positions of light sources, reflectance and transparency of the object surface as well as color.

The three-dimensional data measuring unit 14 performs various measurements with regard to the standard data format created by the three-dimensional data-format converter 11. For example, in case of the aforesaid range image, the measuring unit 14 obtains the distance, in three-dimensional space, between two arbitrarily given points on the image and computes the area and volume, in three-dimensional space, of any closed region drawn on the image.

The three-dimensional model reverse-converter 18 converts the data of the three-dimensional model, which has been obtained by the three-dimensional model creating unit 15 or the three-dimensional model editor 16, into three-dimensional data having another format.

A method of converting the aforesaid polygon model into a range image will be described as one example. The conversion can be made by recording the Z value of each point using a Z buffer algorithm, which is one type of processing for eliminating concealed surfaces.

EXAMPLE 2

Another example of processing will be described with regard to a specific case.

Assume that several computed tomographs (CT images) obtained by X rays or NMR are available as three-dimensional data.

The three-dimensional data-format converter 11 converts the three-dimensional data into the format of a three-dimensional image, which is one "standard data format" of the present system. More specifically, the converter 11 makes a conversion of sampling interval (resolution). The three-dimensional image mentioned here refers to an image in which three-dimensional space is segmented into cubic lattices and a density value is assigned to each small cube.

The three-dimensional data processor 13 performs segmentation processing, such as the extraction of characteristic regions, the extraction of surfaces, the extraction of planes and various curved-surface regions, and the extraction of ridge lines, etc., from the three-dimensional image.

On the basis of the results of processing performed by the three-dimensional data processor 13, the three-dimensional model creating unit 15 creates a three-dimensional model, such as a polygon model, a parametric model, a model based upon boundary representation or a solid model.

A procedure for creating a solid model will be described in general terms as one example. With regard to a characteristic region extracted by the three-dimensional data processor 13, an "occupied" code is applied to the small cubes in the interior, an "unoccupied" code is applied to small regions which are regions other than the above, and a solid model of the object is created as a set of the small cubes filling the interior.

The three-dimensional model editor 16 performs operations such as changing the shape parameters of the three-dimensional model obtained by the three-dimensional model creating unit 15 and combining the shape models of a plurality of objects that have been stored in advance.

The three-dimensional model display unit 17 presents a realistic display of the three-dimensional model, which has been obtained by the three-dimensional model creating unit 15 or the three-dimensional model editing unit 16, by providing such parameters as points of view, positions of light sources, reflectance and transparency of the object surface as well as color. The display unit 17 starts display routines conforming to the types of respective shape models.

The three-dimensional data measuring unit 14 performs various measurements with regard to the standard data format created by the three-dimensional data-format converter 11. For example, in case of the aforesaid three-dimensional image, the measuring unit 14 obtains the distance, in three-dimensional space, between two arbitrarily given points in the image and computes the area and volume, in three-dimensional space, of any closed region drawn in the image.

The three-dimensional model reverse-converter 18 converts the data of the three-dimensional model, which has been obtained by the three-dimensional model creating unit 15 or the three-dimensional model editor 16, into three-dimensional data having another format.

A method of converting the aforesaid solid model into a range image will be described as one example. The conversion can be made by recording the Z value corresponding to each point using a Z buffer algorithm, which is one type of processing for eliminating concealed surfaces.

In accordance with the three-dimensional model processing apparatus of this embodiment, as described above, a three-dimensional model is capable of being created irrespective of the type of three-dimensional data inputted in a different format, and the model can be edited. Furthermore, the model can be displayed with shading if required. In addition, once a three-dimensional model has been created, the data thereof can be converted into three-dimensional data having a different format.

Normalization of Axes and Range Image Processing

FIGS. 3(*a*) and 43(*b*) are diagrams showing the programs stored in the program memory 1 and the data stored in the data memory 2. The programs stored in the program memory 1 shown in FIG. 3(*a*) are as follows: an axis normalizing program 201 for converting the type of range image and normalizing each axis; a jump-edge detecting program 202 for detecting jump edges from a range image; a linear partial-differential calculating program 203 for calculating a linear partial differential from a range image; a quadratic partial-differential calculating program 204 for calculating a quadratic partial differential from a range image; a local linear-plane approximating program 205 for approximating a range image as a local linear plane and calculating the coefficients of the equation thereof; a local quadratic-surface approximating program 206 for approximating a range image as a local quadratic surface and calculating the coefficients of the equation thereof; a Gaussian curvature calculating program 207 for calculating Gaussian curvature; a mean curvature calculating program 208 for calculating mean curvature; a normal curvature calculating program 209 for calculating normal curvature; a radius-of-curvature calculating program 210 for calculating radius of curvature; a Gaussian-curvature sign discriminating program 211 for discriminating the sign of Gaussian curvature; a mean-curvature sign discriminating program 212 for discriminating the sign of mean curvature; a surface category discriminating program 213 for discriminating the category of a surface based upon a combination of the sign of Gaussian curvature and the sign of mean curvature; a normal vector calculating program 214 for calculating a unit normal vector from a linear partial-differential image; and a roof-edge calculating program 215 for calculating a roof edge from a unit normal vector. The processing associated with each program will be described later.

The data stored in the data memory 2 shown in FIG. 3(*b*) are as follows: an input range image 221 inputted by a range-image input unit or the like; a jump-edge image 222 detected from a range image; a linear partial-differential image 223 detected from a range image; a quadratic partial-differential image 224 detected from a range image; a coefficient image 225 detected from a range image; a calculated Gaussian-curvature image 226; a calculated means-curvature image 227; a calculated Normal-curvature image 228; a calculated radius-of-curvature image 229; a normal-vector image 230 representing a calculated unit normal vector; a calculated Gaussian-curvature sign image 231; a calculated mean-curvature sign image 232; a calculated surface-category image 233; and a calculated roof-edge image 234.

Figure 4:
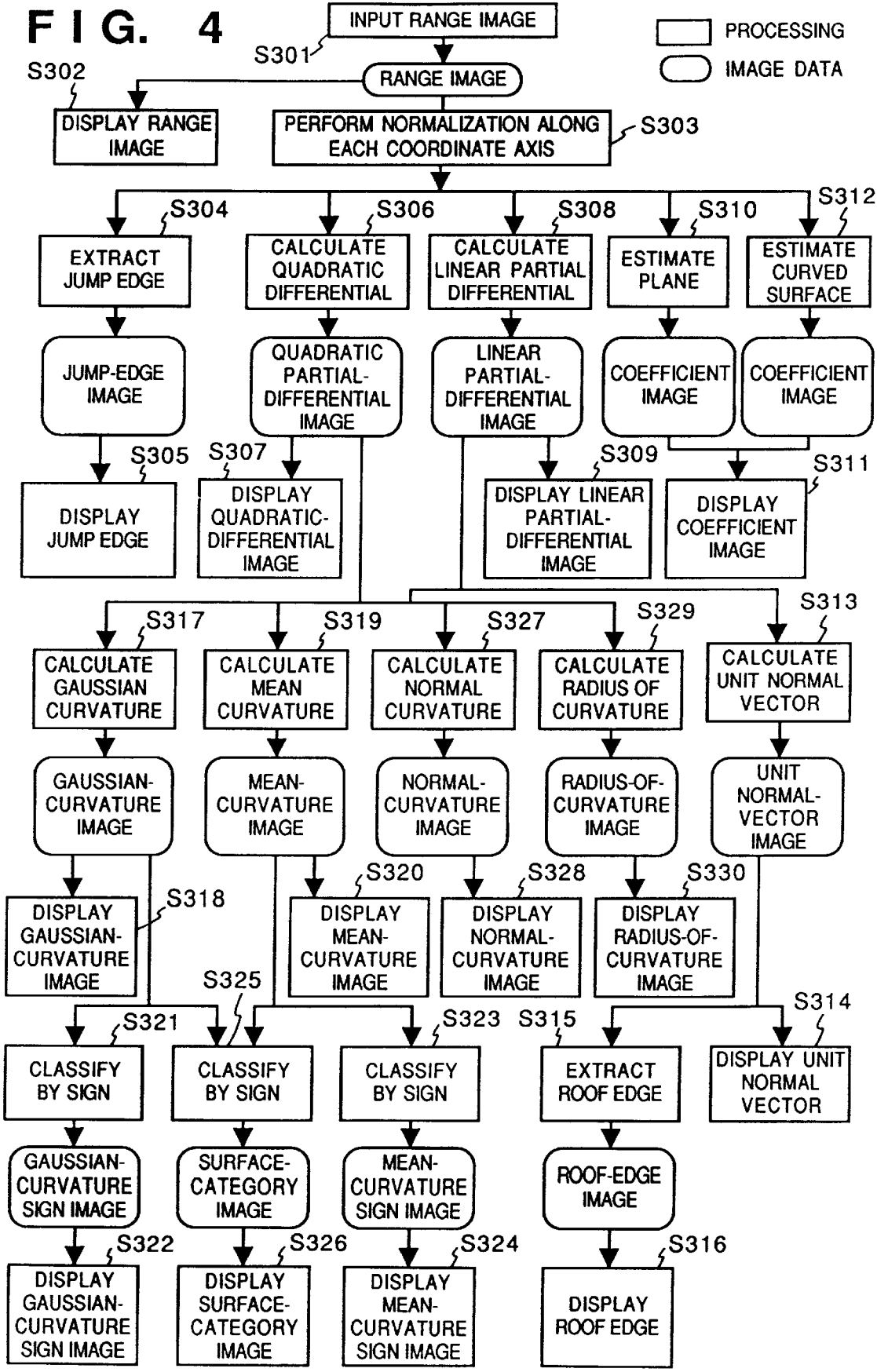
FIG. 4 is a flowchart showing the overall processing of the first embodiment.

FIG. 4 is a flowchart illustrating the flow of this embodiment.

The flow of overall processing of this embodiment will now be described based upon the flowchart shown in FIG. 4.

With regard to the start of processing, it will be assumed that a range image has already been inputted by measuring an object using the laser range finder 7, for example, and that the image has been stored in the data memory 2. It should be noted that the range image to undergo processing is not limited to one based upon such actual measurement but may be one composed of artificial data as obtained from an image data base or the like. For a detailed discussion of a method of acquiring a range image, see "Measurement of Three-Dimensional Images" by Iguchi and Sato; Shoshodo, (1990).

First, as initial processing, the stored range image is extracted (step S301) and the image is displayed on the display unit (step S302). Next, the type of range image is converted and normalization is performed along each coordinate axis (step S303). The range image thus converted is used in calculations set forth below. This is followed by detection of jump edges and the display thereof (step S304, S305). Linear and quadratic partial differentials are calculated and the values thereof are displayed (steps S306~S309). Application is made to a local linear plane and a quadratic surface, and the results thereof are displayed (steps S310~S312). Gaussian curvature, mean curvature, normal curvature, radius of curvature and unit normal vector are calculated using the calculated values of the partial differentials (steps S313, S314; S317~S320; S327~S330). Further, sign maps are created from the curvatures obtained, and the maps are displayed (steps S321~S324). Based upon the values of the signs, the surface category is discriminated and displayed (steps S325, S326). Roof edges are detected from the calculated unit normal vector, and these are displayed (steps S315, S316).

Each of these processing operations will now be described in detail.

Normalization along each coordinate axis (step S303)

A range image is outputted, which image has been subjected to a density conversion in such a manner that actual length corresponding to one quantum unit along the x axis is made to agree with the actual length of one pixel along the x axis of the inputted image and the actual length of one pixel along the y axis of the inputted image. Each pixel of the output image possesses a value of float.

Let the actual length corresponding to one pixel along the x direction and the actual length corresponding to one pixel along the y direction both be $\Delta x$, and let the actual length corresponding to one quantum unit along the z axis be $\Delta z$. The value $z_i$ of each pixel of the inputted range image is converted to the following $z_0$ (x,y):

$$z_0=(x,y)=z_i(x,y)x\Delta z/\Delta x \tag{0}$$

In subsequent processing, the converted z is used.

Jump-edge extraction (step S304)

A portion in which distance from a point of view is discontinuous is detected in the input image. A portion for which the maximum value of the distance difference is in the neighborhood of 8 and is greater than a threshold value is detected.

Letting threshold represent the threshold value, JumpEdge in the following equation is given as the value of each pixel:

$$\text{JumpEdge}(x,y)=\text{Max}\{|Z(x,y)-Z(x+k,y+1)|:-1\leq k, 1\leq l\} \tag{1}$$

Fitting based upon local plane (step S310)

A surface is approximated as a local linear plane and the parameters of the equation thereof are calculated. More specifically, each coefficient is calculated by a least-square approximation, in which the object surface S of the range image is $S=[x,y,-Z(x,y)]$ and a window of winsize$^2$ is used for the plane $ax+by+c=-z$.

The operator for calculating each coefficient is decided in the following manner: Let winsize be the window size (the number of pixels constituting one side of a square window) of the operator; let this be an arbitrary, positive odd number.

$$A\cdot C=B \tag{2}$$

where it is assumed that the following holds:

$$A = \begin{vmatrix} x1 & y1 & 1 \\ x2 & y2 & 1 \\ & \vdots & \\ xn & yn & 1 \end{vmatrix} \quad B = \begin{vmatrix} -z1 \\ -z2 \\ \vdots \\ -zn \end{vmatrix} \quad C = \begin{vmatrix} a \\ b \\ c \end{vmatrix}$$

in which case we have $$C = (A^t \cdot A)^{-1} \cdot A^t \cdot B \tag{3}$$

$$= \begin{pmatrix} \sum_{i=1}^{n} x_i^2 & \sum_{i=1}^{n} x_i y_i & \sum_{i=1}^{n} x_i \\ \sum_{i=1}^{n} x_i y_i & \sum_{i=1}^{n} y_i^2 & \sum_{i=1}^{n} y_i \\ \sum_{i=1}^{n} x_i & \sum_{i=1}^{n} y_i & \sum_{i=1}^{n} 1 \end{pmatrix}^{-1} A^t \cdot B$$

Figure 5:
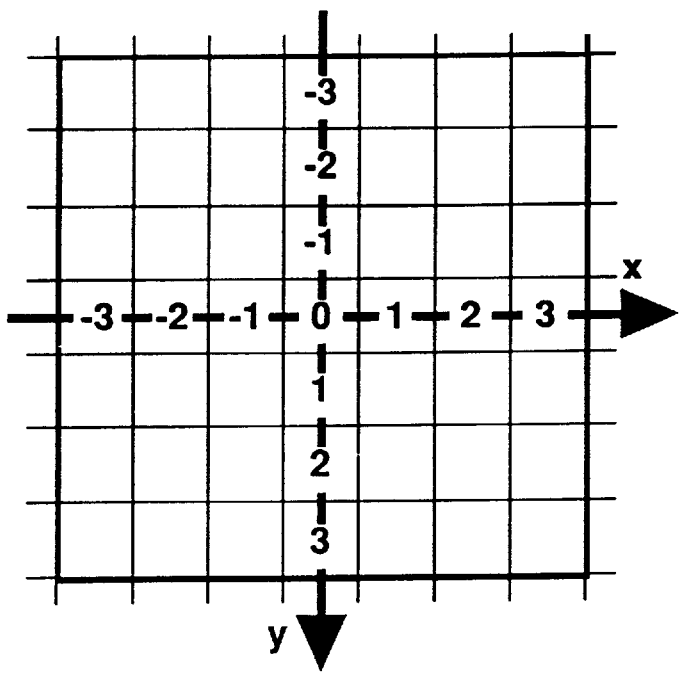
FIG. 5 is a diagram showing an example of a window according to the first embodiment.

In view of a window of size winsize=(2w+1) shown in FIG. 5, we have the following if the origin is taken at the center of this window:

$$C = \begin{vmatrix} 1/3w(w+1)(2w+1)^2 & 0 & 0 \\ 0 & 1/3w(w+1)(2w+1)^2 & 0 \\ 0 & 0 & (2w+1)^2 \end{vmatrix}^{-1} \tag{4}$$

$$\cdot A^t \cdot B$$

$$= 1/w(w+1)(2w+1)^2 \begin{vmatrix} 3 & 0 & 0 \\ 0 & 3 & 0 \\ 0 & 0 & w(w+1) \end{vmatrix} \cdot A^t \cdot B \tag{5}$$

Letting $1/w(w+1)(2w+1)^2 \begin{vmatrix} 3 & 0 & 0 \\ 0 & 3 & 0 \\ 0 & 0 & w(w+1) \end{vmatrix} = E$ hold and letting each element be represented by $(e_{ij})$ \hfill (6)

we have $$C = E \cdot A^t \cdot B = (e_{ij}) \begin{vmatrix} x_1 & x_2 & \cdots & x_n \\ y_1 & y_1 & \cdots & y_1 \\ 1 & 1 & \cdots & 1 \end{vmatrix} \cdot B \tag{7}$$

$$= \begin{vmatrix} e_{11}*x_1 & e_{11}*x_2 & \cdots & e_{11}*x_n \\ e_{22}*y_1 & e_{22}*y_2 & \cdots & e_{22}*y_n \\ e_{33} & e_{33} & \cdots & e_{33} \end{vmatrix} \cdot B$$

More specifically, we have $$a = e_{11}\sum_{i=1}^{n} x_i \cdot (-z_i) \quad b = e_{22}\sum_{i=1}^{n} y_i \cdot (-z_i) \quad c = e_{33}\sum_{i=1}^{n} y_i \cdot (-z_i) \tag{8}$$

A plane estimation operator of winsize=3, 5 (3*3, 5*5) is illustrated as an example.

(a) In case of window size 3*3 (winsize=3, w=1) w=1 is substituted into Eq. (6) to obtain E (namely $e_{11}$, $e_{22}$, $e_{33}$), and $(x_1, x_2, \ldots, x_n)$, $(y_1, y_2, \ldots, yn)$ are substituted into Eq. (8) to obtain the following operator. This operator is used to multiply B (namely the range image).

$$a: 1/6* \begin{vmatrix} -1 & 0 & 1 \\ -1 & 0 & 1 \\ -1 & 0 & 1 \end{vmatrix} \quad b: 1/6* \begin{vmatrix} -1 & -1 & -1 \\ 0 & 0 & 0 \\ 1 & 1 & 1 \end{vmatrix}$$

$$c: 1/9* \begin{vmatrix} 1 & 1 & 1 \\ 1 & 1 & 1 \\ 1 & 1 & 1 \end{vmatrix}$$

(b) In case of window size 5*5 (winsize=5, w=2)

The following operator is obtained in the same manner as in (a) above:

$$a: 1/50* \begin{vmatrix} -2 & -1 & 0 & 1 & 2 \\ -2 & -1 & 0 & 1 & 2 \\ -2 & -1 & 0 & 1 & 2 \\ -2 & -1 & 0 & 1 & 2 \\ -2 & -1 & 0 & 1 & 2 \end{vmatrix}$$

$$b: 1/50* \begin{vmatrix} -2 & -2 & -2 & -2 & -2 \\ -1 & -1 & -1 & -1 & -1 \\ 0 & 0 & 0 & 0 & 0 \\ 1 & 1 & 1 & 1 & 1 \\ 2 & 2 & 2 & 2 & 2 \end{vmatrix}$$

$$c: 1/25* \begin{vmatrix} 1 & 1 & 1 & 1 & 1 \\ 1 & 1 & 1 & 1 & 1 \\ 1 & 1 & 1 & 1 & 1 \\ 1 & 1 & 1 & 1 & 1 \\ 1 & 1 & 1 & 1 & 1 \end{vmatrix}$$

Fitting based upon local quadratic surface (step S312)

The object surface $S=[x,y,-Z(x,y)]$ of the range image is fitted to a quadratic surface $ax^2+by^2+cxy+dx+ey+f=-z$ by least-square approximation, and each coefficient is calculated.

The operator for calculating each coefficient is obtained through an approach the same as that used in fitting based upon a local plane described above. Though a detailed description is omitted, two types of operators are shown in FIG. 6.

Linear-quadratic partial differentials (steps S306, S308)

A linear or quadratic partial differential is calculated from a range image by the following three methods: (1) the partial differential is obtained by directly applying a partial-differential operator; (2) the partial differential is obtained from coefficients of a local plane equation which has undergone fitting; (3) the partial differential is obtained from coefficients of a local quadratic-surface equation which has undergone fitting.

(1) Function for obtaining partial differential directly from original image

Two types of partial-differential operators are illustrated in FIG. 7 by way of example.

Figure 8:
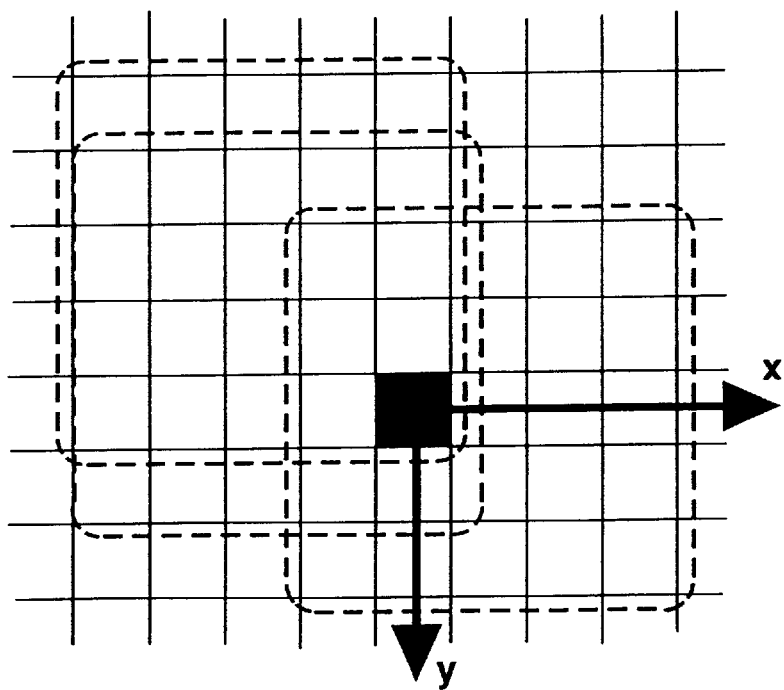
FIG. 8 is a diagram for describing estimation of a selective local plane.

(2) Function for obtaining linear partial differential from coefficients of local plane which has undergone fitting The differential value of a certain point of interest is calculated through the following method:

Let n, m represent the operator size (the number of pixel constituting one side of a window). As shown in FIG. 8, n×m windows having a size of n×m and containing the pixel of interest are prepared, and these windows are made to approximate $-Z(x,y)=ax+by+c$ in accordance with the method set forth in the description of fitting based upon a local quadratic plane. A window for which a variance in the absolute value of an error is minimum is selected from the n×m windows, and the differential value of the pixel of interest is obtained from the equation of this window. In case of a plane, the following equations are obtained when the partial differential value is calculated from the equation $ax+by+c=-z$ of a fitted plane:

$$Zx=-a$$

$$Xy=-b \qquad (9)$$

(3) Function for obtaining partial differential from coefficients of local quadratic surface which has undergone fitting The differential value of a certain point of interest is calculated through the following method:

Let n, m represent the operator size (the number of pixel constituting one side of a window). As shown in FIG. 8, n×m windows having a size of n×m and containing the pixel of interest are prepared, and these windows are made to approximate $-Z(x,y)=ax+by+c$ in accordance with the method set forth in the description of fitting based upon a local quadratic surface. A window for which a variance in the absolute value of an error is minimum is selected from the n×m windows, and the differential value of the pixel of interest is obtained from the equation of this window. In case of a plane, the following equations are obtained when the partial differential value is calculated from the equation $ax^2+by^2+cxy+dx+ey+f=-z$ of a fitted plane:

$$Zx=-2ax-cy-d$$

$$Zy=-2by-cx-e$$

$$Zxx=2a$$

$$Zyy=2b$$

$$Zxy=c \qquad (10)$$

Calculation of normal vector (step S313)

The normal vector of a local tangent plane of a surface is calculated as a unit vector of size 1.

The input image is a linear partial-differential image.

The x, y and z components of the unit normal vector are calculated based upon the following equations:

Unit normal vector $$(x,y,z)=(N_1,N_2,N_3) \qquad (11)$$

$$N_1 = Zx \Big/ \sqrt{Zx^2 + Zy^2 + 1}$$

$$N_2 = Zy \Big/ \sqrt{Zx^2 + Zy^2 + 1}$$

$$N_3 = -1 \Big/ \sqrt{Zx^2 + Zy^2 + 1}$$

where Zx represents a linear partial differential based upon the x component of the distance data, and Zy represents a linear partial differential based upon the y component of the distance data.

Eq. (11) is based upon computation the following computation;

The surface of a range image handled by this technique is $$S=[x,y,-Z(x,y)]$$

A normal vector indicated by the following equation is obtained as the outer product of a linear partial differential Sx=(1,0,-Zx) based upon the x component of S and a linear partial differential Sy=(1,0,-Zy) based upon the y component of S:

$$N=(Zx,Zy,-1) \quad (12)$$

If this is adopted as a unit vector of magnitude 1, Eq. (11) is obtained.

Roof-edge detection (step S315)

An inflection point at a distance from a point of view is extracted. The input image is a normal-vector image.

A portion for which the maximum value of the angular difference of the unit-normal vector is in the neighborhood of 8 and is greater than a threshold value is detected. RoofEdge in the following equation is given as the value of each pixel:

$$\text{RoofEdge}(x,y)=\text{Max}\{|N(x,y) \cdot N(x+k,y+1)|: -1 \leq k, 1 \leq 1\} \quad (13)$$

where N(x,y) represents the following normal vector:

$N(x,y)=[N_1(x,y), N_2(x,y), N_3(x,y)]$ $N_1(x,y)$ is the x-component image of the vector in the unit-normal direction;

$N_2(x,y)$ is the y-component image of the vector in the unit-normal direction;

$N_3(x,y)$ is the z-component image of the vector in the unit-normal direction

Gaussian curvature calculation (step S317)

Each partial differential value is inserted into the following equation to calculate the Gaussian curvature K:

$$\text{Gaussian curvature } K = \frac{Zxx*Zyy - Zxy}{(1 + Zx + Zy)^2} \quad (14)$$

where Zx represents the linear partial differential based upon the x component of the distance data;

Zy represents the linear partial differential based upon the y component of the distance data;

Zxx represents the quadratic partial differential based upon the x component of the distance data;

Zyy represents the quadratic partial differential based upon the y component of the distance data; and Zxy represents the quadratic partial differential based upon the x, y components of the distance data.

Mean curvature calculation (step S319)

Each partial differential value is inserted into the following equation to calculate the mean curvature H:

$$\text{Mean curvature } H = \frac{Zxx + Zyy + Zxx*Zy + Zyy*Zx - 2*Zx*Zy*Zxy}{(1 + Zx + Zy)2/3} \quad (15)$$

where Zx represents the linear partial differential based upon the x component of the distance data;

Zy represents the linear partial differential based upon the y component of the distance data;

Zxx represents the quadratic partial differential based upon the x component of the distance data;

Zyy represents the quadratic partial differential based upon the y component of the distance data; and Zxy represents the quadratic partial differential based upon the x, y components of the distance data.

Creation of sign map of Gaussian curvature (Steps S321, S322)

Let kimg(x,y) represent an inputted Gaussian-curvature image, and let thk represent a threshold value (float) which decides the sign.

An image in which the following classes are given for each of the pixels is outputted:

kimg(x,y)<-thk is Class 1 where the Gaussian curvature is regarded as being negative;

-thk<kimg(x,y)<thk is Class 2 where the Gaussian curvature is regarded as being zero; and kimg(x,y)>thk is Class 3 where the Gaussian curvature is regarded as being positive.

Creation of sign map of mean curvature (Steps S323, S324)

Let himg(x,y) represent an inputted mean-curvature image, and let thh represent a threshold value (float) which decides the sign.

An image in which the following classes are given for each of the pixels is outputted:

himg(x,y)<-thh is Class 1 where the mean curvature is regarded as being negative;

-thh<himg(x,y)<thh is Class 2 where the mean curvature is regarded as being zero; and himg(x,y)>thh is Class 3 where the mean curvature is regarded as being positive.

Surface classification (steps S325, S326)

Surfaces are classified into eight surface types based upon the theory of differential geometry. Here thk, thh represent threshold values (float) which decide sign. A detailed discussion of the differential geometry of curved surfaces is given if the following literature:

"An Outline of Differential Geometry" by Chuji Adachi, Baifukan, (1976);

"Differential Geometry of Curved Lines and Curved Surfaces" by Shoshichi Kobayashi, Shokado, (1977); and "Introduction to Differential Geometry and Topology" by Honma and Okabe, Basic Mathematics Series 6, Shinyosha, (1979).

Examples in which this is utilized in segmentation of a range image are as follows:

"A Hybrid Technique for Segmenting a Range Image based upon Differential Geometric Characteristics" by Naokazu Yokoya and Martin D. Levine, Joshoron, Vol. 30, No. 8, pp. 944–953 (1989);

"Surfaces in Range Image Understanding" by Paul J. Besel, Springer-Verlag, (1988); and "Invariant Surface Characteristics for 3D Object Recognition in Range Images" by Paul J. Besel and R. C. Jain, CVGIP, 33, pp. 33–80, (1986).

An image in which the following eight classes are given for each of the pixels based upon the sign of a Gaussian-curvature image kimg(x,y) and a mean-curvature image himg(x,y) is outputted:

kimg(x,y)>thk and himg(x,y)<-thh is Class 1;

kimg(x,y)>thk and himg(x,y)>thh is Class 2;

-thk<kimg(x,y)<thk and himg(x,y)<-thh is Class 3;

-thk<kimg(x,y)<thk and himg(x,y)>thh is Class 4;

-thk<kimg(x,y)<thk and -thh<himg(x,y)<thh is Class 5;

kimg(x,y)<-thk and -thh<himg(x,y)<thh is Class 6;

kimg(x,y)<-thk and himg(x,y)<-thh is Class 7;

kimg(x,y)<-thk and himg(x,y)>thh is Class 8; and kimg(x,y)>himg(x,y)$^2$ (forbidden area) is Class 0.

A point in Class 1 is referred to as a negative elliptical point (K>0, H<0), a point is Class 2 as a positive elliptical point (K>0, H>0), a point is Class 3 as a negative parabolic point (K=0, H<0), a point is Class 4 as a positive parabolic point (K=0, H>0), a point in Class 5 as a flat point (K=0, H=0), a point in Class 6 as a minimum point (K<0, H=0), a point in Class 7 as a negative hyperbolic point (K<0, H<0), and a point in Class 8 as a positive hyperbolic point (K<0, H>0). These curved surfaces are shown in FIG. 9.

Calculation of normal curvature (step S327)

Normal curvature along each of the x and y axes when cut by a plane containing straight lines that are parallel to the z axis and either the x axis or y axis is calculated for each pixel.

Each pixel value of inputted linear and quadratic partial-differential images is substituted into the following equations to calculate normal curvatures $K_x$, $K_y$ along the respective x and y directions:

$$\text{Normal curvature } \kappa_x = \frac{Zxx}{(1+Zx)^{2/3}} \quad (16)$$

$$\kappa_y = \frac{Zyy}{(1+Zy)^{2/3}}$$

where Zx represents the linear partial differential based upon the x component of the distance data;

Zy represents the linear partial differential based upon the y component of the distance data;

Zxx represents the quadratic partial differential based upon the x component of the distance data;

Zyy represents the quadratic partial differential based upon the y component of the distance data.

Calculation of radius of curvature (step S329)

Radius of curvature (1/normal curvature) along each of the x and y axes when cut by a plane containing straight lines that are parallel to the z axis and either the x axis or y axis is calculated for each pixel.

Each pixel value of inputted linear and quadratic partial-differential images is substituted into the following equations to calculate radii of curvature ρx, ρy:

$$\text{Radius of curvature } \rho_x = 1/\kappa_x = \frac{(1+Zx)^{2/3}}{Zxx} \quad (17)$$

$$\rho_y = 1/\kappa_y = \frac{(1+Zy)^{2/3}}{Zyy}$$

where Zx represents the linear partial differential based upon the x component of the distance data;

Zy represents the linear partial differential based upon the y component of the distance data;

Zxx represents the quadratic partial differential based upon the x component of the distance data;

Zyy represents the quadratic partial differential based upon the y component of the distance data.

In accordance with the first embodiment, as described above, by providing a step of converting the type of a range image and normalizing each axis, pixel values are calculated in conformity with the type of data, which is given for each pixel of an inputted range image, using parameters such as aspect ratio along each axis of the coordinate system. As a result, the relationship between the coordinate system in which an object is placed and the coordinate system of the image need not be stipulated in advance, and it is unnecessary to give parameters such as the aspect ratio along each of the coordinate axes each time processing is performed.

Example in Which Entirety of Three-dimensional Model is Obtained from Partial Range Image>

FIGS. 10(a) and 10(b) are diagrams showing the construction of a memory according to a second embodiment of the invention.

Programs stored in the program memory 1 are a range-image display program 111 for three-dimensionally displaying an inputted range image, a main-axis designation and user interface program 112 for designating a main axis of rotation with regard to a displayed range image, a shape-model constructing program 113 for constructing a three-dimensional model inclusive of a background (rear) surface in response to input of the range image and main axis, and a shape-model display program 114 for performing a rendering operation by applying lighting and shading, etc., to the obtained three-dimensional model.

The data stored in the data memory 2 include range-image data 121 inputted from a range-measuring sensor or range-image DB, and three-dimensional data 122 constructed by the processing of this embodiment.

Figure 11:
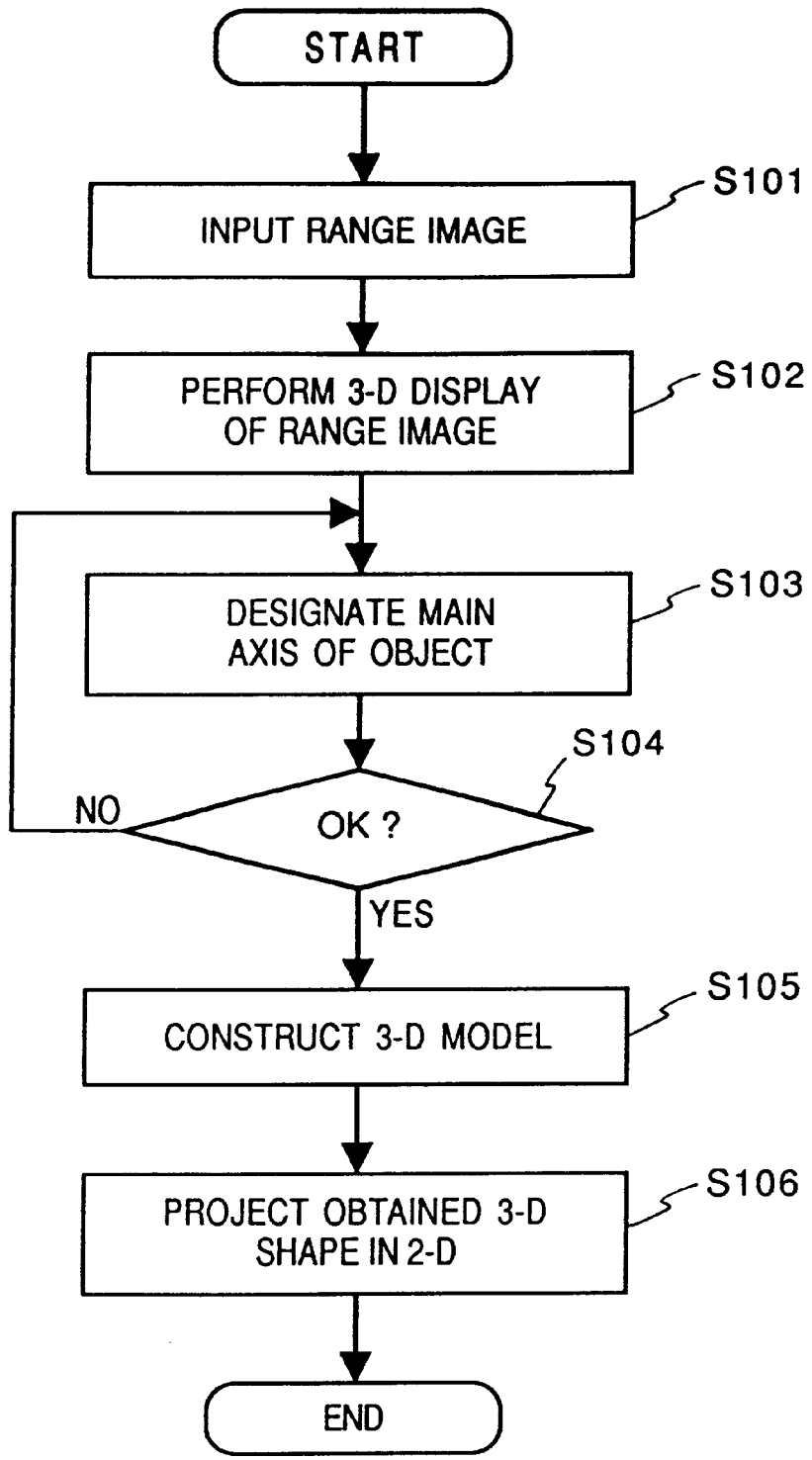
FIG. 11 is a flowchart showing a basic algorithm according to the second embodiment.

A simplified flowchart of the algorithm according to this embodiment will be described with reference to FIG. 11.

First, at step S101, data having the aforementioned range-image format are obtained from a three-dimensional measuring unit (not shown) or range-image DB (not shown) for measuring an object based upon a range-image measuring technique such as light time-of-flight measurement or triangulation. With regard to measurement of the range image, there are central projection and cylindrical projection types of systems besides the above-mentioned parallel-projection system. In the present step, a conversion is made to the coordinate space of one projection system (the parallel-projection system) and subsequent processing is unified. A point at which range is greater than a fixed value is taken as infinity in order to be regarded as background; it is not regarded as part of an object. The characterizing feature of this embodiment resides in the processing after acquisition of data, and therefore the above-described processing is not described in detail.

Since the range image obtained basically has a lattice structure, at step S102 the diagonals of the lattice shape are connected to convert the range data into a row of triangular polygons, as shown in FIG. 7, and a parallel projection is made upon a two-dimensional plane using graphics library such as PHIGS.

At step S103, the main axis of an object having axial symmetry is decided after the three-dimensional object is thus displayed in two-dimensional space. However, since depth information cannot be accurately reflected in two-dimensional space, the main axis is decided using an image parallel-projected upon three surfaces (top surface, front surface and side surface). This technique will be described with reference to FIG. 12.

Figure 12:
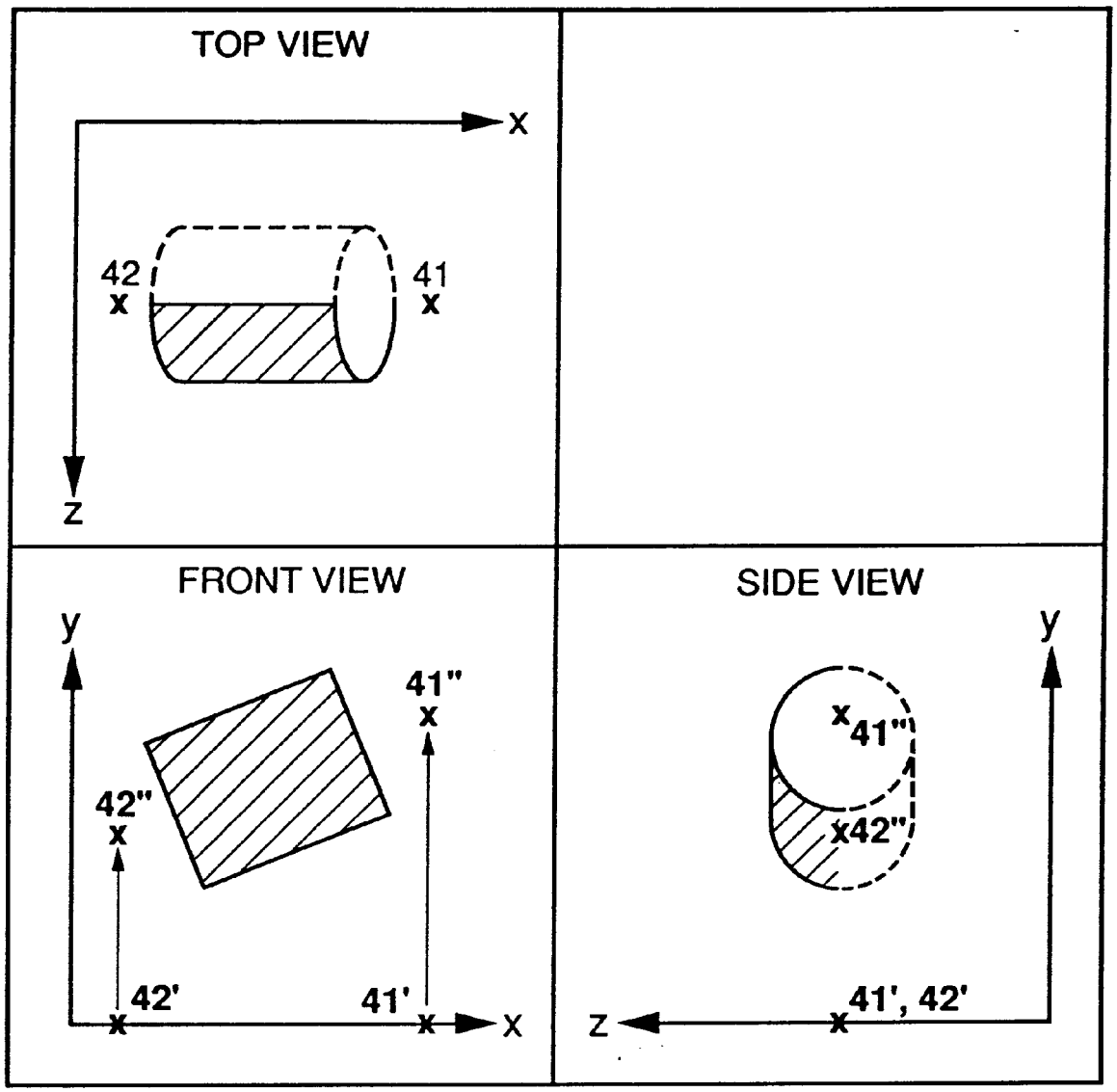
FIG. 12 is a diagram showing a method of deciding a main axis from drawings of three surfaces according to the second embodiment.

FIG. 12 shows a drawing of three views obtained when a cylindrical object is parallel-projected from the +∞ direction along the z direction. The three-dimensional coordinate system employs a right-handed coordinate system. As one example of deciding a main axis, first the top view of the three-surface view is utilized and points 41, 42 are clicked by a mouse to specify the position of x,z. The two points thus obtained similarly are reflected as points 41', 42' in the front and side views.

As the next step, point 41' is selected first in the front view and is dragged (by dragging the mouse 5) to the actual position 41", whereby the y-coordinate value is designated. When the point 42' is similarly dragged to point 42", the straight line connecting the points 41" and 42" serves as the main axis of rotation. This designation and dragging of points can readily be achieved by designating a mode using a pop-up menu, for example, in a window system.

The next step S105 is a central step for constructing a three-dimensional model from the main axis and the range data. This algorithm will be described using FIG. 13. The three-dimensional shape constructed by the algorithm of this embodiment is assumed to be a polygon model. An example of a simple cube is illustrated in FIG. 14 as an example of the data structure. FIG. 14(a) shows an example of the data structure, and FIG. 14(b) expresses the data structure of (a) as a cubic shape. Here $x_0$, $y_0$, $z_0$ represent points of intersection between the surface of the cube and each axis.

The data structure of this embodiment is broadly divided into two portions. The first half of FIG. 14(a) is a portion in which vertex information constituting a polygon is designated. The essential data are the (X,Y,Z) values of the coordinates of the vertices, such as (−1.0,−1.0,−1.0) in FIG. 14(a), and the values (Nx,Ny,Nz) of the normal vector at an optional vertex, such as (−0.57735,−0.57735,−0.57735) in FIG. 14(a). The second-half portion indicates the connectivity of ridge lines constituting the polygon with respect to the designated vertex information, which is phase information. There are initially n-number of ridge lines (four in the quadrangle of FIG. 14(a)) constituting the polygon, and these are followed by index values to n-number of index vertices constituting a polygon. [Indices of 0~n−1 are attached in order to the vertex coordinates of the first half, and the indices of the vertices constituting the polygon are placed in a row, such as (0, 1, 2, 3) in FIG. 14(a). These are indicated as points 0 through 7 in the cubic shape of FIG. 14(b).] In the final data structure of the cube, a plurality of polygons in a plane area combined and the polygons form a quadrangle. In FIG. 14(b), a cube is illustrated for the sake of simplicity. However, it is obvious that a three-dimensional model such as a cylinder is formed in the same manner; the amount of data is merely greater and the data structure is just more complicated.

Figure 15:
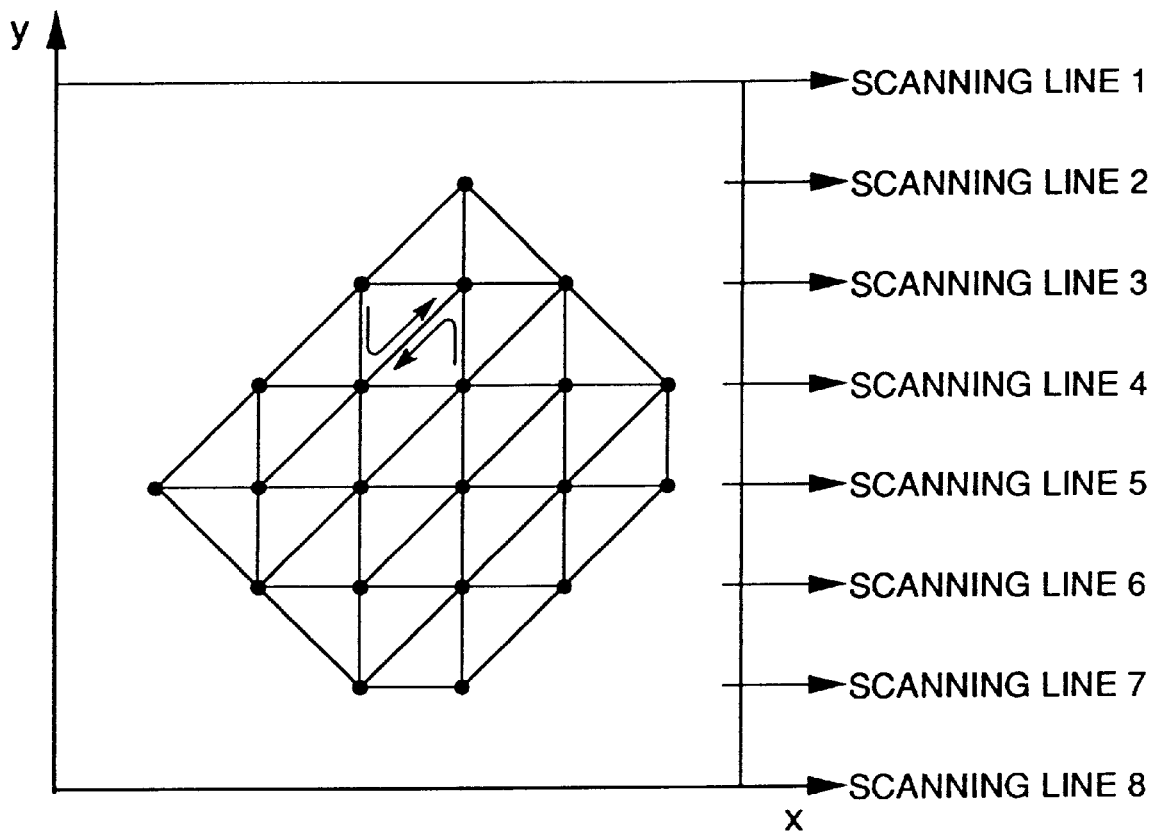
FIG. 15 is a diagram showing the scanning state of a measured range image.

At step S501, phase information, which is connectivity information regarding the vertices, is constructed after the extraction of vertex information of a part of the object indicated by the black dots in the range image on the sensor side of the obtained lattice shape (see FIG. 15, which is an example in which resolution is reduced in order to simplify the description). Basically, the polygon created by the algorithm of this embodiment is made a triangle owing to the ease of processing. When the phase information is constructed, processing is executed every scanning line, as shown in FIG. 15. This will be described in somewhat greater detail.

The processing indicated below is executed by scanning pixel values in order from the smaller values of x in the direction of scanning lines 1, 2, . . . , n along the y direction. FIG. 17 illustrates, in the form of pseudo-coding, the algorithm for when ridge-line phase information is constructed by scanning the value of a p-th pixel in the x direction on an n-th scanning line. In FIG. 17, let depth (p,n) represent the range pixel value (depth) at a pixel (p,n) in two dimensions. The procedure of the algorithm shown in FIG. 17 is the flowchart of FIG. 16 when expressed in simplified form.

It is determined at step S81 whether the present pixel of interest is on an object. If the pixel is on an object, the program proceeds to steps S82, S83, where it is determined whether a pixel to the left or right of the pixel of interest lies in the background. If it does, then the pixel of interest is registered as the contour of the object at step S84. Next, at step S85, a "1" flag is set if four pixels inclusive of the pixel of interest and the pixels below, to the right and to the lower right of it lie on the object, and a "0" flag is set if these pixels lie in the background. Then, at step S86, a polygon (a triangle in this embodiment) is created and registered in correspondence with the number of pixels for which the flag is "1". First, in a case where the number of pixels for which the flag is "1" two or less, it is judged that there is no polygon and nothing is registered at step S87. In a case where the number of pixels for which the flag is "1" three, it judged that there is one polygon, and these three "1" pixels are registered as the indices of vertices at step S88. In a case where the number of pixels for which the flag is "1" four, it judged that there are two polygons. Then, at step S89, the pixel of interest and the pixels below it and to the right are judged as defining one polygon, the pixels to the lower right, below and to the right are judged as defining one polygon, and the indices of the vertices are registered. In this example, minute polygons of pixel units are considered, but the polygons may be coarse polygons in conformity with the precision.

The phase information obtained in information indicative of the front surface as seen from the sensor. At step S503, position information indicative of the back surface is computed from the measured range-pixel values and the information indicative of the main axis.

Specifically, let $(x_1,y_1,z_1)$ and $(x_2,Y_2,z_2)$ represent two points which decide the axis of rotation, and let $(x_p,y_p,z_p)$ represent a range value already known. Then, t in Eq. (18) below is solved, and the solution is utilized to obtain a point $(x_c,y_c,z_p)=[x_1+t(x_2-x_1), y_1+t(y_2-y_1), z_1+t(z_2-z_1)]$, which is the point of intersection between the straight line $(x_1,y_1,z_1)$, $(x_2,y_2,z_2)$ and the perpendicular to this straight line from the point $(x_p,y_p,z_p)$. A position $(2x_c-x_p, 2y_c-y_p, 2z_c-z_p)$ on the back surface, which is a symmetrical point of $(x_p,y_p,z_p)$ with regard to $(x_c,y_c,z_p)$, is calculated, and this is appended as vertex information of the polygon.

$$\begin{bmatrix} x_2 - x_1 \\ y_2 - y_1 \\ z_2 - z_1 \end{bmatrix} [x_1 + t(x_2 - x_1) - x_p y_1 + t(y_2 - y_1) - y_p z_1 + t(z_2 - z_1) - z_p] = 0 \qquad (18)$$

At step S504, a series of indices of vertices forming the peripheral contour from the index values of the front-surface vertices corresponding to the back-surface vertices are stored internally at the same time, and phase information of the back surface is created utilizing the phase information obtained at step S503. Periphery information, which is a series of indices of vertices forming the peripheral contour of the back surface, also is stored in the same manner as at step S502.

Next, in order to connect the outer periphery of the front surface and the outer periphery of the back surface at step S505, the area of the triangle obtained by the connected lines is treated as an evaluation function using dynamic programming, and the front and back surfaces are connected so as to minimize the cost. As a result, the triangle obtained by the connection is appended to the information indicative of the polygon model. Thus, the shape model of a solid three-dimensional object having axial symmetry is created.

Finally, at step S106, the three-dimensional model [see FIG. 14(a)] obtained at step S105 is interpreted, after which a graphics command is issued to project the three-dimensional shape onto a two-dimensional plane and verify the cubic shape. In the algorithm of this embodiment, this function is implemented by using a graphics library such as PHIGS. Examples of processing specific to three-dimensional processing at such time are lighting of the light source, shading, elimination of concealed lines and concealed surfaced, the depth cue effect, etc.

In accordance with this embodiment, shape data of an unknown portion can be furnished based upon a range image obtained from one direction. Consequently, a three-dimensional shape can be inputted and re-utilized in simple fashion without expensive modeling software such as CAD software.

Example of Display of Three-dimensional Model

FIGS. 18(a) and 18(b) are diagrams showing the construction of a memory according to a third embodiment of the present invention.

The programs stored in the program memory 1 include a calculation program 311 for calculating the sense of a surface from shape data, and a display program 312 for displaying the sense of the surface obtained. The data stored in the data memory 2 include shape data 321 inputted from a three-dimensional shape input unit, a three-dimensional model creating unit or a three-dimensional shape data base, and sense data 322 indicating the sense of the surface of an object obtained by the processing of this embodiment.

The items of data mentioned above will be described before discussing the algorithm of the processing according to this embodiment. The shape data 21 represent the position of the object surface in three-dimensional space. Specifically, the data represent the coordinate positions of points on a surface, a mathematical expression representing the object or coordinate positions of characteristic points if the object is a geometrical object, the vertices of a polyhedron, phase information, etc. The data 322 indicative of the sense of a surface represent the sense of the object surface in numerical form. In this embodiment, a unit normal vector is used. There is sense with regard to a reference point or sense with regard to line of sight in three dimensions.

Figure 19:
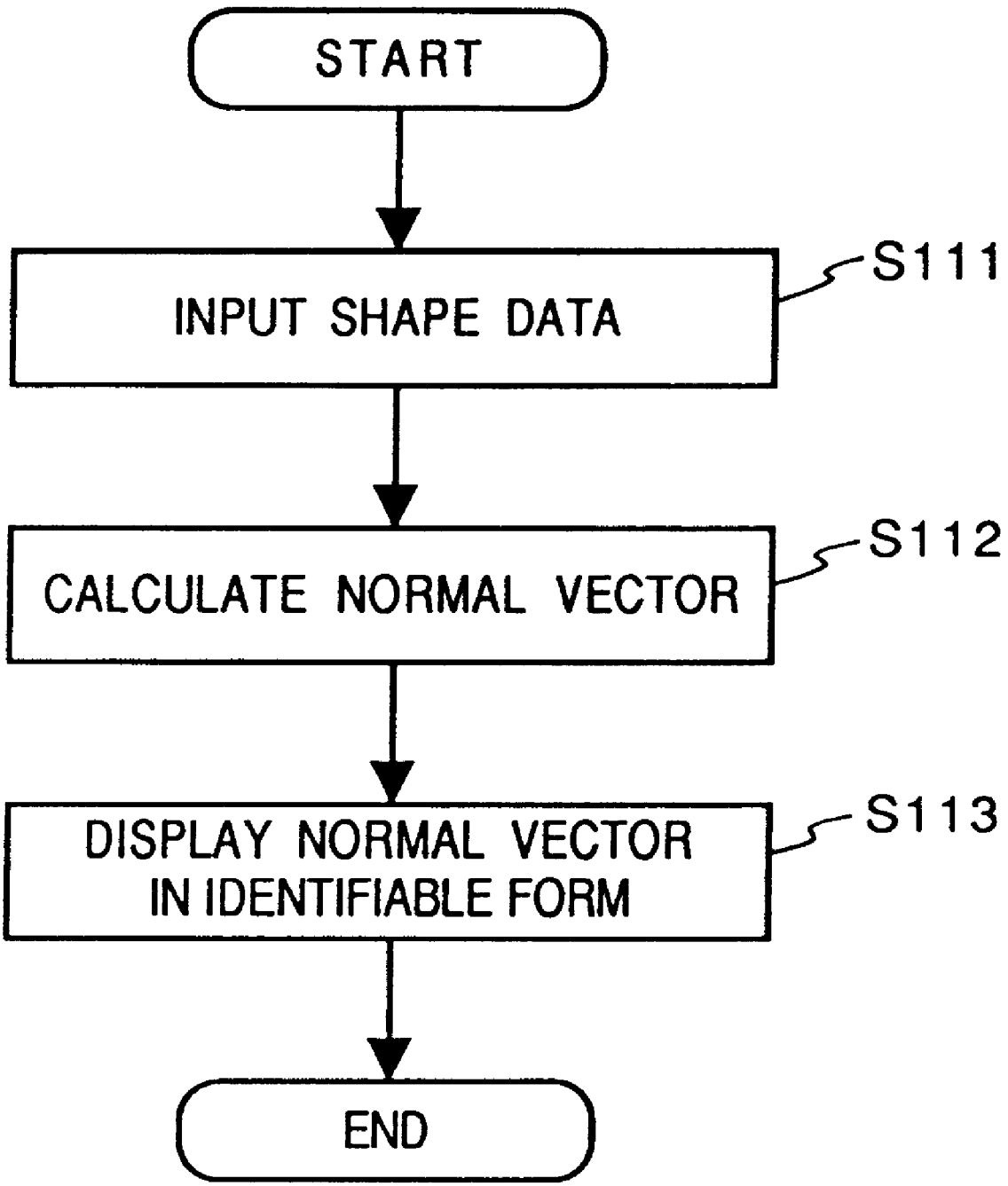
FIG. 19 is a flowchart showing a basic algorithm according to the third embodiment.

The general flow of the algorithm of this embodiment will now be described with reference to FIG. 19.

First, at step S111, the shape data 321 of an object is obtained from a three-dimensional shape input unit, a three-dimensional shape-data creating unit or a three-dimensional shape data base. Furthermore, this embodiment is characterized by the processing which follows acquisition of the shape data 321, and the creation of this shape data 321 will now be described here. Next, at step S112, the unit normal vector at each point on the surface of an object is calculated from the shape data 321. Algorithms for calculating a unit normal vector are described in detail in "A Hybrid Technique for Segmenting a Range Image based upon Differential Geometric Characteristics" by Naokazu Yokoya and Martin D. Levine, Joho Shori Gakkai Ronbunshi, Vol. 30, No. 8, August 1989. One of these is used here. Next, at step S113, the unit normal vector is converted into data capable of being identified, and this is displayed on a two-dimensional plane.

One type of unit normal vector present in an image possesses information indicative of sense, number and distribution. These items of information are expressed by a combination of symbols such as characters, numerals, arrows and dots and attributes such as the accompanying color, size, length and display position. This is a conversion (referred to also as symbolization) to identifiable data referred to in this invention. The displayed information, symbols and attributes can be selected by the user in dialog fashion depending upon the purpose of use.

Figure 21A:
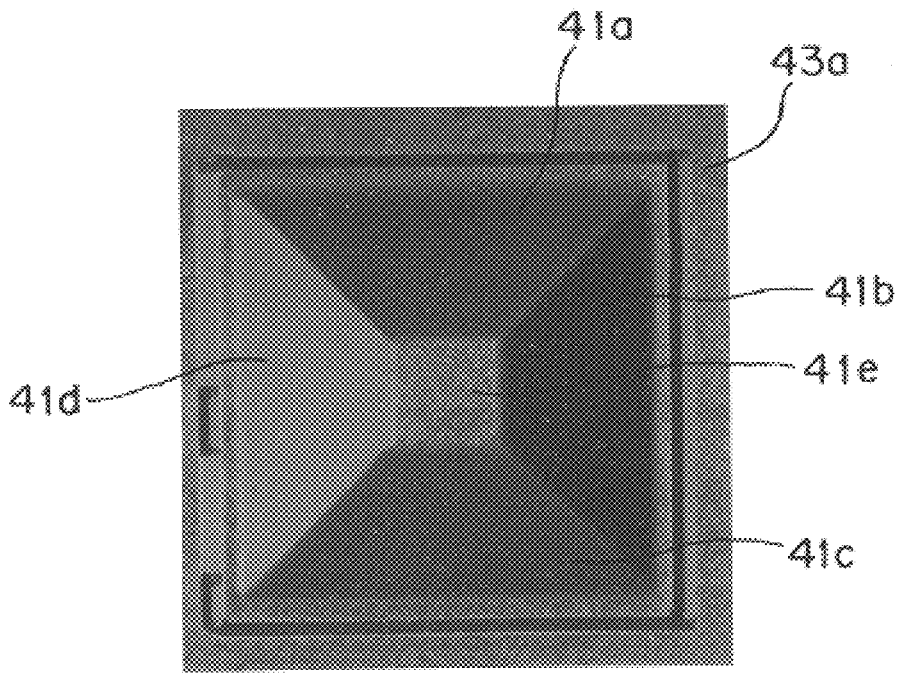
FIGS. 21A(a) and 21A(b) show examples in which the sense of the surface of an object surface is displayed as the color of each point.
Figure 21A:
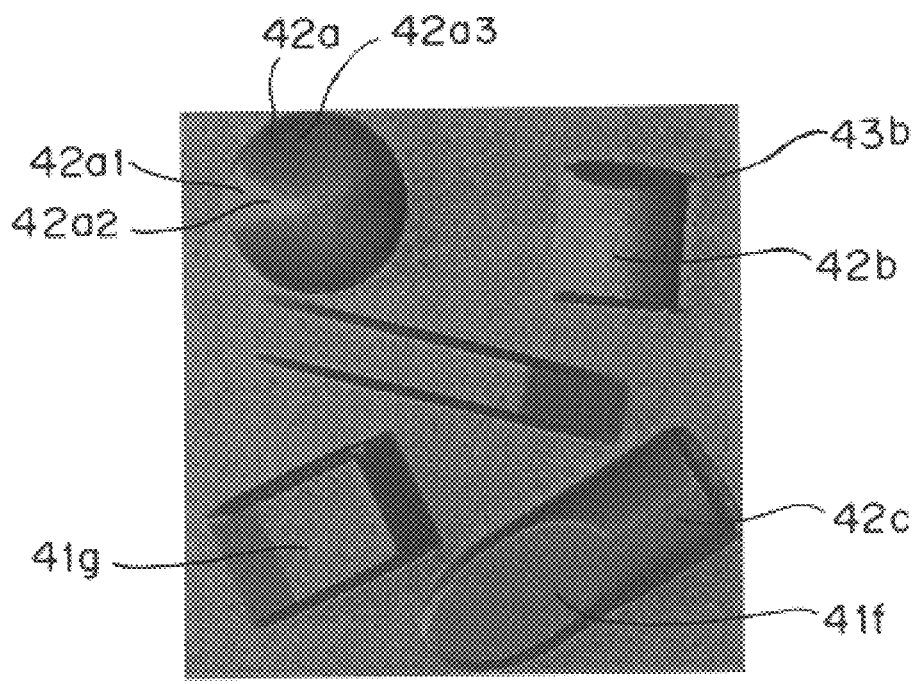

Examples of symbolization of a unit normal vector at step S113 are illustrated in FIGS. 20(a), 20(b) of and 20(c) and in FIGS. 21A(a)–21B(b). FIGS. 20(a)–20(c) show examples in which the sense of an object surface is displayed as the length and direction of each line segment, FIGS. 21A(a) and 21A(b) show examples in which the sense of an object surface is displayed as the color of each point, and FIGS. 21B(a) and 21B(b) show, change original color images corresponding to FIGS. 21A(a) and 21A(b).

The algorithm for obtaining FIGS. 20(a), 20(b) and 20(c) will be described.

Let $(n_x, n_y, n_z)$ represent the unit normal vector of a point (x,y) on a range image. Further, let s represent the sampling interval of the range image. In a case where a range image is seen from a direction parallel to the Z axis at the middle of the image, the unit normal vector can be expressed as a straight line connecting point (x,y) to point $(x+n_x, y+n_y)$. However, the straight line is very short and its direction is difficult to distinguish under these conditions. Accordingly, the normal vector is multiplied s times in advance. At this time, the unit normal vector is a straight line from point (x,y) to point $(x+sn_x, y+sn_y)$.

Furthermore, when it is attempted to observe a range image from a different direction, the image should be rotated about the X and Y axes by angles of $\alpha$ and $\beta$, respectively. Let z represent the height, from the X-Y plane, of a point (x,y) on an image at this time. In such case, (x,y) is converted into $[x\cos\beta+y\sin\beta, -z\sin\alpha-(x\sin\beta iy\cos\beta)\cdot\cos\alpha]$, and $(x+sn_x, y+sn_y)$ is converted into $[(x+sn_x)\cdot\cos\beta+(y+sn_y)\cdot\sin\beta, -(z+sn_x)\cdot\sin\alpha-\{(x+sn_x)\cdot\sin\beta-(y+sn_y)\cdot\cos\beta\}\cdot\cos\alpha]$. Accordingly, the normal vector in this case is a straight line connecting two points obtained after the points (x,y) and $(x+sn_x, y+sn_y)$ have been connected.

Figure 22:
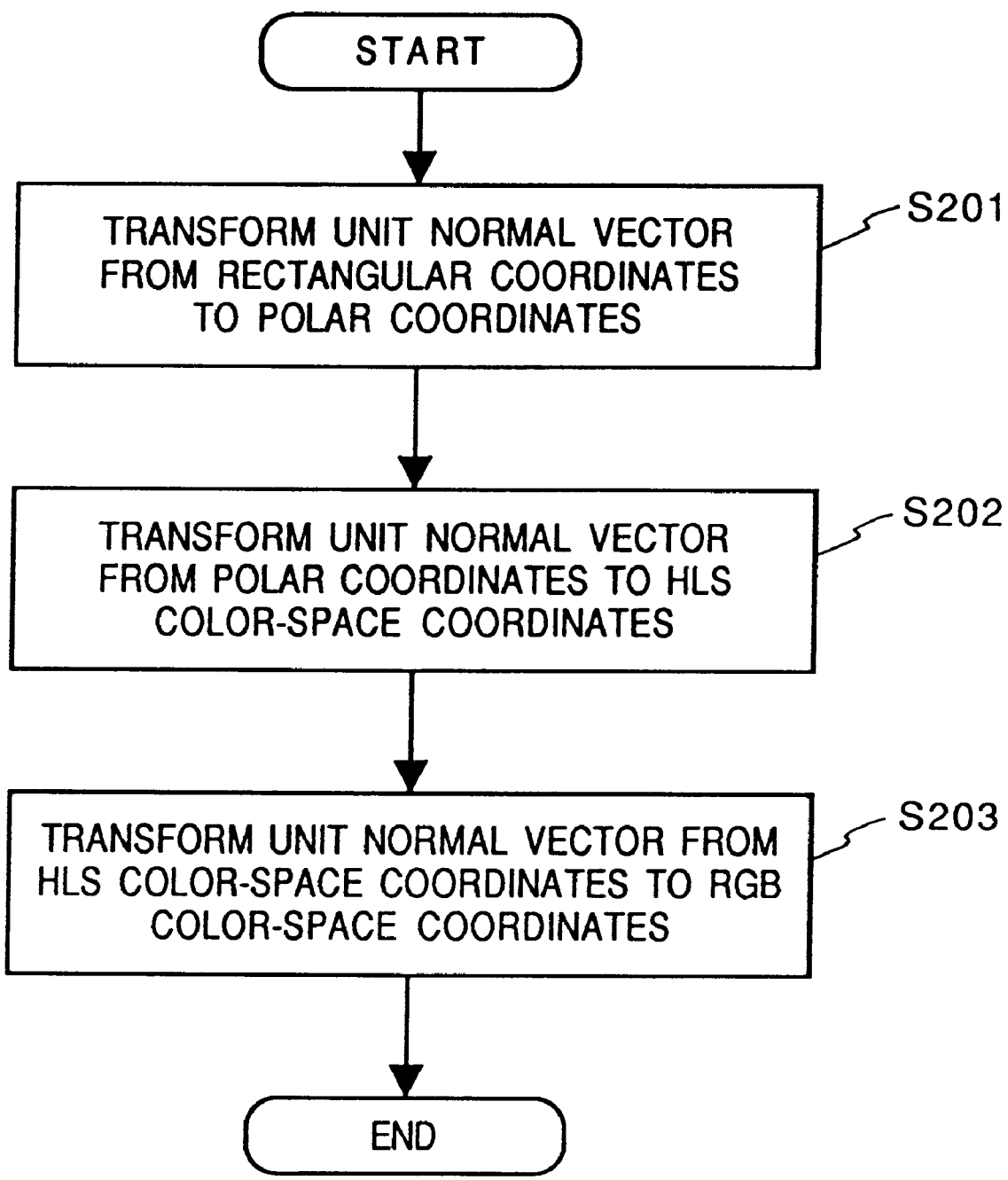
FIG. 22 is a flowchart showing an algorithm for converting a unit normal vector into a color.

An algorithm for converting a unit normal vector into color for in instance in which FIGS. 21A(a)–(b) and 21B(a)–(b) are displayed will be described as an example of symbolization. FIG. 22 is the flowchart in simple form.

At step S201, the normal vector given by the rectangular coordinates (x,y,z) is transformed into a normal vector in polar coordinates $(1,\theta,\phi)$, where $\theta$ represents the angle of rotation (0 to 360°) of the normal vector about the z axis, and $\phi$ represents the angle (0 to 90°) of the normal vector from the x-y plane.

Next, the polar coordinates $(1,\theta,\phi)$ are transformed into HLS color-space coordinates (h,0.5,s) at step S202. The transformation equation is $h=\theta$, $s=\phi/90°$, where h represents hue and varies from 0 to 360°, blue is 0°, magenta is 60°, red is 120°, yellow is 180°, green is 240° and cyan is 300°. If we let $\alpha$ represent the hue of a color, then $(\alpha+180°)$ mod 360° will represent the complimentary hue thereof. Further, s represents saturation and varies from 0 (achromatic) to 1.0 (the most brilliant color for a given luminance). The colors having the highest saturation in a plane of equal hues are arrayed on a hue circle for which L (luminance) is 0.5.

Finally, the HSL color-space coordinates (h,0.5,s) are transformed into RGB color-space coordinates (r,g,b) at step S203, and the point at which the unit normal vector is present is displayed in this color. With regard to an algorithm for transforming the HSL color-space coordinates (h,0.5,s) into RGB color-space coordinates (r,g,b), a detailed description is given, for example, in "Computer Imaging", Television Gakkaihen, Corona Publishing Company. One of these is used.

The examples of FIGS. 21A(a)–(b) and original color images of FIGS. 21B(a)–(b) thus displayed will now be described in further detail. In FIGS. 21A(a)–(b), numerals 43a, 43b denote background, for which an achromatic color exhibiting low luminance is selected, by way of example.

In FIGS. 21A(a)–(b), numerals 41a~41g denote planes. Therefore, hue varies in correspondence with sense of the plane about the z axis, and saturation varies in correspondence with the angle of the plane from the x-y plane, though this is constant in one plane. For example, the planes 41a, 41b, 41c, 41d have different hues but the same saturation. Depending upon the difference in hue, it can be determined whether the plane 41e is concave or convex. Since saturation represents the slope of the plane, the degree of convexity or concavity of the plane 41e can be determined. These determinations are not made by storing color. Rather, assignment of hue, saturation and luminance that will enable a determination to be made from the impression of a displayed image is desirable.

Numerals 42a~42c denote curved surfaces. In surfaces having the same sense about the z axis, hue is the same but saturation varies. For example, in case of a spherical surface 42a, points $42a_1$ and $42a_2$ have the same hue but the saturation diminishes as point $42a_1$ is approached from point $42a_2$. Points $42a_1$ and $42a_3$ have different hues but the same saturation. The original color images of FIGS. 21B(a)–(b) demonstrate the above description. Here also, judgment of shape is not made by storing color; assignment of hue, saturation and luminance that will enable a determination to be made from the impression of a displayed image is desirable. Accordingly, the assignment of hue and saturation in the HLS color-space coordinates (h,0.5,s) in the above-described embodiment is one example thereof. It will suffice to select the optimum assignment corresponding to the objective and application.

This embodiment is described taking a display as an example. However, it is obvious that the same effects can be attained even if the invention is applied to output to a printer or the like. Further, the embodiment has been described using a unit normal vector as an indication of the sense of a surface. However, if the data are such that sense is capable of being identified, these data can be used. Though a conversion is made from a unit normal vector to display data, it is also possible to make a direct conversion to display data.

In accordance with this embodiment, the sense of any point on the surface of an object in three-dimensional space is outputted in an identifiable manner. As a result, all surface shapes of objects can be outputted uniquely based upon a single two-dimensional image viewed from any direction, and the operations, number of steps and complicated processing necessary for recognizing the shape of an object can be reduced. In addition, the precision with which the shape of an object is recognized can be raised by selecting information in line with the objective and the data conversion best suited for the information.

Example of Creation of Three-Dimensional Model Based Upon Polygonal Patches

Figure 24:
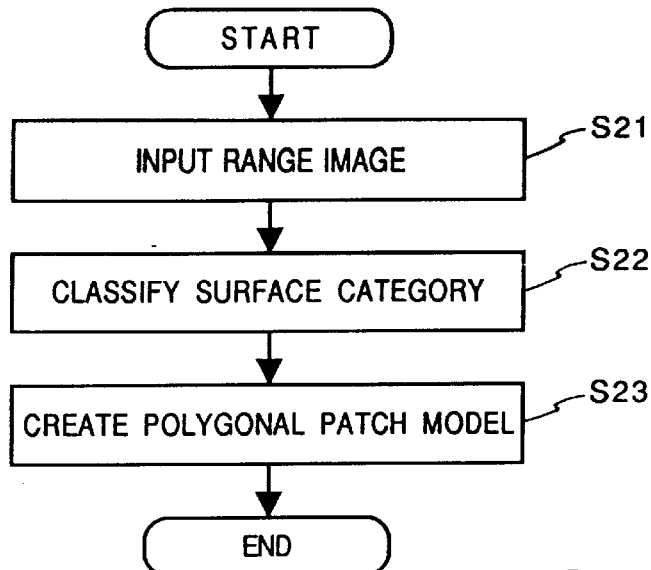
FIG. 24 is a flowchart showing the overall processing of the fourth embodiment.

FIGS. 23(a) and (b) are diagrams illustrating the construction of a memory according to the fourth embodiment, and FIG. 24 is a diagram showing a flowchart of overall processing according to the fourth embodiment.

In FIG. 23(a) illustrates the programs stored in the program memory 1 of this embodiment. The programs include a range-image input processing program 401 for inputting a range image to the apparatus, a surface classifying program 402 for creating a surface category map from the given range image, and a polygonal patch model creating program 403 for creating a polygonal patch model from a range image based upon the surface category map.

FIG. 23(b) shows the construction of the data memory 2 in this embodiment, in which numeral 411 denotes an inputted range image, 412 a created category map and 413 a created polygonal patch model.

The flow of overall processing of this embodiment will now be described based upon the flowchart shown in FIG. 24. First, at step S21, a range image is inputted as by measuring an object by the laser range finder 7 in accordance with the range-image input processing program 401, and the range image is stored in the data memory 2 as the range-image data 411. This input is not limited to one obtained by actual measurement, for an arrangement can be adopted in which data stored in an image data base are inputted.

Next, at step S22, the inputted range-image data 411 (three-dimensional coordinate data of each point constituting the surface of the object) are processed in accordance with the surface classifying program 402. The category of the surface constituting the object surface is classified to create the surface category map 412.

In accordance with the polygonal patch model creating program 403, the polygonal patch model 413 is created at step S23 by polygonal patches best suited for the classified surface category based upon the range-image data 411 and surface category map 412.

Figure 25:
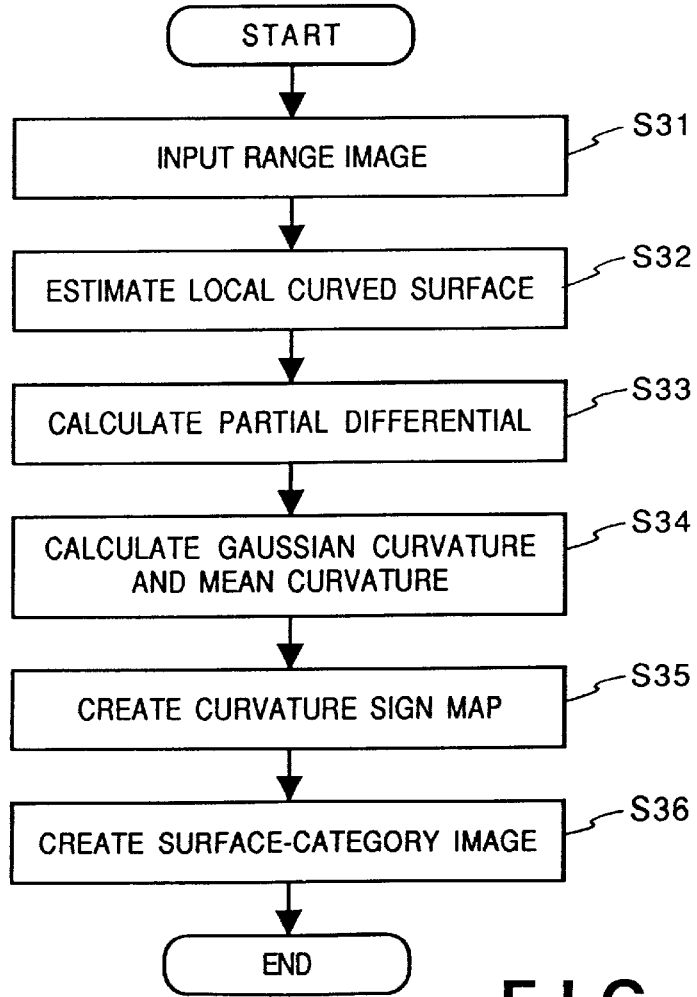
FIG. 25 is a flowchart of surface classification processing according to the fourth embodiment.

FIG. 25 is a flowchart showing the details of step S22, namely the processing for surface classification.

First, at step S31, a range image having a range value for each pixel of the image is inputted as a two-dimensional array of three-dimensional coordinate data, whereupon estimation of a local curved surface is performed at step S32 by least-square approximation using a window of a suitable size. This is followed by step S33, at which first and second differentials at each pixel are calculated from the estimated local curved surface or by another method. Then, at step S34, Gaussian curvature and mean curvature are calculated, followed by step S35, at which a curvature sign map is created from the signs of the two curvatures obtained. Finally, at step S36, classification is made into eight surface categories shown in FIG. 26 depending upon the sign, and a surface-class image is generated in which the respective codes (the surface-class numbers) serves as pixel values.

An algorithm for curved-surface classification described in brief here is disclosed in the paper "A Hybrid Approach to Range Image Segmentation Based on Differential Geometry" by Naokazu Yokoya and Martin D. Levine, Joho Shori Gakkai Ronbunshi, Vol. 30, No. 8, August 1989. Here a detailed description is omitted.

FIG. 27 is a flowchart corresponding to the polygonal patch model creating program 403, and FIG. 28 is a diagram schematically showing an example of processing of range-image data processed by the procedure of FIG. 27.

At step S51 in FIG. 27, the surface-class image [FIG. 28(a)] created by the procedure described in connection with the flowchart of FIG. 25 is inputted, and an image [FIG. 28(b)] representing one certain surface class is successively extracted from this surface-class image at step S52. FIG. 28(b) is an image in which only location at which the surface class is 5 are extracted, by way of example.

At step S53, the same label (number) is assigned to all pixels belonging to the same connecting component, and a label image [FIG. 28(c)] is generated in which different labels are assigned to different connecting components.

This is followed by step S54, at which a polygonal patch model corresponding to the surface class is generated for every label (region number) assigned at step S53. That is, with regard to a region in which the surface class is n, a procedure is executed for creating a polygonal patch of each region of a surface for which the surface class is classified into n. This procedure will be described in detail later.

If it is found at step S55 that the next surface class number is that of a class which has not yet been processed, then processing is repeated from step S52.

Processing is terminated when the eighth class number ends.

Thus, steps S52~S54 are carried out for all extracted surface classes.

Next, in the surface classes shown in FIG. 26, a procedure for creating a polygonal patch for each region of a surface classified as class 5 will be described in accordance with the flowchart of FIG. 29.

Step S71 calls for inputting the results obtained by region-labeling an image which represents a surface whose surface class has been classified as class 5 at step S53.

Step S72 calls for extracting the contour lines of all regions of surfaces whose surface class has been classified as class 5, and which have undergone labeling, at step S53 [FIG. 28(d)].

As shown in FIG. 28(d), numbers equal to those assigned at step S53 are assigned to the contours.

Step S73 calls for extracting the contours in numerical order and applying the processing below to each one.

At step S74, the contour is traversed setting out from a certain predetermined starting point, numbers are assigned successively to points located every predetermined number of pixels on the contour, and the coordinates of these points on the contour are read. The points are referred to as vertices, and the numbers are referred to as vertex numbers.

This is followed by step S75, at which the coordinates in three-dimensional space corresponding to the coordinates on the image read at step S74 are read from the original range image, and these are written in a polygonal patch data table, shown in FIGS. 30(a)–(b), as vertex information along with the surface category numbers, region numbers (equal to the contour numbers) and vertex numbers. Furthermore, the traversed vertex numbers are written in the polygonal patch data table in order as phase information.

If the next contour number is one which has not yet undergone processing ("NO" at step S76), then processing is repeated from step S73 onward. When all contour numbers have ended, processing is terminated.

Thus, steps S73~S75 are carried out with regard to all contours extracted at step S72.

Finally, a polygonal patch data table shown as an example in FIGS. 30(a)–(b) is created.

Polygonal patches are created in the same manner also in regions of a surface for which the surface class of FIG. 26 is other than 5(1 or 2 or 3 or 4 or 6 or 7 or 8).

Figure 31:
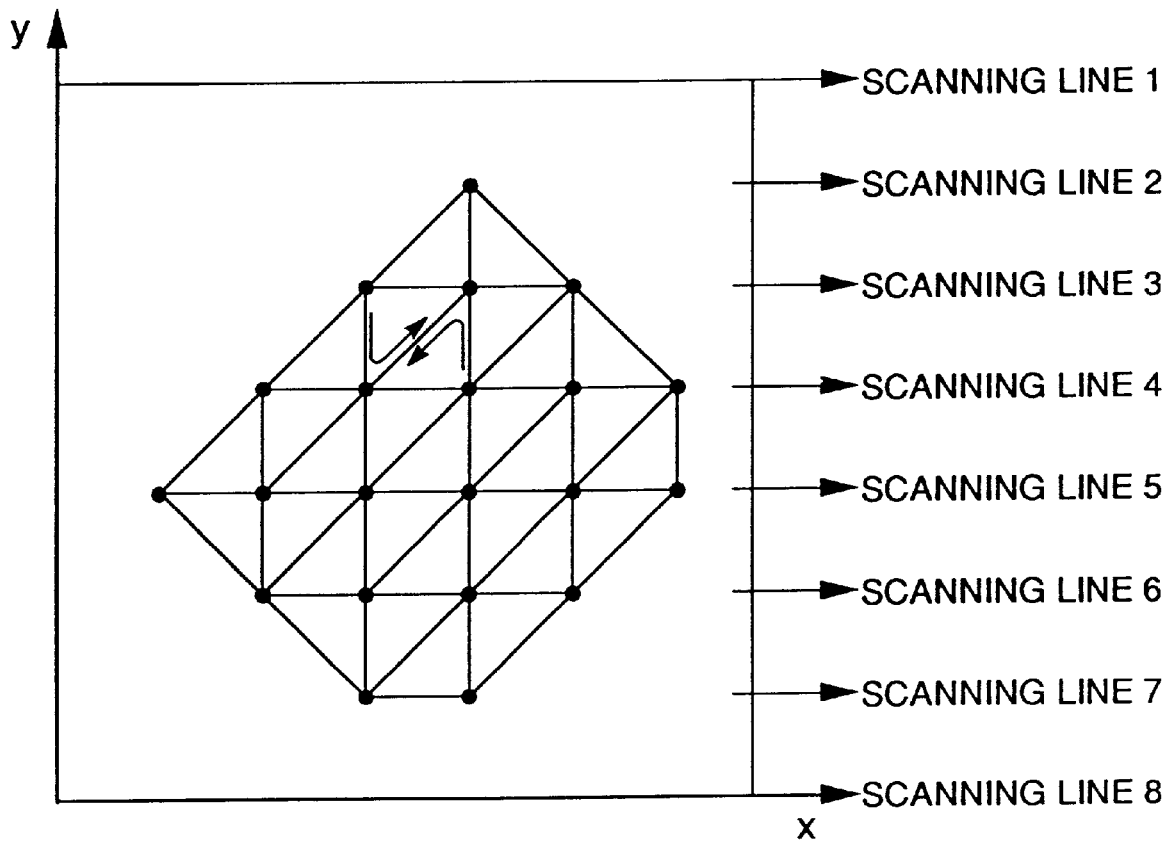
FIG. 31 is an explanatory view for creating a polygonal-patch model of each area.

FIG. 31 is an explanatory view in which the polygonal patch model is created.

A certain point inside an extracted region is extracted in order from smaller values of x in the scanning-line direction (along the x axis in FIG. 31) and from smaller values of y in a direction (along the y axis in FIG. 31) perpendicular to the scanning lines, and the processing set forth below is executed.

Figure 16:
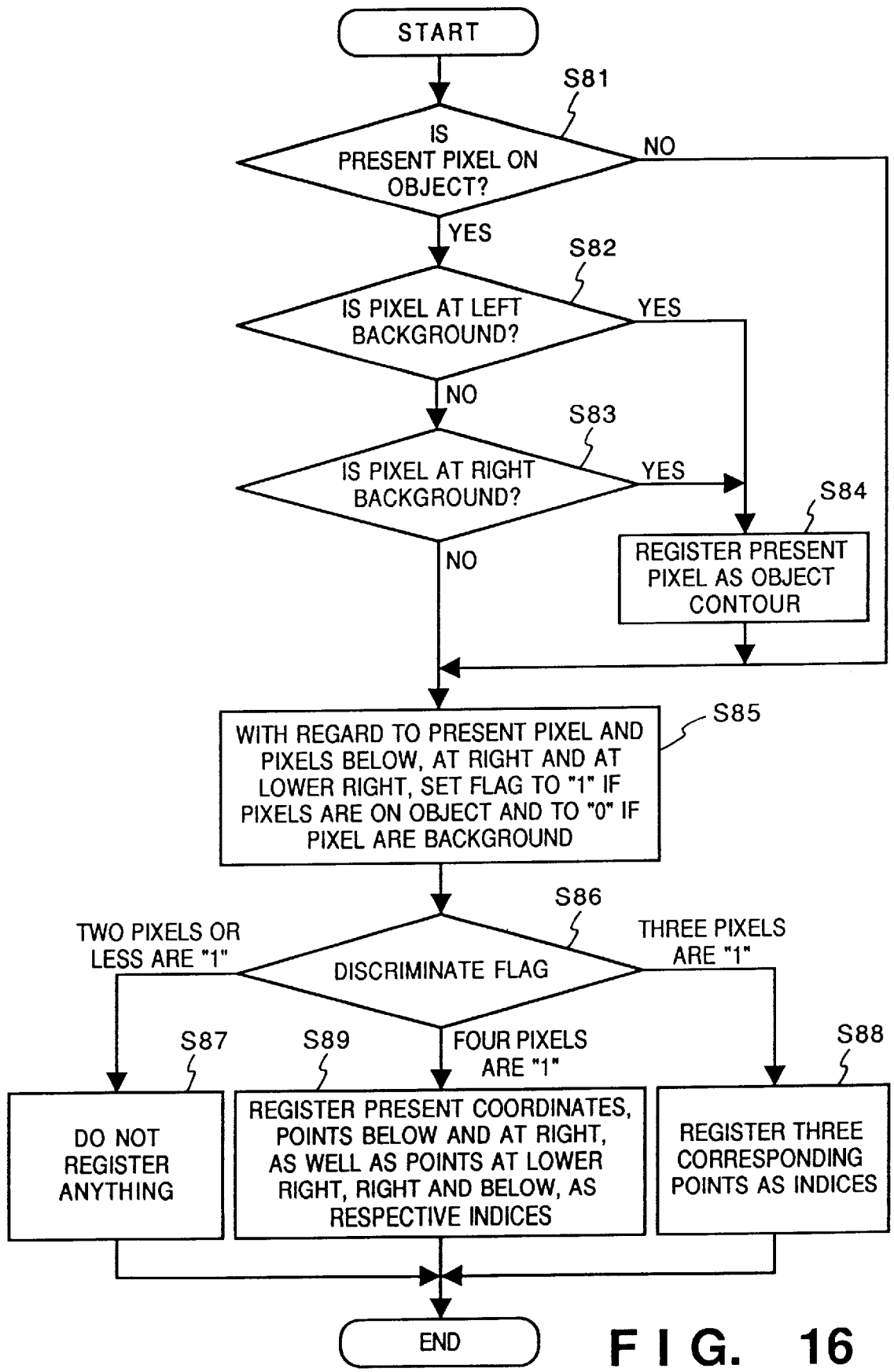
FIG. 16 is a flowchart showing an algorithm for calculating phase information of a ridge line.

The flowchart for extracting the p-th value in the x direction on an n-th scanning line and creating ridge-line phase information is the same as that in FIG. 16 of the second embodiment. An example of pseudo-coding is illustrated in FIG. 45. In FIG. 45, a variable x is a value predetermined in accordance with the surface class.

In processing of this kind, the value of x is set small for a surface class that is highly irregular, and the value of x is set large for a surface class that is flat. As a result, a polygonal patch model can be created in which representative points are selected densely at a portion having a complicated shape and sparsely at a portion that is smooth.

Other Example Based Upon Polygonal Patches

In this embodiment, if, after representative points are selected densely from points of interest, a change in a normal vector between a point of interest and a selected point is less than a predetermined value, the representative points are re-selected at greater intervals, whereby the spacing of representative points at portions where change is great is narrowed and the spacing of representative points at smooth portions is widened.

FIGS. 32(a)–(b) illustrate the construction of the program memory 1 and data memory 2 according to the fifth embodiment. FIG. 32(a) is a diagram showing the programs in the program memory 1 of the fifth embodiment. The programs include a range-image input processing program 501 the same as that in the fourth embodiment, a normal-vector computation program 502 for obtaining a normal vector by spatially differentiating the range-image data applied thereto, and a polygonal patch model creating program 503 in accordance with this embodiment.

FIG. 32(b) shows the construction of the data memory 2 in this embodiment. Numeral 511 denotes the inputted range image, 512 the computed normal vector, and 513 the polygonal patch model created according to this embodiment.

Figure 33:
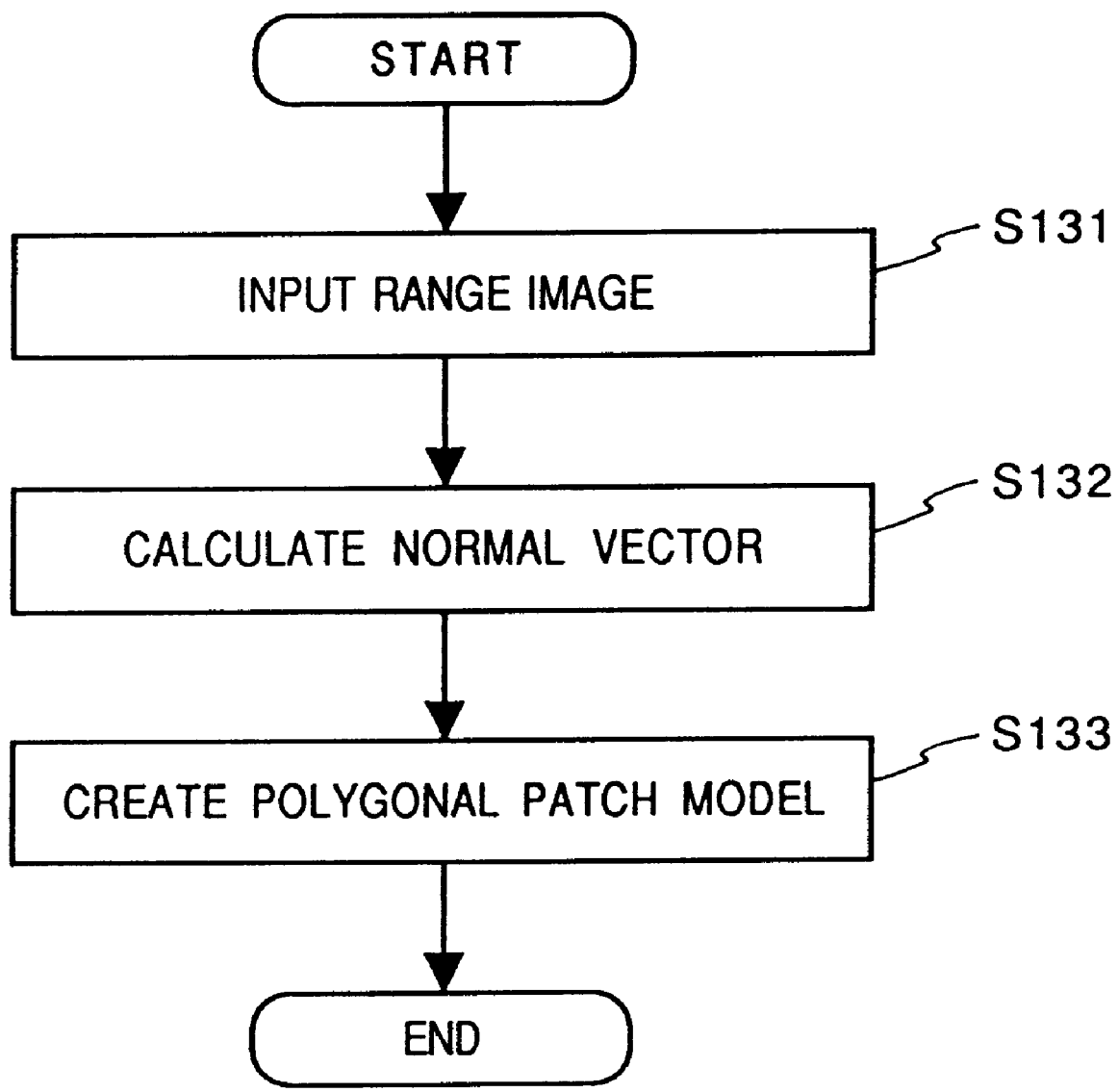
FIG. 33 is a flowchart showing the overall processing of the fifth embodiment.

The flow of overall processing in this embodiment will be described based upon the flowchart shown in FIG. 33. First, at step S131, a range image is inputted as by measuring an object by the laser range finder 7 in accordance with the range-image input processing program 501, and the range image is stored in the data memory 2 as the range-image data 511. This input is not limited to one obtained by actual measurement, for an arrangement can be adopted in which data stored in an image data base are inputted.

Next, at step S132, the inputted range-image data 511 (three-dimensional coordinate data of each point constituting the surface of the object) are processed in accordance with the normal-vector computation program 502. In order to obtain the normal vector, the inputted range image need only be spatially differentiated. This method of calculating a normal vector is described in the aforementioned paper entitled "A Hybrid Technique for Segmenting a Range Image based upon Differential Geometric Characteristics".

In accordance with the polygonal patch model creating program 503, the polygonal patch model 513 is created at step S133 by polygonal patches best suited for the surface shapes based upon the range-image data 511 and normal-vector data 512.

Figure 34:
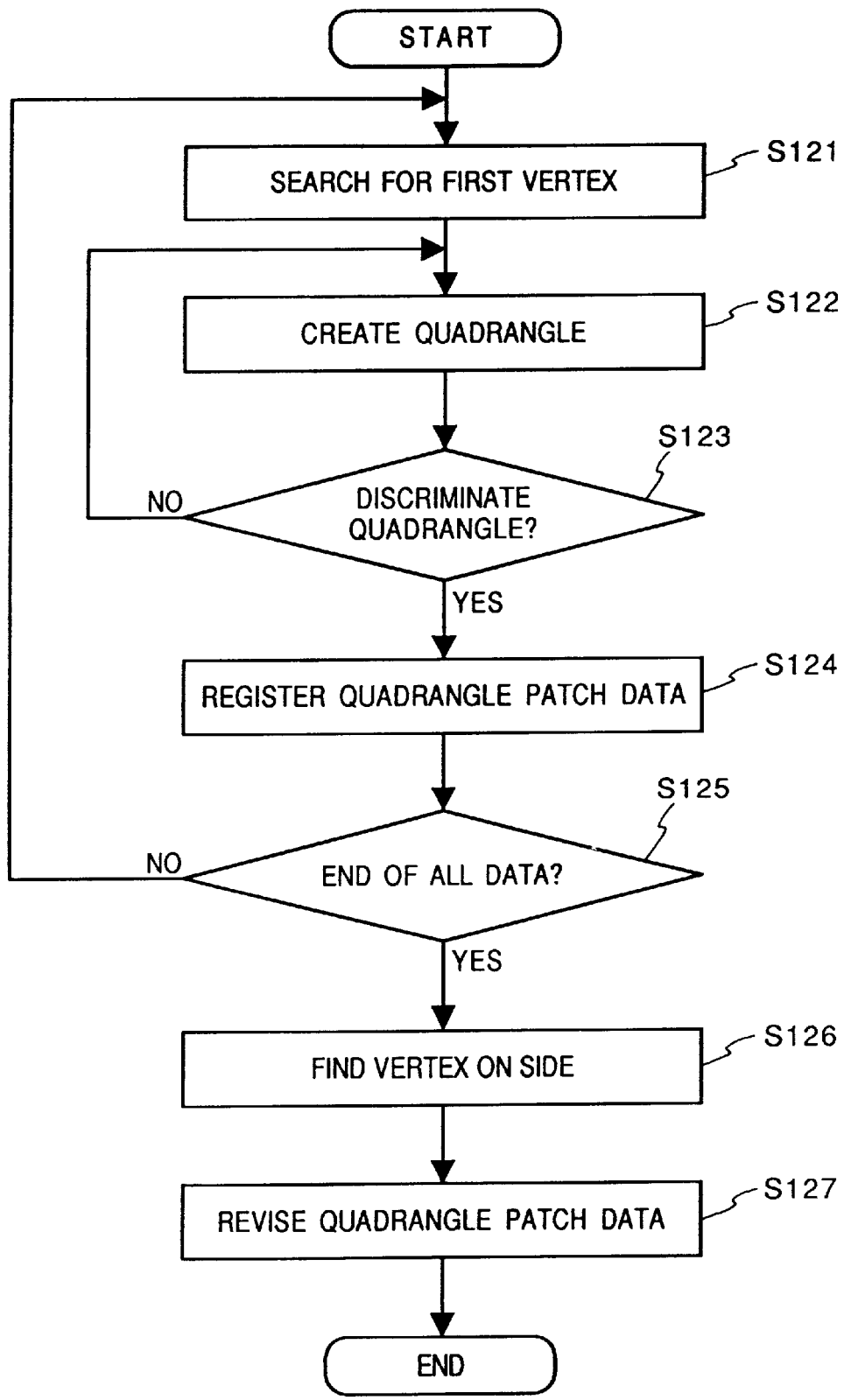
FIG. 34 is a flowchart showing a processing procedure for creating a polygonal-patch model according to the fifth embodiment.

A procedure for creating a polygonal patch model using a range image and a normal vector will be described with reference to the flowchart of FIG. 34. It will be assumed that the polygonal patches are quadrangular patches.

First, at step S121, the range image is scanned sequentially, as shown in FIG. 35, to find a point (let this point be A in FIG. 36) that is on the object surface and not covered by a patch. Next, at step S122, a square ABCD having the found point A as one vertex and a side of length i (the densest spacing in the model>to be created) is created.

This is followed by step S123, at which it is determined whether three selected vertices B, C, D are all points still not covered by patches, and whether all of the internal products between a unit normal vector at point A and the unit normal vectors at points B, C, D are greater than a threshold value given in advance. If B, C, D are all points not yet covered and the internal products of the normal vectors are all greater than the threshold value, then the operation i=i+1 is performed and step S122 is repeated.

If any of the three vertices B, C, D is a point already covered by another patch or any of the internal products between the unit normal vector at point A and the unit normal vectors at points B, C, D is less than the threshold value given in advance, the vertices of the quadrangle are set at step S124, the three-dimensional coordinate values of the four set vertices A, B, C, D are read from the range image, the senses of the normal vectors are read from the normal-vector image, and the read data are registered as data indicative of the quadrangular patch.

This is followed by step S125, at which it is determined whether scanning of the entire screen of the range image has ended. If there is a portion still unscanned, processing is repeated from step S121 onward. If scanning of the entire screen has ended, on the other hand, the program proceeds to step S126. Here a point on the side FG of another quadrangle occupied by any vertex constituting the above-described quadrangle is found in the registered quadrangular patch data. Then, at step S127, the three-dimensional coordinate values of the found vertex E are calculated from the equation of the straight line FG, and the quadrangular patch data are revised using these values as the coordinate values of the point E. When the revision of the three-dimensional coordinate values regarding all points such as point E end, the processing for creating the patch model is terminated.

An example of part of the quadrangular patch data created by this procedure is illustrated in FIG. 38.

In accordance with this embodiment, as described above, if, after representative points are selected densely from points of interest, a change in a normal vector between a point of interest and a selected point is less than a predetermined value, the representative points are re-selected at greater intervals. Therefore, a polygonal patch model can be created in such a manner that the spacing of representative points at portions where change is great is narrowed and the spacing of representative points at smooth portions is widened. The shape of the object is expressed with high precision using only a small amount of data. In addition, by describing the connection relationship between data points in the shape model, unnecessary data points can be eliminated or data points can be added later.

Example of Editing of Three-dimensional Model

In this embodiment, geometric data are generated from range-image data and an operation for transforming the geometric data is designated, thereby realizing an animation display by a simple operation.

Figure 39:
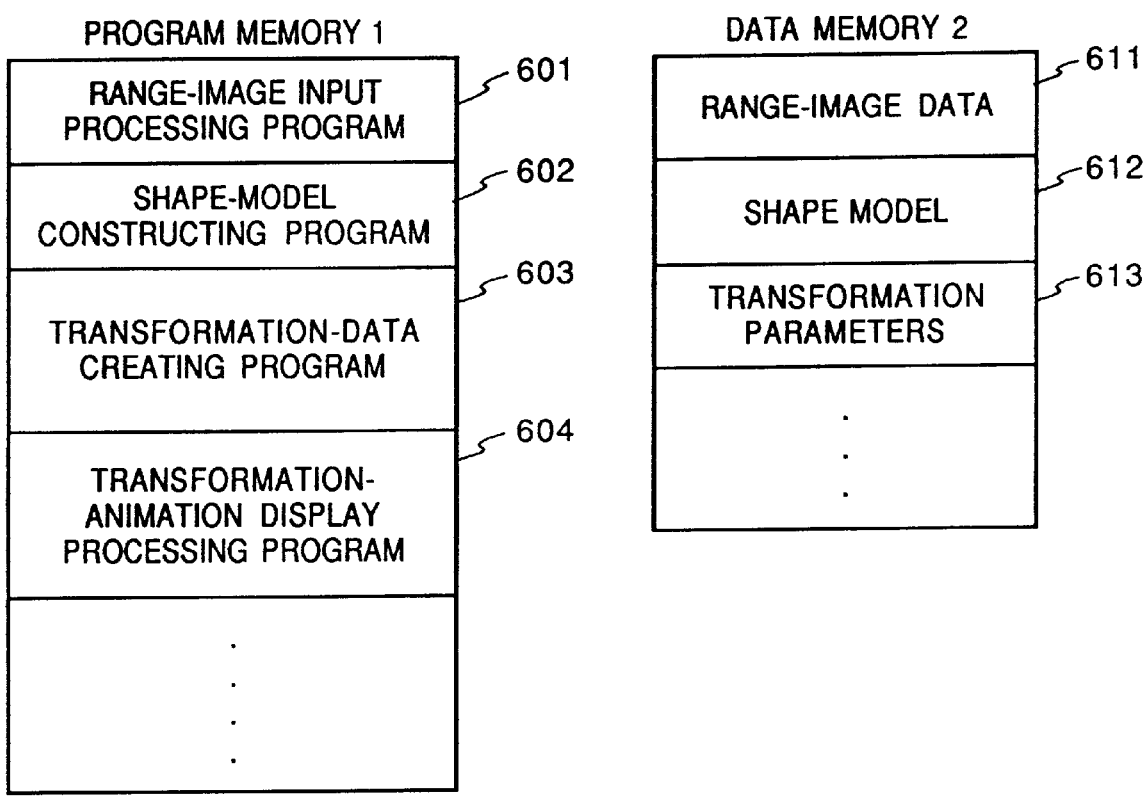
FIGS. 39(a) and 39(b) are diagrams showing the construction of a memory according to a sixth embodiment.
Figure 40:
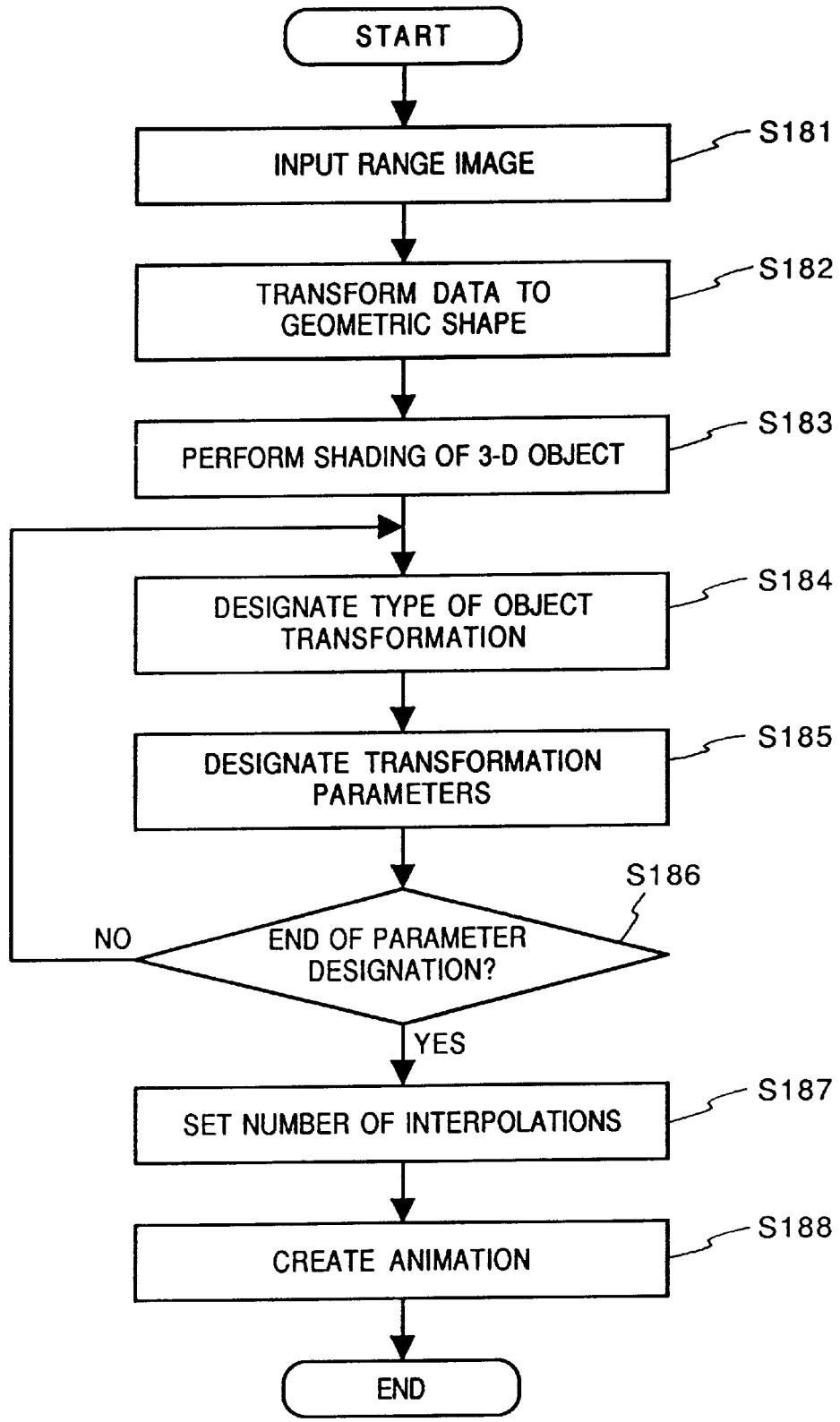
FIG. 40 is a flowchart showing the overall processing of the sixth embodiment.

FIGS. 39(a)–(b) illustrates the construction of the program memory 1 and data memory 2 according to the sixth embodiment, and FIG. 40 shows a flowchart of overall processing.

In FIG. 39(a) is a diagram showing the programs in the program memory 1 of the sixth embodiment. The programs include a range-image input processing program 601 the same as that in the fifth embodiment, a three-dimensional model constructing program 602 for generating various types of 3-D geometric data with regard to the inputted range image, a transformation data creating program 603 which designates/stores parameters for executing various transformation animations with regard to the 3-D geometric shape obtained, and a transformation animation display program 604 which, in accordance with the three-dimensional model and the animation parameters obtained, performs lighting and shading in dependence upon the operation for transforming the object, and carries out a transformation animation.

In the data memory 2, numeral 611 denotes range-image data inputted from a range measuring sensor or range image DB, 612 the shape model constructed as 3-D geometric data by the processing of this embodiment, and 613 the object transformation parameters designated for animation by the user.

The general features of processing according to this embodiment will be described with reference to the flowchart of FIG. 40.

At step S181, the range image is inputted from a laser range finder or image data base, just as in the fourth and fifth embodiments. However, since central and cylindrical types of projections are available in addition to the parallel-projection system in order to measure a range image, in this step a transformation is made to the coordinate space of one projection system (the parallel-projection system) and subsequent processing is unified. A point at which range is greater than a fixed value is taken as infinity in order to be regarded as background; it is not regarded as part of an object.

A three-dimensional shape model is created at step S182. Though mesh, polygon and freely curved surfaces are available as the shape model, as mentioned above, it is desired that the typical shape be selected in dependence upon the characteristics of the object. That is, a polygon model is recommended for an artificial object having a large flat surface, and a mesh or freely curved surface is suited to a smooth surface, such as the image of a face. An example of a polygon model is shown in FIG. 41.

At step S183, light-source information (color, type of light source, attenuation factor), object attributes (object color, various reflection coefficients, normal lines) are given for the geometric shape obtained, and the three-dimensional model is projected onto a two-dimensional plane to perform rendering by phong or glow shading.

Since the image obtained here is only an image seen from one direction, the transformation mode for an animation operation is selected at step S184. Furthermore, the parameters for the transformation are designated at step S185. If it is determined at step S186 that all designations have ended, the program proceeds to step S187. If a plurality of transformation modes are merged, the program returns to step S184.

The number of interpolations in a transformation is set at step S187. This processing is described below. An animation is created and displayed at step S188.

In this embodiment, tapering, twisting and bending are the transformation modes. These will now be described.

FIGS. 42(a)–(d) illustrates the three examples of transformation, and FIGS. 43A(a)–(b) an example of transformation in which tapering and twisting are merged. FIGS. 43B(a)–(b) show an original color image corresponding to FIGS. 43A(a)–(b).

(1) Tapering [FIG. 42(b)]

Though an example of a function for changing the x,y scale of an object along the z axis is illustrated, tapering can be achieved similarly also with regard to the other axes (x and y axes). This is expressed by $$X = r*x \qquad (19)$$
$$Y = r*y$$
$$Z = z$$

and the scale factor is r=f(z).

The transformation of an object can be simulated by changing the function f(z). Further, a normal vector is essential information in order to calculate shading when a three-dimensional object is subjected to rendering (shading). The direction of the normal also changes depending upon the transformation operation. A normal vector $N_t$ after transformation is as follows:

$$N_t = \begin{bmatrix} 1/r & 0 & 0 \\ 0 & 1/r & 0 \\ -f'(z)x/r & -f'(z)y/r & 1 \end{bmatrix} \qquad (20)$$

(2) Twisting [FIG. 42(c)]

(2) Twisting [FIG. 42(c)]

Here an example is illustrated in which the contour is rotated by an angle θ (radians) in the x-y plane about the z axis. Twisting can be realized similarly with regard to the other axes (x and y axes) as well.

$$X = x*\cos\theta - y*\sin\theta$$
$$Y = x*\sin\theta + y*\cos\theta$$
$$Z = z \qquad (21)$$

For the angle of rotation, we have θ=f(z). Here transformation of the object can be simulated by changing the function f(z). Similarly, the normal vector $N_t$ after transformation is as follows:

$$N_t = \begin{bmatrix} \cos\theta & -\sin\theta & 0 \\ \sin\theta & \cos\theta & 0 \\ yf'(z) & -xf'(z) & 1 \end{bmatrix} \qquad (22)$$

(3) Bending [FIG. 42(d)]

The bending function along the y axis is defined as set forth below, but the bending function is similar for the other axes (x and z axes) as well.

Here the curvature of bending is 1/k, the center of the bend is $y=y_0$, the bending angle is $\theta=k(y'-y_0)$, and bending is executed at $y_{min} \leq y \leq y_{max}$, where $$y' = \begin{cases} y_{min} & \text{if } y \leq y_{min} \\ y & \text{if } y_{min} < y < y_{max} \\ y_{min} & \text{if } y \geq y_{max} \end{cases} \qquad (23)$$

$$X = x$$

$$Y = \begin{cases} -\sin\theta(z - 1/k) + y_0 & y_{min} \leq y \leq y_{max} \\ -\sin\theta(z - 1/k) + y_0 + \cos\theta(y - y_{min}) & y < y_{min} \\ -\sin\theta(z - 1/k) + y_0 + \cos\theta(y - y_{max}) & y < y_{max} \end{cases}$$

$$Z = \begin{cases} \cos\theta(z - 1/k) + 1/k & y_{min} \leq y \leq y_{max} \\ \cos\theta(z - 1/k) + 1/k + \sin\theta(y - y_{min}) & y < y_{min} \\ \cos\theta(z - 1/k) + 1/k + \sin\theta(y - y_{max}) & y < y_{max} \end{cases}$$

The normal vector $N_t$ after transformation is expressed as follows:

$$(1 - k'z)N_t = \begin{bmatrix} 1 - k'z & & \\ 0 & \cos\theta & -\sin\theta(1 - kz') \\ 0 & \sin\theta & \cos\theta(1 - kz') \end{bmatrix} \qquad (24)$$

where $$k' = \begin{cases} k & \text{if } y_{min} \leq y \leq y_{max} \\ 0 & \text{else} \end{cases}$$

The various transformation modes (tapering, twisting, bending) described above are designated by using a panel or the like in the window system.

Thereafter, by opening another menu, the initial parameter of animation, the end parameter, the interpolation function and the number of interpolations every second are designated by the user.

An example of a designation (relating to tapering) will be described with reference to FIG. 44. It is possible to designate the initial value (2201) and end value (2202) of the scale factor "r" by a slider or by a direct input of the numerical value, as illustrated in FIG. 44. When an input is made from one mode, the information is accurately reflected in the display of the other mode.

There is a panel for designating, as another input, the number (2203) of generated frames of an image every second when an animation is performed; 1~30 images/sec is selected.

When this done, a CPU interrupt is generated every designated interval and screen updating is executed on the side of the system at which animation is to take place.

Creating an animation involves processing which places an extremely heavy burden upon the CPU. In a case where rendering is carried out solely by a CPU, a situation may arise in which it is difficult to achieve the above-mentioned performance of several frames per second. At such time, each frame is painted off-line and consecutive numbers are assigned to the frames. When the animation is viewed, these images are loaded at one time and it is possible to realize animation in which the impression is given of the images being turned over in rapid fashion.

Finally, an interpolation function (2204) for deciding a parameter "r", which varies with time when animation is executed, is designated. This function indicates the manner in which a change will occur in the time direction from the inputted initial value and end value. The manner of change with time can be designated by a variety of methods.

The simplest is one in which the parameter value varies linearly in the time direction. However, when the user is not satisfied with this, it is necessary to designate a more complicated change. In FIG. 44, an interpolation function is designated utilizing a Bezier curve, by way of example. A function of this kind can be utilized as processing for curve generation in DTP. In general, a variation function of a parameter capable of being expressed in the form p=f(t) can be utilized as the interpolation function.

In this embodiment, tapering, twisting and bending are used as the transformation operations. However, it is required that enlargement/reduction along the x, y, z axes, rotation about each axis and movement in the x, y, z directions also be realized as other transformations upon taking the transformation operations into consideration. Processing for these cases is described in detail in Japanese translation of "Computer Graphics", by J. D. Foley and A. Van Dam, published by the Japan Computer Association, in 1984, pp. 253–273.

In shape modeling and animation operations, which are performed by designers in the prior art, a basic description can be created semi-automatically in accordance with this embodiment. As a result, the time involved in creating animations can be shortened and precision is improved.

In accordance with the present invention, as described above, a three-dimensional model in which the shape of an object is represented correctly with a small amount of data can be created by selecting representative points that are closely spaced on complicated portions where shape is highly irregular, selecting representative points that are distantly spaced on large flat surfaces, and adopting these representative points as the vertices of polygonal patches.

Further, the operation involved in creating an animation is simplified, the item required for creation is shorted and precision is improved.

It should be noted that the present invention is not limited to a single apparatus but may be applied to a system composed of a plurality of apparatus so long as the functions of the present invention are implemented. It goes without saying that the present invention can be applied also to a system in which the processing is carried out by supplying a program to the apparatus or system.

As many apparently widely different embodiments of the present invention can be made without departing from the spirit and scope thereof, it is to be understood that the invention is not limited to the specific embodiments thereof except as defined in the appended claims.

What is claimed is:

1. An image processing method comprising:
    an input step of inputting a range image in which a value of each pixel describes a distance between respective points on an object surface and a reference plane;
    a normalization step of normalizing the range image along each of three coordinate axes in which a first one is orthogonal to the range image and a second one and a third one are parallel to the range image, by a conversion of the value of each pixel representing the distance along the first coordinate axis in order that unit length along the first coordinate axis should accord with unit length along the second and the third coordinate axes;
    an arithmetic step of calculating a value representing a property of the object surface described by the normalized range image; and
    a display step of displaying image information which represents the property of the object surface based upon the value calculated in said arithmetic step.

2. The method according to claim 1, wherein said arithmetic step includes a step of calculating a linear partial differential from the range image.

3. The method according to claim 2, wherein said arithmetic step includes a step of calculating a quadratic partial differential from the converted range image, and a step of calculating Guassian curvature of the object surface using the calculated linear and quadratic partial differentials.

4. The method according to claim 3, wherein said arithmetic step includes a step of discriminating the sign of the calculated Gaussian curvature.

5. The method according to claim 2, wherein said arithmetic step includes a step of calculating a quadratic partial differential from the converted range image, and a step of calculating mean curvature of the object surface using the calculated linear and quadratic partial differentials.

6. The method according to claim 5, wherein said arithmetic step includes a step of discriminating the sign of the calculated mean curvature.

7. The method according to claim 2, wherein said arithmetic step includes a step of calculating a quadratic partial differential from the converted range image, and a step of calculating normal curvature of the object surface using the calculated linear and quadratic partial differentials.

8. The method according to claim 2, wherein said arithmetic step includes a step of calculating a quadratic partial differential from the converted range image, and a step of calculating radius of curvature of the object surface using the calculated linear and quadratic partial differentials.

9. The method according to claim 2, wherein said arithmetic step includes a step of calculating a unit normal vector using the calculated linear partial differential.

10. The method according to claim 1, wherein said arithmetic step includes a step of approximating the range image as a local linear plane and calculating coefficients of an equation thereof.

11. The method according to claim 1, wherein said arithmetic step includes a step of approximating the range image as a local quadratic surface and calculating coefficients of an equation thereof.

12. An image processing method comprising:
    an input step of inputting a range image in which a value of each pixel describes a distance between respective points on an object surface and a reference plane;
    a normalization step of normalizing the range image along each of three coordinate axes in which a first one is orthogonal to the range image and a second one and a third one are parallel to the range image, by a conversion of the value of each pixel representing the distance along the first coordinate axis in order that unit length along the first coordinate axis should accord with unit length along the second and the third coordinate axes;
    an arithmetic step of calculating a value representing a property of the object surface described by the normalized range image; and
    a display step of displaying image information which represents the property of the object surface based upon the value calculated in said arithmetic step,
    wherein said arithmetic step includes a step of detecting a jump edge from the range image.

13. An image processing method comprising:
    an input step of inputting a range image in which a value of each pixel describes a distance between respective points on an object surface and a reference plane;
    a normalization step of normalizing the range image along each of three coordinate axes in which a first one is orthogonal to the range image and a second one and a third one are parallel to the range image, by a conversion of the value of each pixel representing the distance along the first coordinate axis in order that unit length along the first coordinate axis should accord with unit length along the second and the third coordinate axes;
    an arithmetic step of calculating a value representing a property of the object surface described by the normalized range image; and
    a display step of displaying image information which represents the property of the object surface based upon the value calculated in said arithmetic step,
    wherein said arithmetic step includes a step of calculating a quadratic partial differential from the range image.

14. An image processing method comprising:
    an input step of inputting a range image in which a value of each pixel describes a distance between respective points on an object surface and a reference plane;
    a normalization step of normalizing the range image along each of three coordinate axes in which a first one is orthogonal to the range image and a second one and a third one are parallel to the range image, by a conversion of the value of each pixel representing the distance along the first coordinate axis in order that unit length along the first coordinate axis should accord with unit length along the second and the third coordinate axes;

an arithmetic step of calculating a value representing a property of the object surface described by the normalized range image; and a display step of displaying image information which represents the property of the object surface based upon the value calculated in said arithmetic step, wherein said arithmetic step includes a partial-differential calculating step of calculating linear and quadratic partial differentials form the range image, a curvature calculating step of calculating Gaussian curvature and mean curvature using the calculated linear and quadratic partial differentials, a sign discriminating step of discriminating the signs of the calculated Gaussian curvature and mean curvature, and a surface-category discriminating step of discriminating surface category by a combination of the discriminated sign of the Gaussian curvature and the discriminated sign of the mean curvature.

15. An image processing method comprising:

an input step of inputting a range image in which a value of each pixel describes a distance between respective points on an object surface and a reference plane;

a normalization step of normalizing the range image along each of three coordinate axes in which a first one is orthogonal to the range image and a second one and a third one are parallel to the range image, by a conversion of the value of each pixel representing the distance along the first coordinate axis in order that unit length along the first coordinate axis should accord with unit length along the second and the third coordinate axes;

an arithmetic step of calculating a value representing a property of the object surface described by the normalized range image; and a display step of displaying image information which represents the property of the object surface based upon the value calculated in said arithmetic step, wherein said arithmetic step includes a step of detecting a roof edge from the calculated unit normal vector.

16. A method of creating a three-dimensional shape model from-an inputted three-dimensional range image, comprising the steps of:

inputting a three-dimensional range image obtained from a parallel projection of an axially-symmetrical object in one direction;

generating a two-dimensional image from the inputted three-dimensional image;

displaying the two-dimensional image on a display;

designating an axis of symmetry of the object on the two-dimensional image;

estimating a shape of a back surface of the object based upon the inputted range image and the designated axis of symmetry; and constructing a three-dimensional shape model of the object on the basis of the inputted three-dimensional range image and the estimated shape of the back surface of the object.

17. The method according to claim 16, wherein said designating step further includes steps of:

projecting the given range image upon three two-dimensional planes and displaying a three-surface view; and designating the axis of symmetry of the object using the three-surface view.

18. An apparatus for creating a three-dimensional shape model, comprising:

input means for inputting a three-dimensional range image obtained from a parallel projection of an axial symmetrical object in one direction;

generating means for generating a two-dimensional image from the inputted three-dimensional image;

display means for displaying the two-dimensional image on a display;

designating means for designating an axis of symmetry of the object on the two-dimensional image;

estimating means for estimating a shape of a back surface of the object based upon the inputted range image and the designated axis of symmetry; and model forming means for constructing a three-dimensional shape model-of the object on the basis of the inputted three-dimensional range image and the estimated shape of the back surface of the object.

19. The apparatus according to claim 18, further comprising means for storing the constructed three-dimensional shape model in a data file external to the apparatus.

20. The apparatus according to claim 18, wherein said designating means designates the axis of symmetry of the object using a three-surface view.

21. The apparatus according to claim 18, further comprising display means for subjecting the obtained three-dimensional shape model to processing such as lighting, shading and projection transformation, and displaying results of the processing in a two-dimensional plane.

22. A range image processing method for creating a polygonal patch mode of an object with a group of polygonal patches which cover a surface of the object, said method comprising:

an inputting step of inputting a range image representing the object surface;

a calculating step of calculating a curvature at each pixel in the range image;

a surface-category classifying step for classifying each pixel on the object surface, based upon the curvature at respective pixels, into surface categories each corresponding to different surface shapes;

a pickup step of sequentially picking up areas in the object surface, wherein each of the areas consists of connected pixels classified into a same surface category; and a polygonal patch model creating step for obtaining appropriate polygonal patches which cover each of the picked up areas, wherein a size of the patches for each area is in conformity with the surface categories in which respective areas are classified and creating a polygonal patch model of the object.

23. The method according to claim 22, wherein the larger an irregularity of classified surface category is, the smaller are the polygonal patches which are assigned to the surface.

24. The method according to claim 22, wherein the smaller an irregularity of a classified surface category is, the greater spacing of representative points for selecting polygonal patches is made.

25. A range image processing method for obtaining, from an inputted range image, a group of polygons which cover an object surface represented by said range image, comprising:

a detecting step of detecting a point on the surface that is not covered by the group of polygons already obtained;

a vertex-candidate selecting step of selecting, from other points on the surface, candidates for other vertices of a polygon having the point detected in said detecting step as one vertex;

a determining step of determining whether each point selected is covered by the group of polygons already obtained; and a comparing step, of comparing in a case where all of the points are not covered by the group of polygons, a normal direction at the detected point with a normal direction at each selected point wherein, when differences in normal directions are all less than a predetermined amount in each result of comparison performed in said comparing step, points constituting a polygon covering each selected point are selected anew, from other points on the surface, as candidates for other vertices of a polygon having the detected point as one vertex.

26. The method according to claim 25, wherein when a difference in direction is greater than a predetermined amount in any result of comparison performed at said comparing step, a polygon one vertex of which is the detected point and the other vertices of which are the selected points is added to said group of polygons.

27. The method according to claim 26, wherein comparison of the normal directions is executed by comparing an internal product between normal vectors of two normal directions.

28. The method according to claim 25, wherein comparison of the normal directions is executed by comparing an internal product between normal vectors of two normal directions.

29. An image output method for outputting a two-dimensional image representing a three-dimensional shape, comprising the steps of:

inputting a three-dimensional image;

calculating a unit normal vector at each point on a surface of the three-dimensional image;

outputting a two-dimensional image representing a projection of the three-dimensional image on a plane;

projecting the unit normal vector, on the two-dimensional image, at each sampled point, wherein each sampled point is sampled using a predetermined sampling interval on the plane;

magnifying each of the projected unit normal vectors by a value equal to predetermined sampling interval; and outputting a line segment with the same direction and length as each of the projected and magnified unit normal vectors, at the respective sampling points, on the two-dimensional image.

30. An image output method for outputting a two-dimensional image representing a three-dimensional shape, comprising the steps of:

inputting a three-dimensional image;

calculating a unit normal vector in polar coordinates at each point on a surface of the three-dimensional image;

converting each of the unit normal vectors in the polar coordinates into a point in HLS color space coordinates by converting two angles of the unit normal vector into hue and saturation, respectively, and fixing luminance to a constant; and outputting a two-dimensional image representing a projection of the three-dimensional image on a plane with the color of each point corresponding to the value in the RGB color space coordinates converted from the unit normal vector at a respective point.

31. An image processing apparatus for outputting a two-dimensional image representing a three-dimensional shape, comprising:

input means for inputting a three-dimensional image;

calculation means for calculating a unit normal vector at each point on a surface of the three-dimensional image;

means for outputting a two-dimensional image representing a projection of the three-dimensional image on a plane;

vector projecting means for projecting the unit normal vector, on the two-dimensional image, at each sampled point, wherein each sampled point is sampled using a predetermined sampling interval on the plane;

magnifying means for magnifying each of the projected unit normal vectors by a value equal to the predetermined sampling interval; and means for outputting a line segment with the same direction and length as each of the projected and magnified unit normal vectors, at the respective sampling points, on the two-dimensional image.

32. An image processing apparatus for outputting a two-dimensional image representing a three-dimensional shape, comprising:

input means for inputting a three-dimensional image;

calculation means for calculating a unit normal vector in polar coordinates at each point on a surface of the three-dimensional image;

first conversion means for converting each of the unit normal vectors in the polar coordinates into a point in HLS color space coordinates by converting two angles of the unit normal vector into hue and saturation, respectively, and fixing luminance to a constant;

second conversion means for converting each point in the HLS color space coordinates into a point in RGB color space coordinates; and output means for outputting a two-dimensional image representing a projection of the three-dimensional image on a plane with the color of each point corresponding to the value in the RGB color space coordinates converted from the unit normal vector at a respective point.

33. An image processing apparatus comprising:

input means for inputting a range image in which a value of each pixel describes a distance between a respective point on an object surface and a reference plane;

normalization means for normalizing the range image along each of three coordinate axes in which a first one is orthogonal to the range image and a second one and a third one are parallel to the range image, by a conversion of the value of each pixel representing the distance along the first coordinate axis in order that unit length along the first coordinate axis should accord with unit length along the second and the third coordinate axes;

arithmetic means for calculating a value representing a property of the object surface described by the normalized range image; and display means for displaying image information which represents the property of the object surface based upon the value calculated by said arithmetic means.

34. A range image processing apparatus for creating a polygonal patch mode of an object with a group of polygonal patches which cover a surface of the object, said apparatus comprising:

input means for inputting a range image representing the object surface;

calculation means for calculating a curvature at each pixel in the range image;

surface-category classifying means for classifying each pixel on the object surface, based upon the curvature at respective pixels, into surface categories each corresponding to different surface shapes;

pickup means for sequentially picking up areas in the object surface, wherein each of the areas consists of connected pixels classified into a same surface category; and polygonal patch creating means for selecting and assigning an appropriate size of polygonal patches which cover each of the picked up areas, wherein the size of the polygonal patches for each area is selected in conformity with the surface categories in which respective areas are classified for and creating a polygonal patch model of the object with the polygonal patches.

35. A range image processing apparatus for obtaining, from an inputted range image, a group of polygons which cover an object surface represented by said range image, comprising:

detection means for detecting a point on the surface that is not covered by the group of polygons already obtained;

vertex-candidate selecting means for selecting, from other points on the surface, candidates for other vertices of a polygon having the point detected by said detection means as on vertex;

determination means for determining whether each point selected is covered by the group of polygons already obtained; and comparison means for comparing, in a case where all of the points are not covered by the group of polygons, a normal direction at the detected point with a normal direction at each selected point, wherein, when differences in normal directions are all less than a predetermined amount in each result of comparison performed by said comparison means, points constituting a polygon covering each selected point are selected anew, from other points on the surface, as candidates for other vertices of a polygon having the detected point as one vertex.

* * * * *

UNITED STATES PATENT AND TRADEMARK OFFICE
CERTIFICATE OF CORRECTION

PATENT NO. : 5,936,628
DATED : August 10, 1999
INVENTOR(S) : YOSHIFUMI KITAMURA ET AL.

It is certified that error appears in the above-identified patent and that said Letters Patent is hereby corrected as shown below:

ON THE TITLE PAGE AT [56], OTHER PUBLICATIONS

In "Sabata et al. ...", "3-DRange" should read
      --3-D Range--;
    In "Mulgaonkar et al. ...", "SceneDescription" should
      read --Scene Description--.

COLUMN 2

Line 54, "been" should read --been made--.

COLUMN 9

Line 65, "43(b)" should read --3(b)--.

COLUMN 12

Line 42, "a nd" should read --and--.

COLUMN 14

Line 60, "computation" should read --computation of--;
    Line 61, "putation;" should read --putation:--.

COLUMN 16

Line 31, "if" should read --in--;
    Line 66, "is" should read --in--;
    Line 67, "is" should read --in--.

COLUMN 17

Line 1, "is" should read --in--.

COLUMN 24

Line 40, "serves" should read --serve--.

UNITED STATES PATENT AND TRADEMARK OFFICE
CERTIFICATE OF CORRECTION

PATENT NO. : 5,936,628
DATED : August 10, 1999
INVENTOR(S) : YOSHIFUMI KITAMURA ET AL.

It is certified that error appears in the above-identified patent and that said Letters Patent is hereby corrected as shown below:

COLUMN 25

Line 5, Close up right margin;
   Line 6, Close up left margin.

COLUMN 26

Line 65, "model > to" should read --model to--.

COLUMN 27

Line 55, "illustrates" should read --illustrate--.

COLUMN 28

Line 57, "illustrates" should read --illustrate--.

COLUMN 30

Line 30, "this" should read --this is--.

COLUMN 33

Line 46, "from-an" should read --from an--.

COLUMN 34

Line 19, "model-of" should read --model of--.

COLUMN 35

Line 11, "point" should read --point,--.

UNITED STATES PATENT AND TRADEMARK OFFICE
CERTIFICATE OF CORRECTION

PATENT NO.  : 5,936,628
DATED  : August 10, 1999
INVENTOR(S) : YOSHIFUMI KITAMURA ET AL.

It is certified that error appears in the above-identified patent and that said Letters Patent is hereby corrected as shown below:

<u>COLUMN 38</u>

Line 7, "on" should read --one--.

Signed and Sealed this

Thirty-first Day of October, 2000

*Attest:*

Q. TODD DICKINSON

*Attesting Officer*    *Director of Patents and Trademarks*